(12) United States Patent
Bauman

(10) Patent No.: US 8,132,990 B2
(45) Date of Patent: *Mar. 13, 2012

(54) BIT HOLDING APPARATUS FOR USE WITH A POWER TOOL

(75) Inventor: Lynn E. Bauman, Eddystone, PA (US)

(73) Assignees: Lynn Everett Bauman, Ephrata, PA (US); Robert A. Renshaw, Glenn Mills, PA (US); Patrick G. Anderson, Media, PA (US)

( * ) Notice: Subject to any disclaimer, the term of this patent is extended or adjusted under 35 U.S.C. 154(b) by 994 days.

This patent is subject to a terminal disclaimer.

(21) Appl. No.: 12/038,400

(22) Filed: Feb. 27, 2008

(65) Prior Publication Data

US 2008/0226407 A1 Sep. 18, 2008

Related U.S. Application Data

(63) Continuation-in-part of application No. 11/425,997, filed on Jun. 22, 2006, now Pat. No. 7,374,377, and a continuation-in-part of application No. 11/004,995, filed on Dec. 7, 2004, now Pat. No. 7,354,230, and a continuation-in-part of application No. PCT/US2004/039769, filed on Dec. 17, 2004.

(60) Provisional application No. 60/747,314, filed on May 16, 2006, provisional application No. 60/531,617, filed on Dec. 23, 2003.

(51) Int. Cl.
*B23B 51/08* (2006.01)

(52) U.S. Cl. ...... 408/239 R; 279/14; 279/137; 279/143; 403/322.2; 403/361; 403/DIG. 4; 403/DIG. 6; 7/165; 81/451

(58) Field of Classification Search ................. 408/238, 408/239 A, 239 R; 279/14, 76, 79, 80, 137, 279/143–145; 403/322.1, 322.2, 361, 378, 403/379.5, DIG. 4, DIG. 6; 7/165; 81/451; B23B 51/08

See application file for complete search history.

(56) References Cited

U.S. PATENT DOCUMENTS 1,765,362 A 6/1930 Berry
(Continued)

FOREIGN PATENT DOCUMENTS

| EP | 891831 A1 | 1/1999 |
| GB | 2063114 A | 6/1981 |
| JP | 58120440 | 7/1983 |

OTHER PUBLICATIONS

Supplementary European Search Report issued Oct. 14, 2010, in counterpart EP application.
Office Action of Sep. 26, 2011 in corresponding Canadian Patent Application 2,550,779.

*Primary Examiner* — Eric A Gates
(74) *Attorney, Agent, or Firm* — Duane Morris LLP; Steven E. Koffs

(57) ABSTRACT

An apparatus includes a rotatable device, which may be a keyless chuck, a keyless chuck adapter, a collet chuck, a collet adapter, a set screw bit retaining chuck, or a set screw bit retaining adapter. The rotatable device is configured to be mounted to a power tool for rotational driving of the rotatable device. The rotatable device is configured to receive a first bit device detachably mounted in the rotatable device for powering rotational movement of the first bit device. A mounting section having at least one flat secant side is defined on the rotatable device, which is capable of being rotatably driven by the power tool. The mounting section includes at least one locking mechanism on it. The generally cylindrical mounting section is adapted for insertion in and engagement with a bit holding attachment.

23 Claims, 37 Drawing Sheets

U.S. PATENT DOCUMENTS

| | | |
|---|---|---|
| 1,871,720 A | 8/1932 | Meunier |
| 1,918,944 A | 7/1933 | Wells et al. |
| 2,153,847 A | 4/1939 | Seruggs |
| 2,286,292 A | 6/1942 | Mail |
| 2,293,786 A | 8/1942 | Worden |
| 2,361,683 A | 10/1944 | Greenberg |
| 2,451,565 A | 10/1948 | Landow |
| 2,465,309 A | 3/1949 | Happe et al. |
| 2,536,017 A | 1/1951 | Bamberger |
| 2,576,063 A | 11/1951 | Berta |
| 2,714,026 A | 7/1955 | Schultz |
| 2,719,047 A | 9/1955 | Bayes et al. |
| 2,927,614 A | 3/1960 | Ransom |
| 2,931,659 A | 4/1960 | Novkov |
| 3,003,149 A | 10/1961 | Grashow |
| 3,023,015 A | 2/1962 | Pankow |
| 3,120,706 A | 2/1964 | Turchi et al. |
| 3,135,522 A | 6/1964 | Bell |
| 3,289,290 A | 12/1966 | Sandor |
| 3,405,949 A | 10/1968 | Cox |
| 3,460,408 A | 8/1969 | Raymond |
| 3,484,114 A | 12/1969 | Rodin |
| 3,499,223 A | 3/1970 | Lieb et al. |
| 3,506,277 A | 4/1970 | Harms |
| 3,527,273 A | 9/1970 | Falter |
| 3,734,515 A | 5/1973 | Dudek |
| 3,751,051 A | 8/1973 | Schmidt |
| 3,843,143 A | 10/1974 | Laxson |
| 3,932,904 A * | 1/1976 | Nilsson et al. ................... 7/158 |
| 3,965,510 A | 6/1976 | Ernst |
| 3,973,784 A | 8/1976 | Smith |
| 4,087,195 A | 5/1978 | Wood |
| 4,092,753 A | 6/1978 | Fuhrmann |
| 4,218,794 A | 8/1980 | Seidel et al. |
| 4,218,795 A | 8/1980 | Ernst et al. |
| 4,224,969 A | 9/1980 | Plessner |
| 4,277,074 A | 7/1981 | Kilberis |
| 4,413,937 A | 11/1983 | Gutsche |
| 4,460,296 A | 7/1984 | Silvertson, Jr. |
| 4,512,693 A | 4/1985 | Swanson |
| 4,536,157 A | 8/1985 | Maizenberg |
| 4,676,599 A | 6/1987 | Cruz |
| 4,676,703 A | 6/1987 | Swanson |
| 4,840,387 A | 6/1989 | McCarthy |
| 4,844,488 A | 7/1989 | Flynn |
| 4,874,181 A | 10/1989 | Hsu |
| 4,930,793 A | 6/1990 | Ando |
| 4,944,641 A | 7/1990 | Alves |
| 5,033,921 A | 7/1991 | Yasuhara et al. |
| 5,052,496 A | 10/1991 | Albert et al. |
| 5,110,145 A | 5/1992 | Stewart |
| 5,129,118 A | 7/1992 | Walmesley |
| 5,191,666 A | 3/1993 | Corbin |
| 5,224,230 A | 7/1993 | Vanicsek et al. |
| 5,234,296 A | 8/1993 | Presby et al. |
| 5,282,638 A | 2/1994 | Harper |
| 5,309,799 A | 5/1994 | Jore |
| 5,313,680 A | 5/1994 | Ringler |
| 5,330,206 A | 7/1994 | Krumszyn et al. |
| 5,342,154 A | 8/1994 | Holzer |
| 5,405,221 A | 4/1995 | Ducker et al. |
| 5,409,333 A | 4/1995 | Hu |
| 5,417,527 A | 5/1995 | Wienhold |
| 5,439,005 A | 8/1995 | Vaughn |
| 5,460,388 A | 10/1995 | Lewis et al. |
| 5,470,180 A | 11/1995 | Jore |
| 5,564,717 A | 10/1996 | Alberts |
| 5,586,847 A | 12/1996 | Mattern, Jr. et al. |
| 5,651,647 A | 7/1997 | Ray |
| 5,678,961 A | 10/1997 | Fleege et al. |
| 5,711,043 A | 1/1998 | Crawford et al. |
| 5,722,805 A | 3/1998 | Giffin |
| 5,779,404 A | 7/1998 | Jore |
| 5,785,468 A | 7/1998 | Peritz |
| 5,797,302 A | 8/1998 | Khoury |
| 5,870,935 A | 2/1999 | Erickson et al. |
| 5,893,689 A | 4/1999 | Juhasz |
| 5,911,578 A | 6/1999 | Gross |
| 5,938,212 A | 8/1999 | Wadsworth |
| 5,951,026 A | 9/1999 | Harman, Jr. et al. |
| 5,954,463 A | 9/1999 | Jore |
| 6,000,888 A | 12/1999 | Hartman |
| 6,033,162 A | 3/2000 | Uebele et al. |
| 6,047,971 A | 4/2000 | Harman, Jr. et al. |
| 6,053,675 A | 4/2000 | Holland et al. |
| 6,079,716 A | 6/2000 | Harman, Jr. et al. |
| 6,126,370 A | 10/2000 | Wheeler et al. |
| 6,176,654 B1 | 1/2001 | Jore |
| 6,224,303 B1 | 5/2001 | Wheeler et al. |
| 6,241,434 B1 | 6/2001 | Ajimi |
| 6,261,035 B1 | 7/2001 | Moores, Jr. et al. |
| 6,293,559 B1 | 9/2001 | Harman, Jr. et al. |
| 6,343,901 B2 | 2/2002 | Wheeler et al. |
| 6,390,739 B1 | 5/2002 | O'Banion |
| 6,394,715 B1 | 5/2002 | Boyle et al. |
| 6,398,466 B1 | 6/2002 | Wheeler |
| 6,419,430 B2 | 7/2002 | Hangleiter |
| 6,474,656 B1 | 11/2002 | Thomas |
| 6,488,452 B1 | 12/2002 | Hoskins et al. |
| 6,511,268 B1 | 1/2003 | Vasudeva et al. |
| 6,523,442 B2 | 2/2003 | Lehnert et al. |
| 6,536,782 B2 | 3/2003 | Rohm |
| 6,543,959 B1 | 4/2003 | Jore |
| 6,550,786 B2 | 4/2003 | Gifford et al. |
| 6,551,037 B2 | 4/2003 | Gifford et al. |
| 6,648,563 B2 | 11/2003 | Rohm |
| 6,688,611 B2 | 2/2004 | Gifford et al. |
| 6,868,789 B1 | 3/2005 | Basu |
| 7,086,813 B1 | 8/2006 | Boyle et al. |
| 7,137,633 B1 | 11/2006 | Dieleman |
| 7,237,987 B2 | 7/2007 | Hernandez, Jr. et al. |
| 7,244,080 B2 | 7/2007 | Voss et al. |
| 7,334,970 B2 * | 2/2008 | Kozak ......................... 408/240 |
| 2001/0042964 A1 | 11/2001 | Bedi et al. |
| 2001/0043841 A1 | 11/2001 | Wienhold |
| 2002/0020973 A1 | 2/2002 | Cantlon |
| 2002/0020974 A1 | 2/2002 | Wu |
| 2002/0093151 A1 | 7/2002 | Monge |
| 2003/0077136 A1 | 4/2003 | Rohm |
| 2003/0178796 A1 | 9/2003 | Pjevach et al. |
| 2003/0230862 A1 | 12/2003 | Peters et al. |
| 2004/0004329 A1 | 1/2004 | Schroeder |
| 2004/0012161 A1 | 1/2004 | Chiu |
| 2004/0021276 A1 | 2/2004 | Allan et al. |
| 2004/0026877 A1 | 2/2004 | Taylor et al. |
| 2004/0056435 A1 | 3/2004 | Bedi et al. |
| 2004/0094908 A1 | 5/2004 | Cantlon |
| 2004/0096286 A1 | 5/2004 | Hsiao |
| 2004/0124593 A1 | 7/2004 | Lin |
| 2004/0141818 A1 | 7/2004 | Kuhn |
| 2004/0164503 A1 | 8/2004 | Fan-Chiang et al. |
| 2004/0262856 A1 | 12/2004 | Cantlon |
| 2005/0031424 A1 | 2/2005 | Hernandez, Jr. |
| 2005/0105983 A1 | 5/2005 | Hernandez, Jr. |
| 2005/0191139 A1 | 9/2005 | Hofbrucker et al. |
| 2005/0244234 A1 | 11/2005 | Voss et al. |
| 2006/0076738 A1 | 4/2006 | Zhou |
| 2006/0088393 A1 | 4/2006 | Cooper |
| 2006/0181033 A1 | 8/2006 | Chen |
| 2006/0228181 A1 | 10/2006 | Kozak |
| 2006/0233622 A1 | 10/2006 | Bauman |
| 2007/0098507 A1 | 5/2007 | Whitehead |
| 2010/0219595 A1 * | 9/2010 | Moore ......................... 279/144 |

* cited by examiner

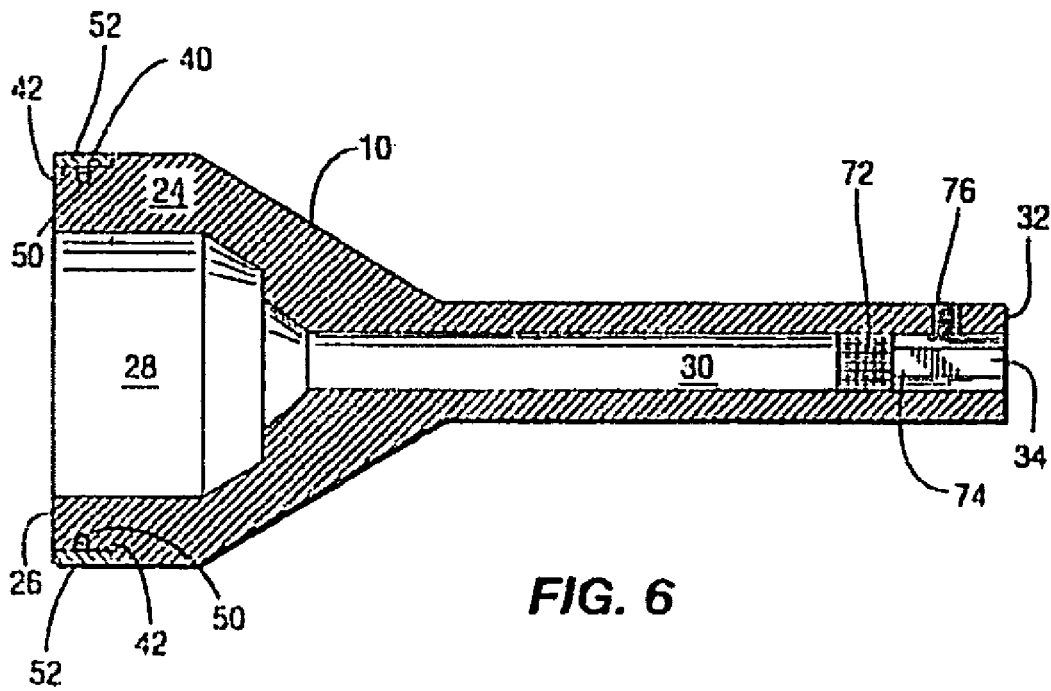
FIG. 6
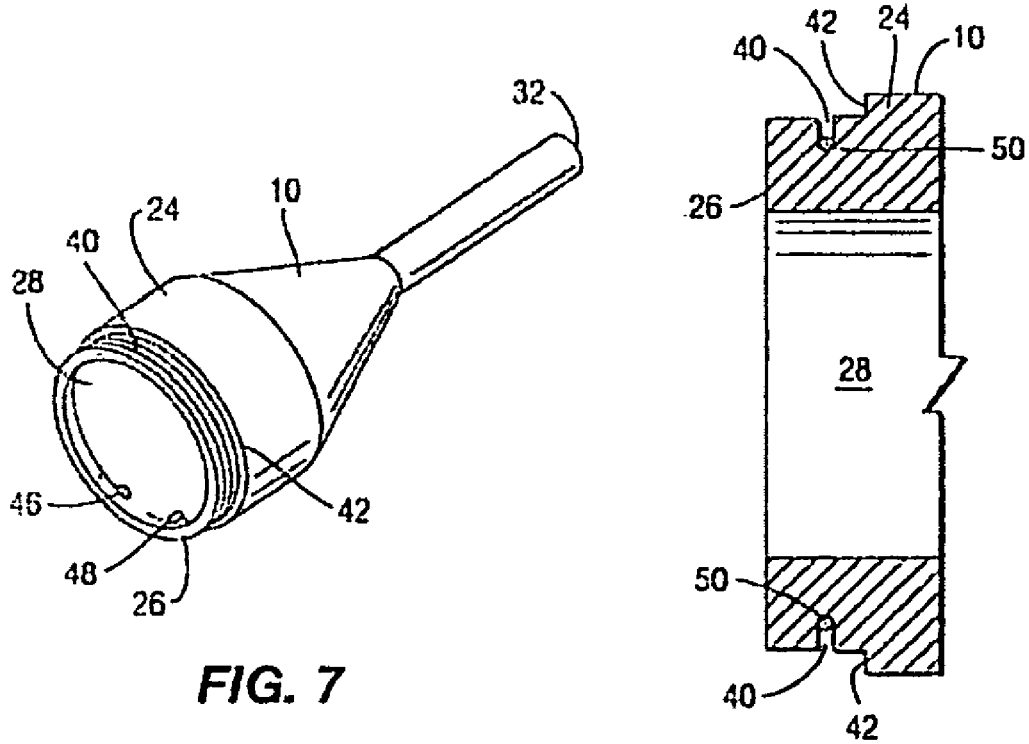
FIG. 7
FIG. 8

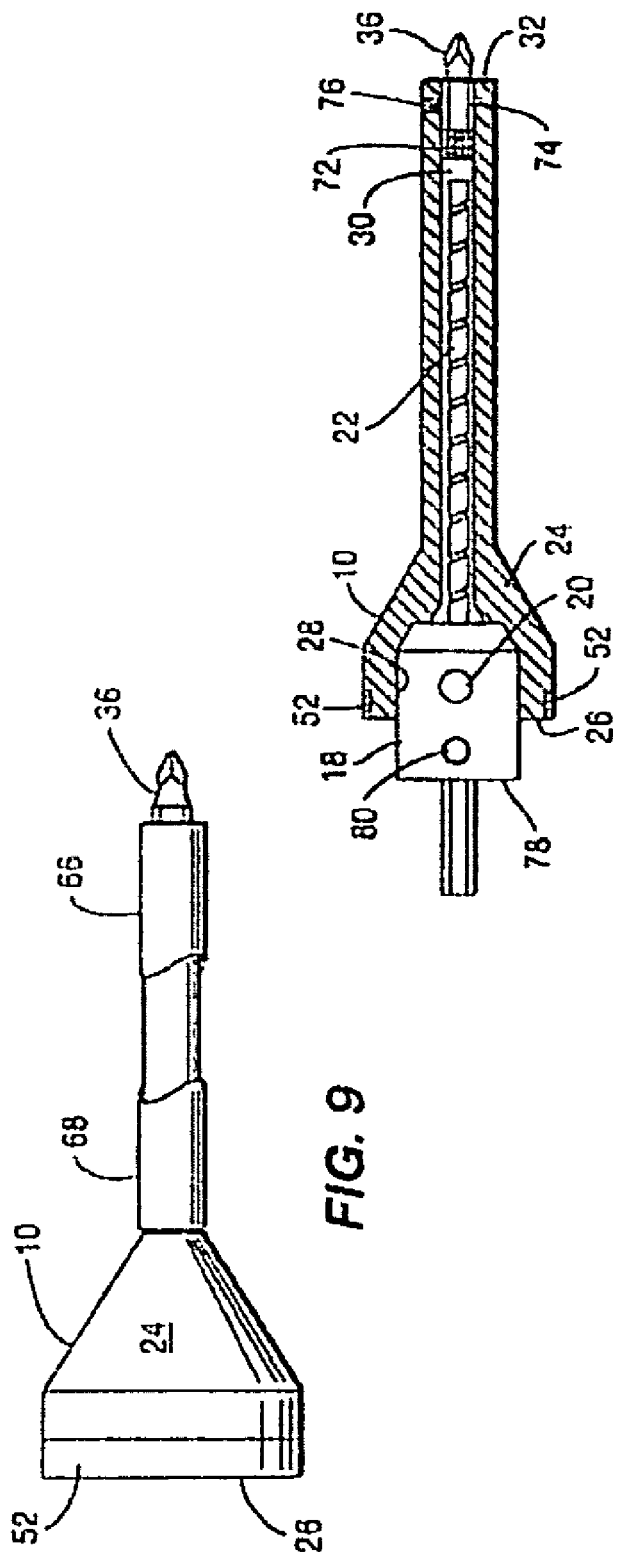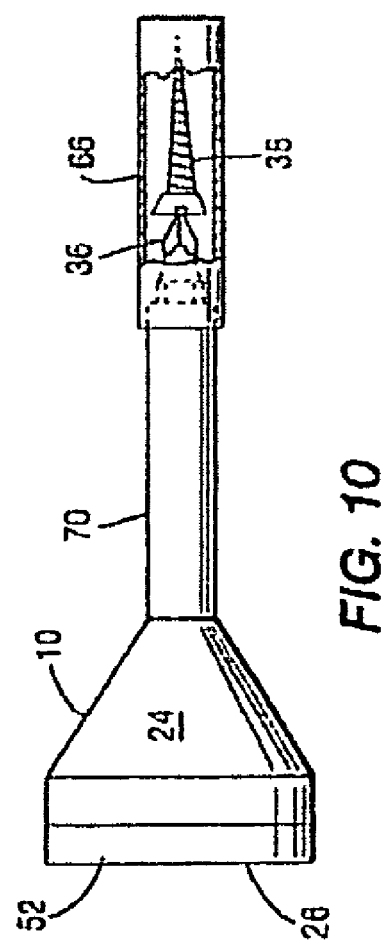

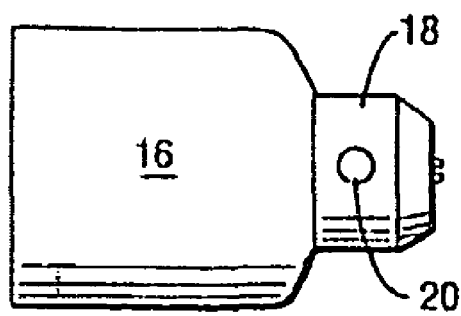
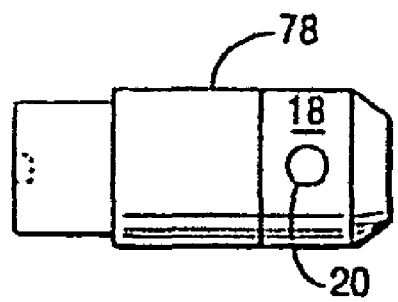
FIG. 30  FIG. 31
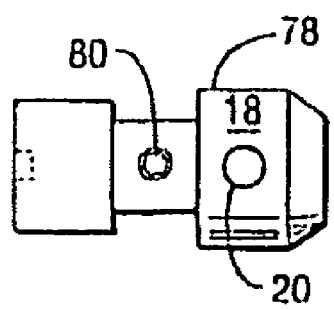
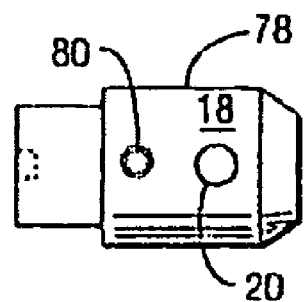
FIG. 32  FIG. 33
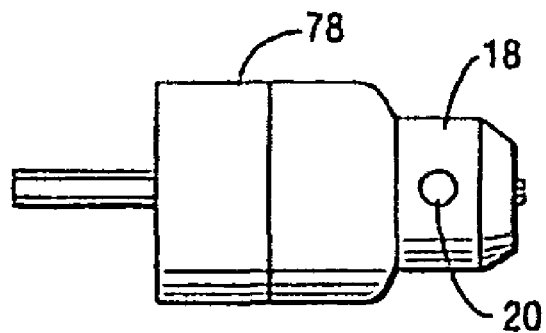
FIG. 34

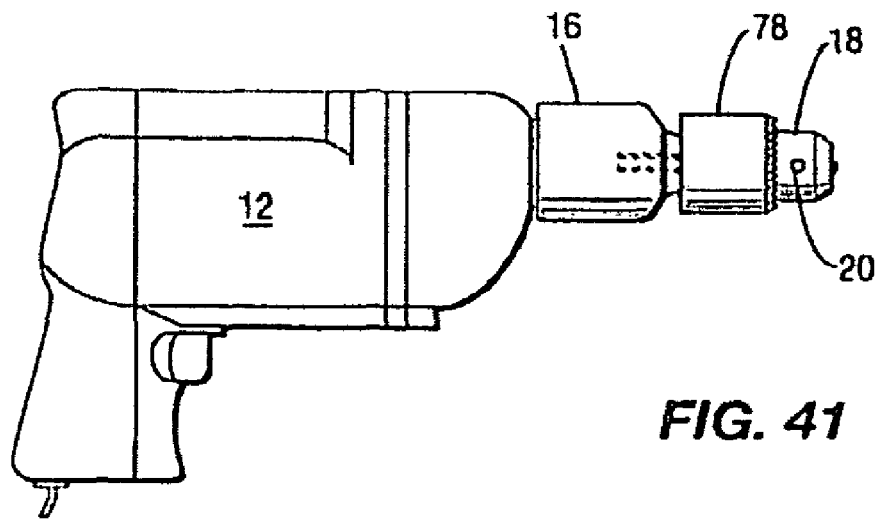
FIG. 41
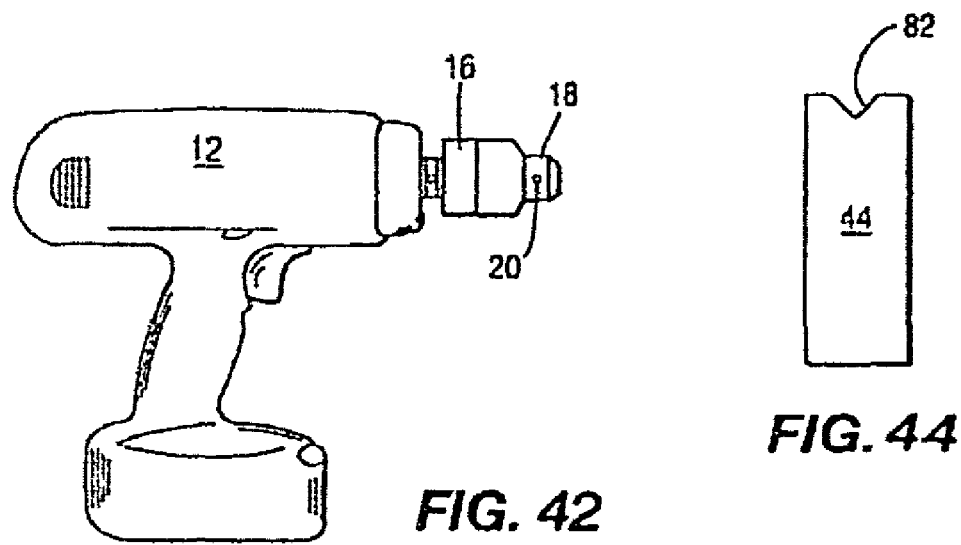
FIG. 42
FIG. 44
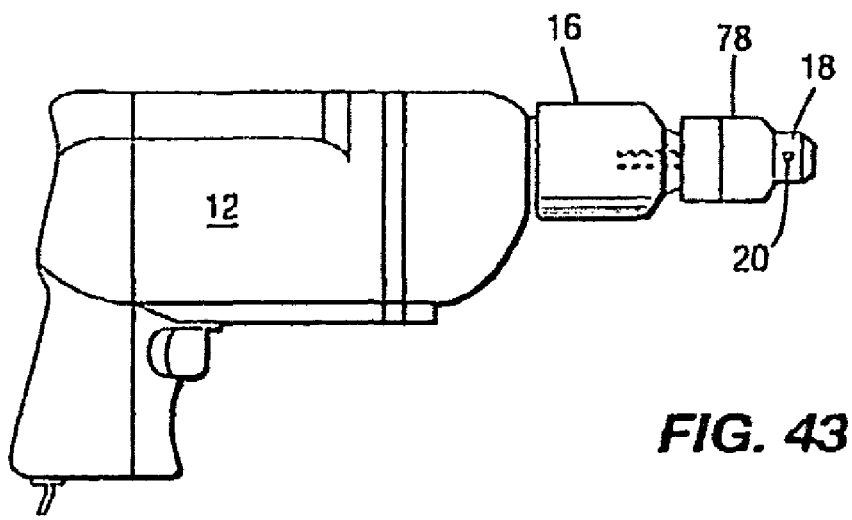
FIG. 43

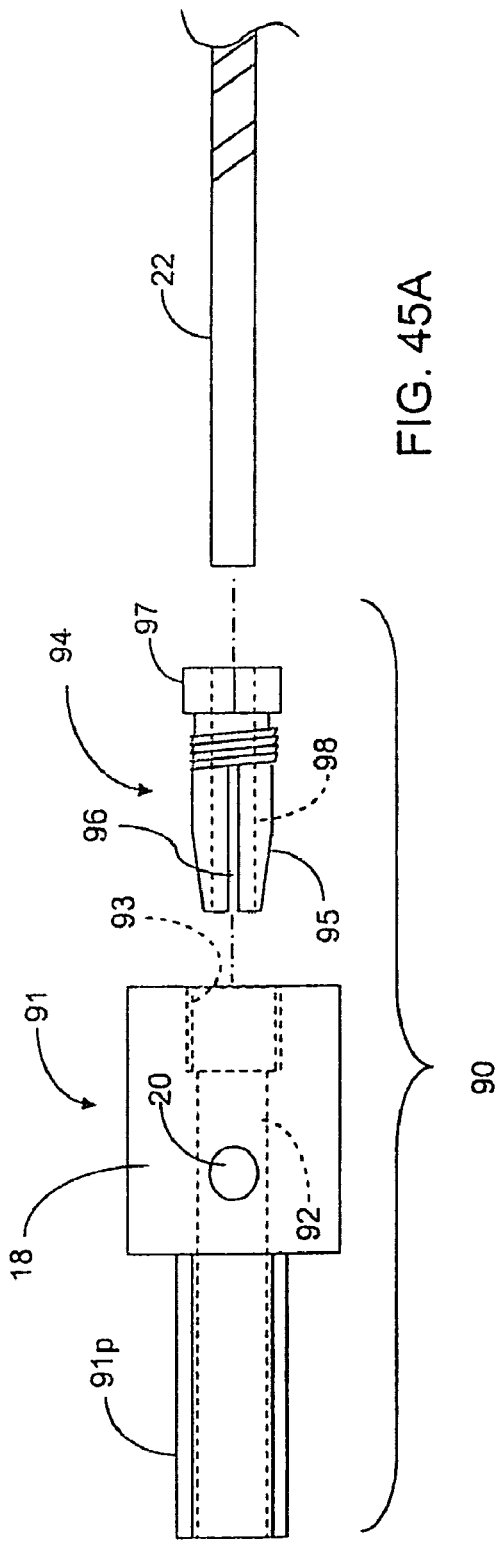
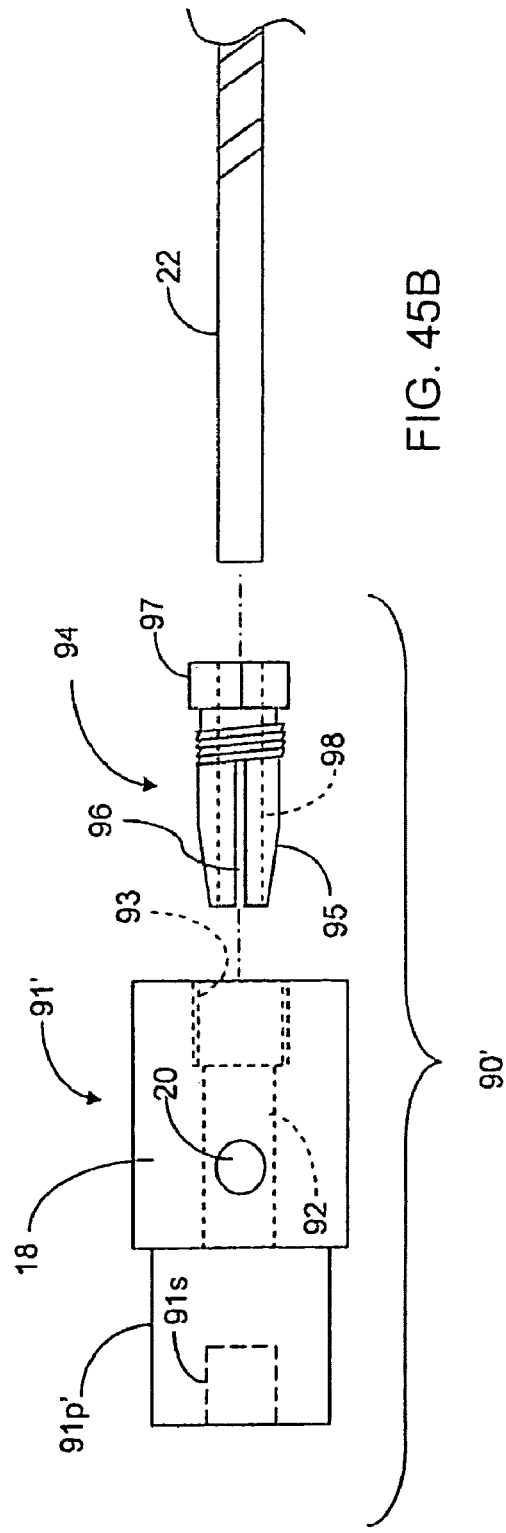

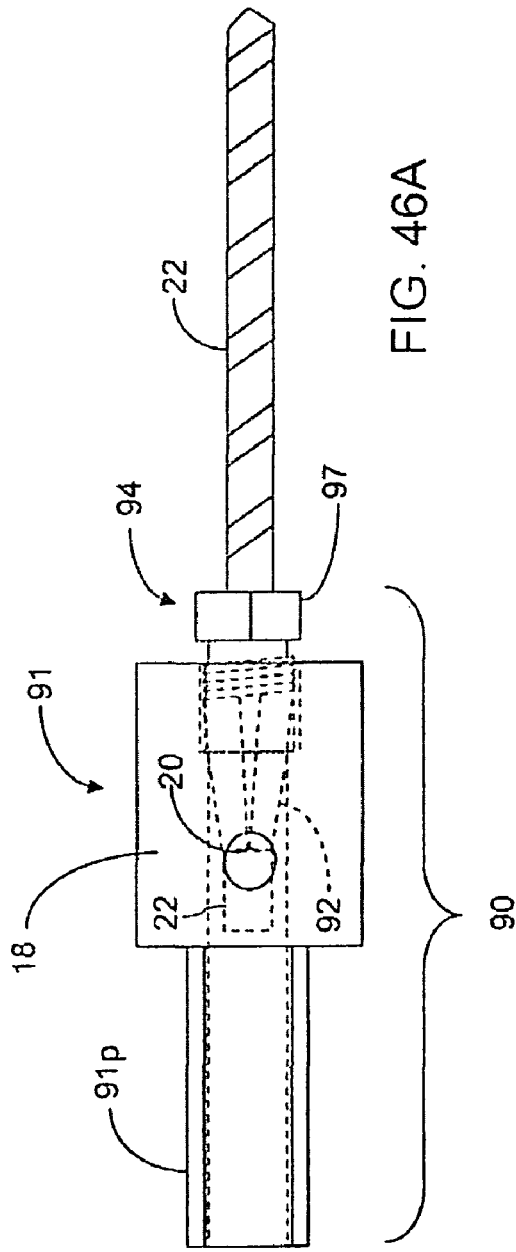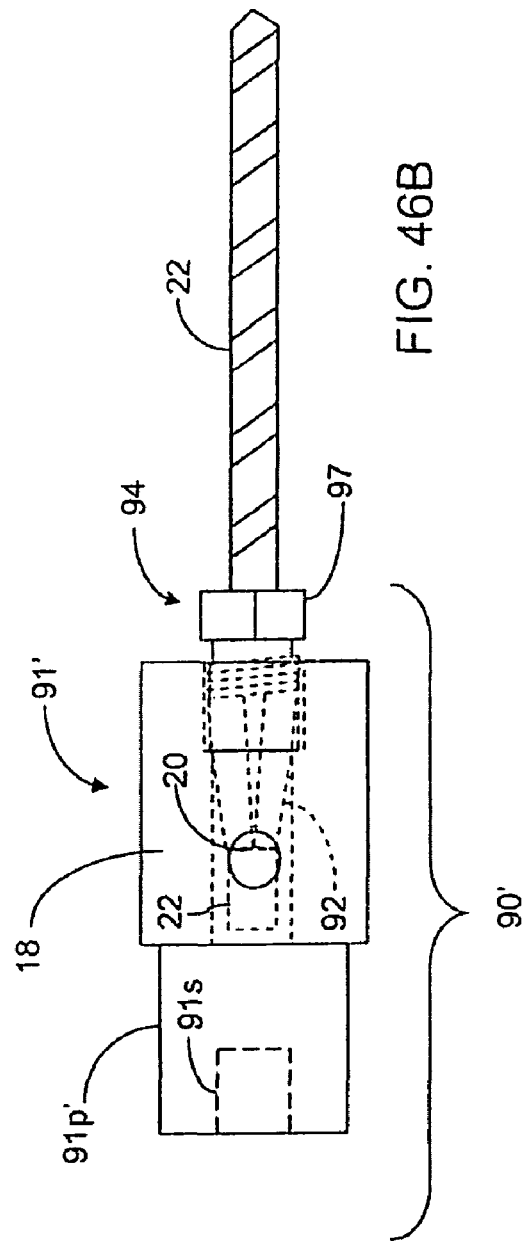

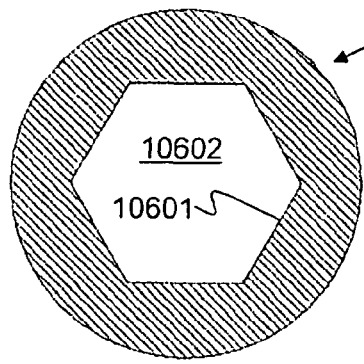
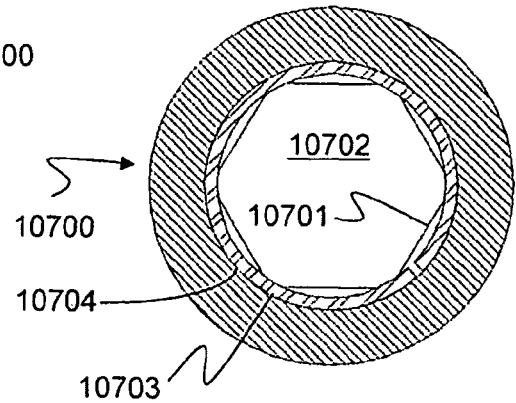
FIG. 94  FIG. 95
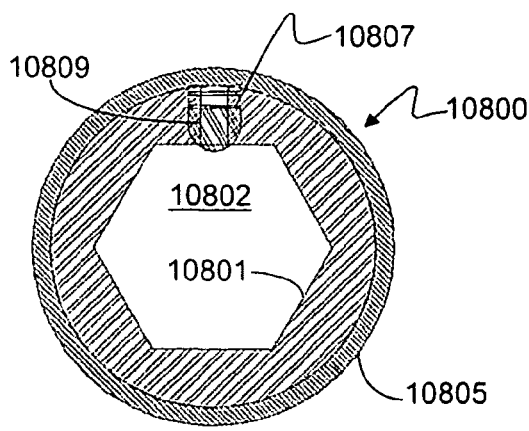
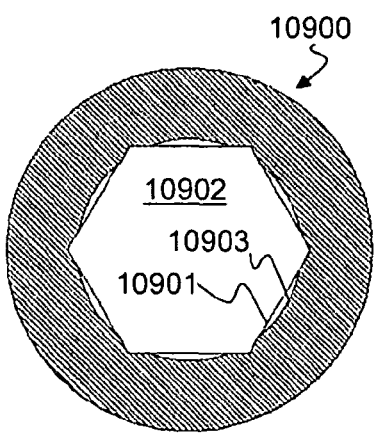
FIG. 96  FIG. 97
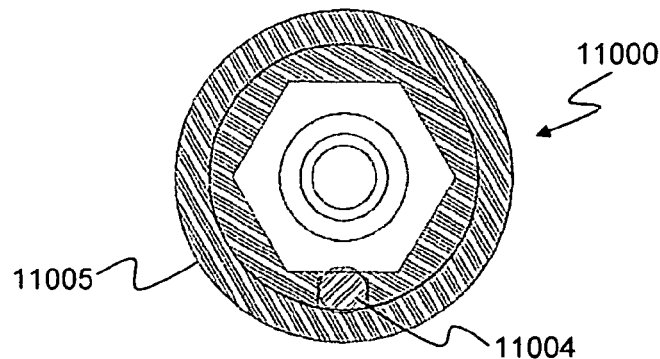
FIG. 98

BIT HOLDING APPARATUS FOR USE WITH A POWER TOOL

This application is a continuation in part of U.S. patent application Ser. No. 11/425,997, filed Jun. 22, 2006, which is a continuation-in-part of U.S. patent application Ser. No. 11/004,995, filed Dec. 7, 2004 and which claims priority of the filing date of U.S. Provisional Patent Application No. 60/747,314, filed May 16, 2006 and is a continuation-in-part of International Application No. PCT/US04/39769, filed Dec. 17, 2004, said non-provisional and international applications claiming priority of the filing date of U.S. Provisional Patent Application No. 60/531,617 filed Dec. 23, 2003, all of which applications are hereby expressly incorporated by reference herein in their entireties as an integral part of the present application.

BACKGROUND OF THE INVENTION

1. Field of the Invention

The present invention relates to power tools and, particularly, to the use of power tools including rotating drive mechanisms such as drive chucks and impact wrench drive tools adapted to drill holes such as pilot holes as well as for driving of fasteners and other operations commonly performed in the field of construction.

2. Background

The keyless chuck was designed to facilitate ease of rapid transfer between various bits used for different purposes in common power tools, however, it is still significantly time consuming and burdensome to repeatedly disengage one bit such as a drill bit or a driving bit over and over again when performing common construction tasks such as drilling pilot holes and then driving a fastener into each of these pilot holes with an appropriate fastener. This construction activity is still very time consuming even when utilizing the more commonly used keyless chuck devices that are currently widely available. Many changeovers or transfers between one bit and another bit such as those needed between drilling and driving mode would need to be made, often as many as one hundred or even more per hour, when performing common construction activities, such as, for example, during the installation of decking.

Another common tactic to avoid repeated bit changes is to utilize two separate power drills, one set up with a first bit device such as a drill bit and the other tool having a second bit device such as a driving bit mounted therein. However, this procedure introduces additional expense since two power tools are needed and also requires the constant switching back and forth between the two separate power tools, which are fairly large and can be quite expensive.

3. Description of the Prior Art

Many patents have been granted illustrating devices for facilitating use of bit devices for various purposes such as drilling and driving of fasteners thereinto which claim to expedite rapid conversion between these two modes of operation for use with power tools such as corded or rechargeable hand drills or impact drivers as well as many others. Examples of such patents include U.S. Pat. No. 1,871,720 patented Aug. 16, 1932 to L. F. Meunier and assigned to Chicago Pneumatic Tool Company on an "Attachment For Driving Spindles"; and U.S. Pat. No. 2,293,786 patented Aug. 25, 1942 to E. C. Worden and assigned to The Billings & Spencer Company on a "Wrench"; and U.S. Pat. No. 2,451,565 patented Oct. 19, 1948 to M. Landow on a "Chuck Adapter"; and U.S. Pat. No. 2,465,309 patented Mar. 22, 1949 to R. Happe et al and assigned to The Singer Manufacturing Company on a "Chuck Adapter For Portable Electric Tools"; and U.S. Pat. No. 2,536,017 patented Jan. 2, 1951 to A. A. Bamberger and assigned to Speedo Manufacturing Co., Inc. on a "Rotary Tool Hand Piece"; and U.S. Pat. No. 2,714,026 patented Jul. 26, 1955 to G. E. Schultz and assigned to R. C. S. Engineering Corp. on a "Rotating Tool Connector"; and U.S. Pat. No. 2,927,614 patented Mar. 8, 1960 to R. B. Ransom on a "Countersinking Tool"; and U.S. Pat. No. 2,931,659 patented Apr. 5, 1960 to R. E. Novkov and assigned to Portage Double-Quick Inc. on a "Quick Change Tool Holder"; and U.S. Pat. No. 3,023,015 patented Feb. 27, 1962 to M. W. Pankow on a "Reversible Bit Drill Attachment"; and U.S. Pat. No. 3,135,522 patented Jun. 2, 1964 to W. Bell and assigned to Expansion Industries Corporation on a "Drill Chuck"; and U.S. Pat. No. 3,289,290 patented Dec. 6, 1966 to R. P. Sandor on a "Method And Apparatus For Installing Fasteners"; and U.S. Pat. No. 3,405,949 patented Oct. 15, 1968 to J. R. Cox and assigned to Balas Collet Company on a "Tool Holder"; and U.S. Pat. No. 3,484,114 patented Dec. 16, 1969 to E. A. Rodin on a "Screw Installing Attachment For Power Tools"; and U.S. Pat. No. 3,734,515 patented May 22, 1973 to E. C. Dudek and assigned to Thor Power Tool Company on a "Power Wrench With Interchangeable Adapters"; and U.S. Pat. No. 3,843,143 patented Oct. 22, 1974 to T. E. Laxson on a "Chuck Adapter"; and U.S. Pat. No. 3,973,784 patented Aug. 10, 1976 to D. A. Smith on a "Cutting Tool Adaptor"; and U.S. Pat. No. 4,092,753 patented Jun. 6, 1978 to M. E. Fuhrmann on a "Combination Drill And Screwdriver"; and U.S. Pat. No. 4,218,794 patented Aug. 26, 1980 to B. Seidel et al and assigned to Illinois Tool Works Inc. on a "Hole-Drilling And Fastener-Driving Combination Tool"; and U.S. Pat. No. 4,218,795 patented Aug. 26, 1980 to R. J. Ernst et al and assigned Illinois Tool Works Inc. on a "Drill Bit With Fastener-Driving Collar Assembly"; and U.S. Pat. No. 4,224,969 patented Sep. 30, 1980 to J. A. Plessner on a "Universal Chuck Adaptor"; and U.S. Pat. No. 4,413,937 patented Nov. 8, 1983 to G. E. Gutsche on "Elements For A Tool System"; and U.S. Pat. No. 4,874,181 patented Oct. 17, 1989 to S. Hsu on a "Coupling Member For Securing A Drilling Head To The Rotatable Rod Of A Pneumatic Tool Body"; and U.S. Pat. No. 4,944,641 patented Jul. 31, 1990 to A. Alves on a "Clutch Engager Sleeve"; and U.S. Pat. No. 5,033,921 patented Jul. 23, 1991 to S. Yasuhara et al and assigned to Koyo Seiko Co., Ltd. and Showa Tool Co., Ltd. on a "Traction Drive Tool Adapter"; and U.S. Pat. No. 5,052,496 patented Oct. 1, 1991 to G. P Albert et al and assigned to Ingersoll-Rand Company on an "Apparatus For Attaching Power Tool Housing Extensions"; and U.S. Pat. No. 5,110,145 patented May 5, 1992 to P. A. Stewart on a "Power Tool Adaptor"; and U.S. Pat. No. 5,129,118 patented Jul. 14, 1992 to M. W. Walmesley on an "Accessory Tool Apparatus For Use On Power Drills"; and U.S. Pat. No. 5,191,666 patented Mar. 9, 1993 to L. N. Corbin on a "Drill Adapter"; and U.S. Pat. No. 5,282,638 patented Feb. 1, 1994 to D. L. Harper on a "Conversation Device For Drills"; and U.S. Pat. No. 5,309,799 patented May 10, 1994 to M. B. Jore on a "Transparent Sleeve Screw Holding And Driving Tool"; and U.S. Pat. No. 5,330,206 patented to L. M. Krumszyn et al on Jul. 19, 1994 and assigned to Luba Krumszyn on an "Adapter For Power Tools"; and U.S. Pat. No. 5,409,333 patented Apr. 25, 1995 to D. Hu and assigned to Ho-Shuenn Huang and Dye-Jon Hu on a "Multiply Functioned Drill Means"; and U.S. Pat. No. 5,651,647 patented Jul. 29, 1997 to R. J. Ray and assigned to GBR Pilot Master, Inc. on an "Auxiliary Chuck And Screwdriver For Electric Drills"; and U.S. Pat. No. 5,678,961 patented Oct. 21, 1997 to D. W. Fleege et al on a "Quick Change Adapter"; and U.S. Pat. No. 5,711,043 patented Jan. 27, 1998 to T. J. Crawford et al and assigned to Diversified Fastening Systems, Inc. on a "Set Tool And Cap"; and U.S. Pat. No. 5,797,302 patented Aug. 25, 1998 to J. F. Khoury on a "Screwdriver Adapted To Be Coupled To An Electric Drill For Automatic Rotation Thereof"; and U.S. Pat. No. 5,951,026 patented Sep. 14, 1999 to W. G. Harman, Jr. et al and assigned to Black & Decker Inc. on a "Removable Chuck"; and U.S. Pat. No. 6,033,162 patented Mar. 7, 2000 to K. Uebele et al and assigned to Firma DreBo Werkseug-Fabrik GmbH on a "Bit Adaptor"; and U.S. Pat. No. 6,523,442 patented Feb. 25, 2003 to M. W. Lehnert et al and assigned to AcraDyne Inc. on a "Torque Tool Assembly".

SUMMARY OF THE INVENTION

In some embodiments, an apparatus comprises a keyless chuck adapter and a bit holding attachment. The keyless chuck adapter has a longitudinal shaft sized and shaped to be grasped by a mounting chuck of a power tool for rotational driving thereof. The keyless chuck adapter is separate from the mounting chuck. The keyless chuck adapter has a plurality of jaws configured to receive a first bit device detachably mounted therebetween for powering rotational movement thereof. The keyless chuck adapter has a sleeve at an outer circumference of the keyless chuck adapter for opening and closing of the jaws for securely gripping bit devices of different sizes and shapes without using a key or tool. The keyless chuck adapter includes a mounting section defined thereon, having at least one flat secant side. The mounting section is capable of being rotatably driven by the power tool. The mounting section includes at least one retaining means thereon or therein. The mounting section is adapted for insertion into and engagement with a bit holding attachment. The bit holding attachment has a mounting cavity sized and shaped to receive a portion of the keyless chuck adapter having the mounting section. The mounting cavity has at least one flat secant side sized and shaped to receive the flat secant side of the mounting section. The bit holding attachment has means for engaging the retaining means of the mounting section. A forward bit securement means is provided at an end of the bit holding attachment opposite a mounting end thereof, for detachably receiving and retaining a second bit device therein.

In some embodiments, an apparatus comprises a keyless chuck adapter and a bit holding attachment. The keyless chuck adapter has a longitudinal shaft sized and shaped to be grasped by a mounting chuck of a power tool for rotational driving thereof. The keyless chuck adapter is separate from the mounting chuck. The keyless chuck adapter has a plurality of jaws configured to receive a first bit device detachably mounted therebetween for powering rotational movement thereof. The keyless chuck adapter has a sleeve at an outer perimeter of the keyless chuck adapter for opening and closing of the jaws for securely gripping bit devices of different sizes and shapes without using a key or tool. The keyless chuck adapter includes a mounting section defined thereon. The mounting section is capable of being rotatably driven by the power tool. The mounting section is adapted for slidable insertion into and engagement with a bit holding attachment. The bit holding attachment has a mounting cavity sized and shaped to slidably receive the mounting section of the keyless chuck adapter while preventing relative rotation between the mounting section and the bit holding attachment. The bit holding attachment has a forward bit securement means at an end opposite a mounting end thereof, for detachably receiving and retaining a second bit device therein.

BRIEF DESCRIPTION OF THE DRAWINGS

Preferred embodiments are set forth in the following detailed description which may be best understood when read in connection with the accompanying drawings, in which:

FIG. 6 is a side cross-sectional view of an alternative attachment device according to an embodiment of the present invention;

FIG. 7 is a three-quarter isometric view of an embodiment of an attachment device according to an embodiment of the present invention;

FIG. 8 is an exploded view of an embodiment of the mounting end of the attachment;

FIG. 9 is a side view of an alternative configuration of the attachment device according to an embodiment of the present invention shown including an embodiment of a guide sleeve shown in a retracted storage position;

FIG. 10 shows a side view of the configuration of FIG. 9 in an extended operating position which can be useful for maintaining a fastener in proper alignment and engaged with respect to a fastener driving bit located therewithin attached to the forward end of the housing;

FIG. 11 shows a side view of an attachment according to an embodiment of the present invention, used with a generally cylindrical mounting surface of an adapter;

FIG. 30 is a side plan view of an embodiment of the present invention showing a single sleeve keyless chuck or adapter including a rotatable cylindrical section with at least one locking aperture defined thereon;

FIG. 31 is a side plan view of an alternative embodiment of the present invention showing a keyless chuck or adapter including a rotatable cylindrical section with at least one locking aperture defined thereon;

FIG. 32 is a side plan view of an alternative embodiment of the present invention showing a set screw mandrel chuck or adapter including a rotatable cylindrical section with at least one locking aperture defined thereon;

FIG. 33 is a side plan view of a further alternative embodiment of the present invention showing a set screw mandrel chuck or adapter including a rotatable cylindrical section with at least one locking aperture defined thereon;

FIG. 34 is a side plan view of an embodiment of the present invention showing a double sleeve keyless chuck or adapter with a cylindrical mounting surface defining at least one locking aperture thereon;

FIG. 41 is a side plan view of a power tool with a conventional keyless chuck with a further alternative adapter according to an embodiment of the present invention mounted thereto wherein the adapter itself comprises a keyed mounting chuck with a male ended adapter;

FIG. 42 is a side plan view of an embodiment of the present invention showing an impact wrench with a double sleeve keyless chuck with a socket end mounted thereto, which includes a rotatable cylindrical section with at least one locking aperture defined thereon;

FIG. 43 is a side plan view of a power tool with a keyless chuck and a double sleeve keyless adapter mounted thereto which defines the cylindrical rotating surface with at least one locking aperture thereon according to an embodiment of the present invention;

FIG. 44 is a locking pin according to an embodiment of the present invention showing an optional locking pin notch in the upper end thereof to facilitate maintenance of biasing engagement between the resilient biasing means and the locking pin;

FIG. 45A is an exploded view of a collet adapter assembly according to an embodiment of the present invention;

FIG. 45B is an exploded view of a collet chuck assembly according to an embodiment of the present invention;

FIG. 46A shows the collet adapter assembly of FIG. 45A after assembly;

FIG. 46B shows the collet chuck assembly of FIG. 45B after assembly;

FIG. 54 and FIG. 94 are cross sectional drawings of still another embodiment of the present invention having a collar of polygonal prism shape;

FIGS. 91-98 are variations of the attachment shown in FIG. 90.

OVERVIEW

Figure 1:
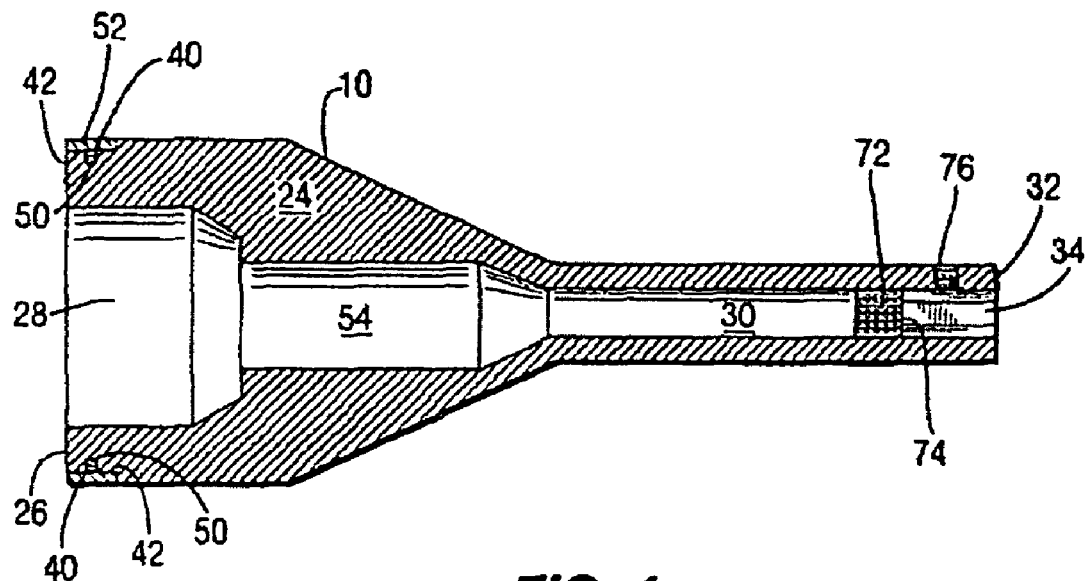
FIG. 1 is a sectional view of an attachment device according to an embodiment of the present invention, showing a protective ring and an enlarged intermediate cavity.

Examples are provided below, which allow the easy use of two different bits or other bit devices with a single power tool without requiring disengagement of either bit when used over and over in an alternating fashion. The term "bit device," as used herein is not limited to drill bits, but includes many other rotatable devices having an end adapted to be secured to a rotating power tool, such as a drill, screw gun, cordless screw driver, or the like. Such bit devices include, but are not limited to: drill bits, screw driver bits, countersinks, hex wrenches, nut drivers, holesaws, abrasive discs, wire wheels, or the like.

An exemplary apparatus provides a means for facilitating the changeover from one bit device to another and can be useful for rapidly and repeatedly transferring between two modes (e.g., between drilling mode and fastener driving mode) using a single power tool without requiring disengagement of any bits from the bit retaining means.

One exemplary apparatus provides improved attachments having a housing, which defines a mounting end at one end thereof, and a forward end for either drilling or driving at the opposite end thereof. A mounting cavity is defined within the mounting end of the housing and faces outwardly therefrom. This mounting cavity is adapted to receive and detachably retain a cylindrical or generally cylindrical mounting section of the rotatable chuck of a power tool or an adapter mounted thereto. The mounting surface is preferably cylindrical and approximately 0.75 inches in diameter. The rotatable chuck or adapter is preferably designed to receive a first bit device detachably mounted therein.

In some embodiments, a forward cavity is also defined in fluid flow communication with respect to the mounting cavity which is adapted to be able to receive a portion of a first bit device therewithin responsive to attachment of the generally cylindrical mounting section of a rotatable chuck or the generally cylindrical mounting section of an adapter within the mounting cavity. In other embodiments, the mounting cavity is extended and is long enough to receive the first bit device, and a distinct reduced-diameter forward cavity is not needed.

The forward end of the attachment includes a forward bit securement device therein for detachably receiving and retaining a second bit device. The first and second bit devices can comprise many different types of bits, such as conventional twist drill bits or other drill bits, or fastener driving bits such as slotted head driving bits, square head driving bits, Phillips head driving bits and nut setters. In one preferred method of usage of the exemplary apparatus, the first bit device will be used for drilling pilot holes and the second bit device will be used for driving of the fasteners into the associated pilot holes. This is a common construction activity that otherwise might require the time consuming repeated switching between two bit devices.

Other combinations of first and second bit devices that are useful for other tasks will be readily apparent to one of ordinary skill in the art in view of the examples herein. For example, using a drill bit as the first bit device, a countersink or counterbore may be used as a second bit device.

In some embodiments, the housing preferably defines an annular groove at a position extending around the mounting cavity and an annular slot which extends peripherally around the mounting cavity and also around the outer periphery of the annular groove. In some embodiments, at least one locking pin device is movably mounted within the housing and is adapted to be positioned extending into the mounting cavity to be selectively movable at least partially into the mounting cavity itself for extending thereof into a locking aperture to facilitate detachable engagement therewith, to secure the cylindrical mounting section of the rotatable chuck of the power tool or of the adapter with respect to the mounting cavity of the housing. The locking pin can also be positioned extending into the annular groove to facilitate biasing thereof inwardly.

A resilient biasing means, such as a circular spring means, may be positioned within the housing in such a manner that it extends around the mounting cavity. An annular slot can be defined in the housing extending around the circular spring means. A capping ring, preferably made of aluminum, can be positioned within the annular slot extending over the circular spring means to facilitate retaining thereof beneath the ring as well as also for safety purposes. The resilient biasing device or circular spring can be adapted to be brought into abutment with respect to each locking pin for resiliently urging thereof inwardly toward a locking aperture defined in or on the cylindrical mounting section of a rotatable chuck or adapter responsive to positioning thereof within the mounting cavity to facilitate detachable engagement therebetween. Each locking pin can optionally also include a notch in the portion thereof that abuts the resilient biasing means to facilitate the exertion of biasing force thereagainst.

This capping ring can act as a protective cap to facilitate retaining of the resilient biasing means in position in biasing abutment with respect to the locking pin or pins. The capping ring can also be positioned extending around the annular groove with the resilient biasing spring positioned therewithin to facilitate securement of the biasing means within the annular groove to prevent it from extending partially outwardly therefrom during powered rotation of the attachment. If a circular spring is used as the biasing means, retention of the resilient biasing means within the housing or within the annular groove can be important when the attachment is rotating at high speeds, at which times it has a tendency to be released or to partially extend outwardly from the rotating attachment which could be dangerous to the operator or nearby persons (although the method of retaining the circular spring may be varied).

In other embodiments, the design of the biasing means can inherently avoid risk of outward extension during rotation of the attachment, and the capping ring may be omitted. Even with the circular spring, the capping ring is not necessary.

It should be appreciated that, using the exemplary embodiment, the power tool, with which the attachment is usable, is normally a hand drill or other similar tool with a rotatable chuck designed to retain therewithin a bit device such as a drilling and/or driving member. To construct various different configurations of the more common of the currently available power tools with rotatable chucks, some embodiments of the present invention can also include an adapter device which is designed to hold a first bit which can be used for drilling or driving or other operations. Engagement of the chuck or adapter with respect to the attachment mechanism according to these embodiments of the present invention will facilitate quick changeover between different bits in order to produce various construction operations such as, but not limited to, drilling and driving.

Some embodiments include an intermediate cavity positioned between the forward cavity and the mounting cavity which is in fluid flow communication with both. This cavity is designed to allow bit devices of larger diameter than conventional round twist drill bits to be positioned in the main chuck mounting device or adapter. By making this intermediate cavity larger in diameter than the forward cavity, larger first bit devices can be utilized without requiring that first bit device to be removed when the attachment is placed in engagement with the cylindrical mounting surface of the chuck or adapter. There are a number of examples of such larger bit devices commonly used now such as a drill bit with a countersinking attachment or a drill bit with a self-centering guided device mounted thereon and many others. Others might include a drill bit with a collet adapter or drill bits with hex-shaped drive shanks. Also some embodiments of the present invention are usable with a nut or hex driver bit chosen as the first bit device and these bits can be larger in diameter than standard twist drill bits. This intermediate cavity allows an attachment according to an embodiment of the present invention to be usable with the various configurations of larger diameter bit devices. Preferably this intermediate cavity is larger than the forward cavity but smaller than the mounting cavity to facilitate this manner of usage.

The resilient biasing device is preferably a circular spring which is split at one location therealong to define a first spring end section and a second spring end section spaced somewhat apart but fairly close to being adjacent. It is desirable that this circular spring be prevented movement about the axis along the annular groove, if the two spring end sections are the portions of the springs that are in abutting contact with the locking pins for maintaining biasing thereof in a generally inward direction toward the cylindrical mounting section. For this purpose an anti-clocking pin can be included which will be fixedly secured in a position between the first spring end and the second spring end to minimize movement of the circular spring axially around the attachment and in this manner maintain the proper desired alignment between the circular spring and the locking pins. With configurations including the annular groove, the anti-clocking pin will preferably be pressed into the groove between the first spring end section and the second spring end section of the circular spring. Many other manners of securement of the optional anti-clocking pin into the annular groove are contemplated in some embodiments according to the present invention, such as threaded engagement. The anti-clocking pin is optional in embodiments of the present invention, since other means of preventing clocking are also contemplated, such as a shoulder protruding from the housing which restricts clocking movement of the spring in the annular groove. Preferably two locking pins are included which extend inwardly toward the mounting cavity such as to be angularly oriented obliquely with respect to the radial direction thereof. These two locking pins are preferably spatially disposed from one another and angled obliquely in opposite directions to facilitate engagement with one or more apertures for engaging a locking aperture defined in the cylindrical mounting section irrespective of whether the cylindrical mounting section is rotated in the clockwise or counterclockwise direction during engaging movement thereof. Inward movement of the two locking pins can be limited by a shoulder construction for each. A first shoulder can limit the radially inwardly directed movement of the first locking pin and is defined by the housing. The housing can also define a second shoulder positioned adjacent to the second locking pin which limits the radially inwardly directed movement thereof.

Some embodiments of the present invention can also include a guide sleeve device mounted on the housing adjacent to the forward end which is telescopically movable longitudinally with respect to the housing between a retracted storage position which encircles the housing adjacent the forward end thereof and an extended operative position extending forwardly from the forward end of the housing. In this manner, the guide sleeve will be movable to the extended operative position in order to surround a second bit secured to the forward end of the housing to facilitate maintaining proper alignment thereof for use. Thus, the guide sleeve apparatus can be useful in those situations where the second bit secured to the forward end of the housing by the forward bit securement means is chosen to be a fastener driving bit. With the guide sleeve device in the extended operative position, it can surround a fastener driving bit for facilitating engaging of a workpiece (e.g., a fastener) when driving it. A magnetic retaining means can also be included within the forward cavity to facilitate securement of various different types of second bit devices therewithin. A set screw may also be included to facilitate securement of a second bit to the forward end of the housing by the forward bit securement means.

The apparatus according to some embodiments of the present invention is usable with power tools provided with chucks which have conventional key operated locking mechanisms for holding bits secured therewithin. However, other embodiments of the present invention are usable with many types of chucks for a power tool by the inclusion of an adapter device mounted in the original equipment chuck of the power tool which includes the cylindrical or generally cylindrical mounting section and defines at least one locking aperture in this cylindrical mounting section which allows securement of the attachment device according to an embodiment of the present invention thereto for facilitating use of the unique bit holding apparatus. With this configuration, the adapter becomes an integral component of the improved bit holding apparatus and greatly widens the various modes of uses of various apparatus according to embodiments of the present invention.

An example of an improved bit holding apparatus is described below, which is usable with a power tool for facilitating detachable mounting of two different bit devices thereto, such as for example, a drilling bit device and a fastener bit device, wherein use with various sizes of drilling devices or variously configured fastener driving devices is made possible.

An example of an improved bit holding apparatus is described below, which is usable with a power tool for facilitating detachable mounting of multiple bit devices with respect thereto such as a drilling device and a fastener driving device with respect thereto, wherein use is possible with drill bits having countersinking devices, self-centering guided devices, and collet adapters which can include various drive shank configurations such as hex-shaped drive shanks and many others.

An example of an improved bit holding apparatus is described below, which is usable with power tools for facilitating detachable mounting of a drilling device and a fastener device with respect thereto wherein rapid changeover between drilling and driving bit devices, or two different drilling devices, or two different driving bit devices or many other combinations of bit devices is facilitated with power tools having many types of original equipment chuck mechanisms.

An example of an improved bit holding apparatus is described below, which is usable with a power tool for facilitating detachable mounting of various bit devices such as drilling devices and/or a fastener devices or others with respect thereto wherein cost is minimized.

An example of an improved bit holding apparatus is described below, which is usable with a power tool for facilitating detachable mounting of various different types or sizes of bit devices with respect thereto wherein maintenance requirements are minimal.

An example of an improved bit holding apparatus is described below, which is usable with a power tool for facilitating detachable mounting of bit devices such as drilling devices and/or a fastener devices of various sizes and configurations with respect thereto, wherein usage with many different types of powered tools having rotatable output is possible.

An example of an improved bit holding apparatus is described below, which is usable with a power tool for facilitating detachable mounting of many different types and sizes of drilling devices and fastener devices is possible, wherein the safety considerations of such high speed rotating chucks is actively controlled.

An example of an improved bit holding apparatus is described below, which is usable with a power tool for facilitating detachable mounting of various bit devices with respect thereto wherein use with many different types of chucks is made possible such as use with a keyless chuck or keyed chuck.

An example of an improved bit holding apparatus is described below, which is usable with a power tool for facilitating use of two different bit devices with respect thereto wherein use with many types of power tools is possible regardless of the particular means for powering thereof.

An example of an improved bit holding apparatus is described below, which is usable with a power tool which can be used for facilitating detachable mounting of a drilling device and/or a fastener device with respect thereto and which enables a person to purchase a chuck and mount it directly to a power tool or to purchase an adapter and mount it to a power tool chuck that they might already own.

DETAILED DESCRIPTION

FIG. 1 shows an improved bit holding attachment device 10 which is particularly usable for alternately drilling pilot holes and driving fasteners 38 therein. It can also be implemented for use of many other different combinations of bit devices such as drilling and drilling, driving and drilling or driving and driving. This can provide universal utility in a variety of applications. The attachment 10 can hold one bit detachably securable to the cylindrical portion 18 of the adapter 78 or chuck 14 and the adapter 78 or chuck 14 will, itself, hold the other bit. Alternating usage of the two held bit devices 22 and 36 is achieved by alternately mounting the attachment 10 for allowing operation of the second bit device 36 and alternately removing the attachment 10 for allowing use of the first bit device 22. Thus, it is certainly much faster and easier to merely remove or secure the attachment 10 with respect to the cylindrical surface 18 of the chuck 14 or adapter 78 to change bit devices, than it would be to actually change the bit mounted in the chuck 14 each time a change is needed.

The attachment also and more generally can be used for quickly switching between two bit devices of most configurations and is usable with a power tool 12 having a rotatable device such as a chuck 14, keyless chuck 16, set screw mandrel 84, or possibly also an adapter 78, which includes a rotatably driven generally cylindrical mounting section 18 defining at least one locking means, such as a locking aperture 20 thereon. One particular example of an adapter—a collet adapter 94—is discussed below in the section describing FIG. 45A.

The rotatable chuck 14 (The reference numeral 14 is used herein generally to refer to any kind of rotatable chuck, and is not limited to keyed chucks) of the power tool 12 is defined to receive an attachment 10 secured with respect thereto. For securement the rotatable chuck 14 will preferably include a cylindrical mounting surface 18 thereon of approximately 0.75 inches in diameter. Some such original equipment manufactured power tools do not include a generally cylindrical mounting surface 18 with a locking aperture 20 defined therein (for example, at or recessed below the generally cylindrical mounting surface) or thereon (for example, at or above the generally cylindrical mounting surface) because of the advent of more common usage and availability of keyless rotatable chucks 16, both single sleeved and double sleeved. The exemplary embodiments use such a cylindrical mounting surface 18 or a generally cylindrical mounting surface in order for the attachment 10 to be securable thereto. (A generally cylindrical surface may, for example, take the form of a cylinder, or a cylinder having one or more flat or concave longitudinal surfaces between the locking apertures, or circumferential concave surfaces that do not coincide with the locking apertures. Alternatively, a generally cylindrical mounting surface may be in the form of a cylinder having one or more concave dimples). Thus, a generally cylindrical surface as defined herein may be a cylinder with or without surface features such as flat surfaces, dimples, concave surfaces, grooves, or the like.

Some exemplary embodiments include drills having chucks 14 which require chuck keys for tightening of articles such as bits within the jaws thereof or keyless chucks 16, adapters 78 or set screw mandrels 84 which themselves define cylindrical mounting surfaces 18 with at least one or more locking apertures 20 therein or thereon.

An older design was shown in U.S. Pat. No. 3,484,114 by E. A. Rodin on a "Screw Installing Attachment For Power Tools" patented Dec. 16, 1969. The embodiments described herein include improvements over that design.

An adapter 78 may be detachably securable with respect to the rotatable chuck 14 of a power tool 12 directly or with respect to the rotatable keyless chuck 16 to provide a means for mounting of various different bit devices 22 therewithin while at the same time also providing the rotatably driven cylindrical mounting surface 18 with at least one locking aperture 20 therein or thereon. The inclusion of at least one locking aperture 20 will facilitate the rapid mounting and dismounting of the attachment 10 with respect to adapter 78 for allowing the driving of individual fasteners 38 into pilot holes immediately after each hole is individually drilled. This is just one of many possible manners of usage of the exemplary apparatus.

The attachment 10 includes a housing 24 which defines a mounting end 26 on one end thereof and a forward end 32 on the opposite end thereof. The housing 24 is designed to be detachably securable to a rotatable cylindrical mounting surface 18 which defines at least one locking aperture 20 thereon for facilitating such detachable securement.

Figure 4:
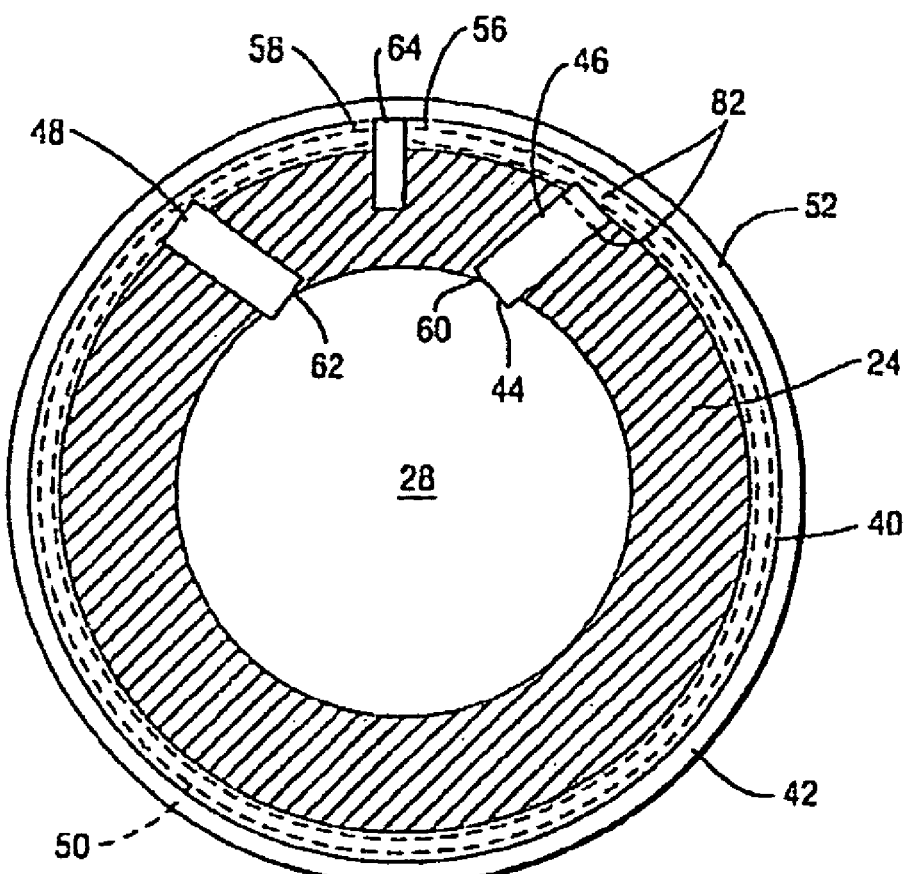
FIG. 4 is a cross-sectional view of an embodiment of an attachment device according to an embodiment of the present invention, showing the circular spring biasing the locking pins inwardly into the mounting cavity with an anti-locking pin in position between the ends of the spring.

The mounting end 26 of the housing 24 will preferably define a mounting cavity 28 therewithin which is open and faces outwardly therefrom. This mounting cavity 28 will preferably be round in cross-section and will be adapted to receive the cylindrical mounting surface 18 therewithin. The mounting cavity preferably includes one or more locking pins 44 therein which are radially biased inwardly by a resilient biasing means 50 such as a circular spring such that they can extend into the mounting cavity 28 and further into an adjacently positioned locking aperture 20 defined in the cylindrical mounting surface 18 for engagement therein or thereon when positioned within the mounting cavity 28. In this preferred embodiment, the locking pins 44 are biased inwardly by circular spring 50 such that one of them will extend at least partially into a locking aperture 20 for engagement therewith. In some embodiments, two locking pins 44 will be included such that they are angled radially in opposite oblique directions to facilitate locking thereof into an adjacent locking aperture 20 when engagement is achieved by either clockwise or counterclockwise rotation of the attachment 10 during engaging movement thereof relative to the cylindrical mounting surface 18. The first locking pin member 46 will engage a locking aperture 20 responsive to counterclockwise rotation of the attachment 10 as shown in FIG. 4. On the other hand, the second locking pin member 48 will engage a locking aperture 20 responsive to clockwise rotation of the attachment 10 as shown in FIG. 4.

Thus, the attachment device 10 will be detachably and yet firmly secured upon the cylindrical mounting surface 18 of a rotatable chuck 14, keyless rotatable chuck 16, set screw mandrel 84 or an adapter 78. As such, the attachment device 10 will rotate simultaneously with the cylindrical mounting surface 18 until forcibly detached by a user by rotating the attachment 10 relative to the surface 18 such that the engaged locking pin 44 will be withdrawn from the locking aperture 20 with which it is engaged thereby allowing disengagement of the mounting cavity 28 of the attachment 10 from locking aperture 20. Preferably, the locking pin 44 will include a first locking pin member 46 angularly oriented in a first direction and a second locking pin member 48 angled oppositely. Both first locking pin member 46 and second locking pin member 48 are capable of engaging a locking aperture 20. By orienting the two locking pins 46 and 48 oppositely, positive engagement between the mounting cavity 28 of the attachment 10 and the cylindrical mounting surface 18 will be achieved regardless of whether the rotational chuck 14, keyless rotatable chuck 16, set screw mandrel chuck 84 or adapter 78 is being rotated in the counterclockwise or the clockwise direction, as described above. In either case, at least one of the two locking pins 46 and 48 will be brought into engagement with a locking aperture 20 defined in the cylindrical mounting surface 18. The resilient biasing means 50 can comprise a circular spring as described above, however, other types of springs and biasing members are also contemplated for usage in other embodiments. For example, the resilient biasing means 50 could include a small individual compression spring associated with each individual locking pin 44 or many other possible resilient biasing devices.

Exemplary embodiments are provided which safely retain the circular spring or resilient biasing means 50 with respect to the housing 24 of the attachment 10. For this reason an annular groove 40 may preferably be included which is defined about the surface of housing 24 at a position extending peripherally around the outside of the mounting cavity 28. With the circular spring 50 positioned in the annular groove 40 it will be brought into abutment with respect to the outermost ends of the locking pins 44 to facilitate resilient biasing thereof inwardly toward the mounting cavity 28 in such a manner that each of the one or more locking pins 44 are ready to engage a locking aperture 20 defined in or on the cylindrical mounting surface 18.

Also, to facilitate engagement between the one or more locking pins 44 and the circular spring 50, individual notches 82 may be defined in the outer tips of each of the locking pins 44. In this manner the circular spring 50 will abut each notch 82 to facilitate engagement with respect to the adjacent locking pin 44. For a configuration as shown in FIG. 4, the locking pins 44 preferably will not extend beyond a predefined distance into the mounting cavity 28, and for this reason a first shoulder 60 and a second shoulder 62 may optionally be defined in the housing 24 to limit the extent of inward movement of the first locking pin 46 and the second locking pin member 48, respectively. Other configurations for biasing are contemplated for the construction of the resilient biasing means 50 such as individual springs mounted in the housing 24 and other such configurations which might not necessarily require the specific inclusion of the annular groove means 40.

Figure 2:
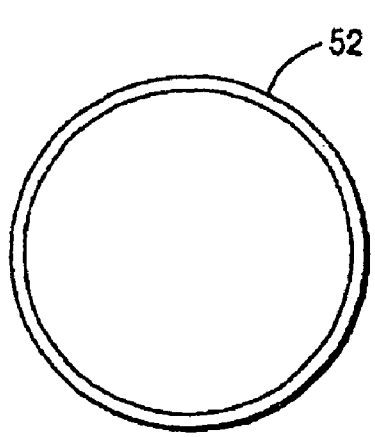
FIG. 2 is an end view of an embodiment of a capping ring according to an embodiment of the present invention.
Figure 3:
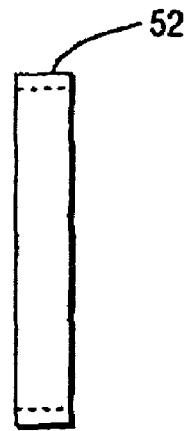
FIG. 3 is a side cross-sectional view of an embodiment of a capping ring according to an embodiment of the present invention.

With usage of the circular spring 50 as the resilient biasing means, it is further preferable that it be safely retained to the attachment 10 and/or within the annular groove 40 by a suitable retaining means. This can be achieved, for example, by the housing 24 including an annular slot 42 extending outside of and peripherally around the annular groove 40. A retaining means in the form of a capping ring 52, as shown best in FIGS. 2 and 3, can be positionable within the annular slot 42 to extend like a cap over and preferably adjacent the upper portion of the annular groove 40 in such a manner that the circular spring 50 is retained therewithin and cannot be released therefrom for safety purposes, nor can it move to a position extending partially outwardly therefrom such that it could be dangerous whenever the cylindrical mounting surface 18 is rotating, especially at high speeds. The rotatable chuck 14 of such power tools 12 or an adapter 78 can rotate at fairly high speeds in both rotational directions and in an embodiment having the circular spring 50, a safe and secure means for retainment of the circular spring 50 within the annular groove 40 can be utilized while at the same time allowing full flexibility and movement of the spring 50, such that it can achieve the proper inwardly directed bias against the one or more locking pins 44. The capping ring 52, if included, would preferably be made of an aluminum material, but other materials, such as various metals, plastics, or composites may be used. This is just one example, and in other embodiments, the annular groove 40 and annular slot 42 are not required.

In other embodiments (not shown), the annular slot 42 is omitted, and the outer circumference of the circular spring 50 is greater than the outer circmference of the housing 24. In some embodiments without the annular slot 42, a retaining means in the form of a capping ring has an outer diameter greater than the outer circumference of the mounting end of the housing 24 and greater than the outer circumference of the spring 50. The capping ring also has an internal slot sized to receive the circular spring 50 and an inner diameter large enough to fit snugly over the mounting end of the housing 24. The circular spring 50 is compressed to a diameter smaller than the inner circumference of the capping ring during assembly. Once the circular spring 50 seats inside the internal slot of the capping ring, the circular spring expands to a diameter greater than the circumference of the housing, while an inner diameter off the circular spring is still less than the outer diameter of the housing 24. Thus, the circular spring 50 prevents the capping ring 52 from sliding longitudinally along the housing, at the same time that the capping ring prevents the circular spring from releasing radially.

Figure 50:
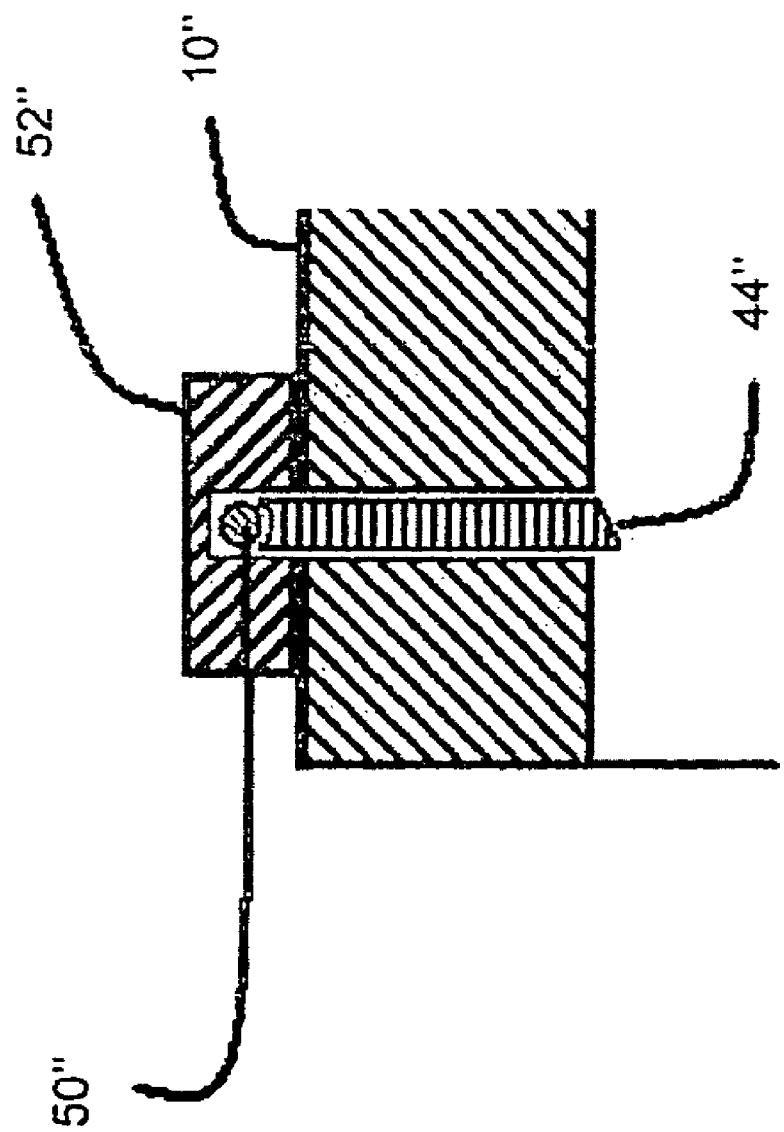
FIG. 50 is a cross sectional view of a feature of an embodiment of a bit holding attachment.

In other embodiments, both the slot 42 and groove 40 may be omitted. FIG. 50 is an example of one such embodiment. In FIG. 50, the one or more pins 44" are biased by a resilient biasing means 50", which may comprise springs or elastomeric members, such as a circular spring, o-ring or a plurality of elastomeric balls, for example. The resilient biasing means 50" may be radially positioned entirely outside of the circumference of the housing 10", as shown in FIG. 50, within the circumference of the housing (not shown in FIG. 50), or straddling the circumference of the housing (not shown in FIG. 50). A capping ring 52" may be located entirely outside of the circumference of the housing 10".

The capping ring 52" is coupled to or integrally attached to the housing 10". A variety of methods may be used to assemble the capping ring 52" to the housing around the pins 44" and biasing means 50". For example, the pins may be pressed inward between halves of a customized plier-type tool having semi-circular jaws. Alternatively, the capping ring 52" may have a ramped (or cammed) inner surface (not shown) on at least one side to facilitate sliding the capping ring over the pins 44" and biasing means 50". The pins 44' may have a countoured surface adjacent to the biasing means 50", or a flat surface.

Alternatively, the retaining means may be in the form of a discontinuous ring. The housing may 24 may include a plurality of plug-receiving apertures distributed on the outer circumference thereof, along the annular groove 40. After the circular spring 50 is seated in the annular groove 40, retaining means in the form of a plurality of plugs or set screws are driven into the plug-receiving apertures, to contact the circular spring, and are thus located radially outward from the circular spring. The plugs or set screws form a discontinuous ring around the circular spring for retention thereof. If friction-fit plugs are used, the plug receiving apertures may be circular, rectangular, or other shape, so long as the plugs are of the same shape as the apertures into which they are placed.

Figure 5:
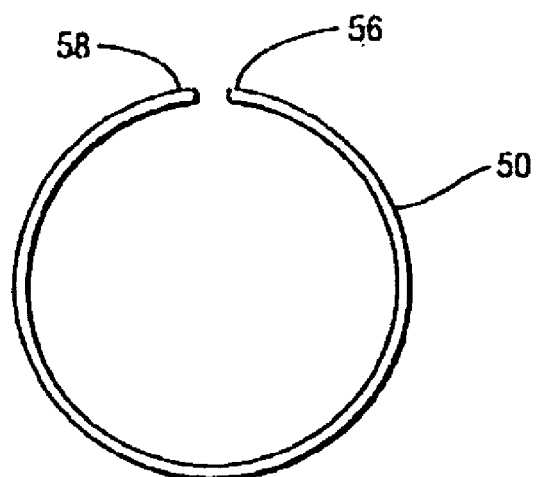
FIG. 5 is a plan view of an embodiment of a resilient biasing means or spring suitable for use in an embodiment of the present invention.
Figure 12:
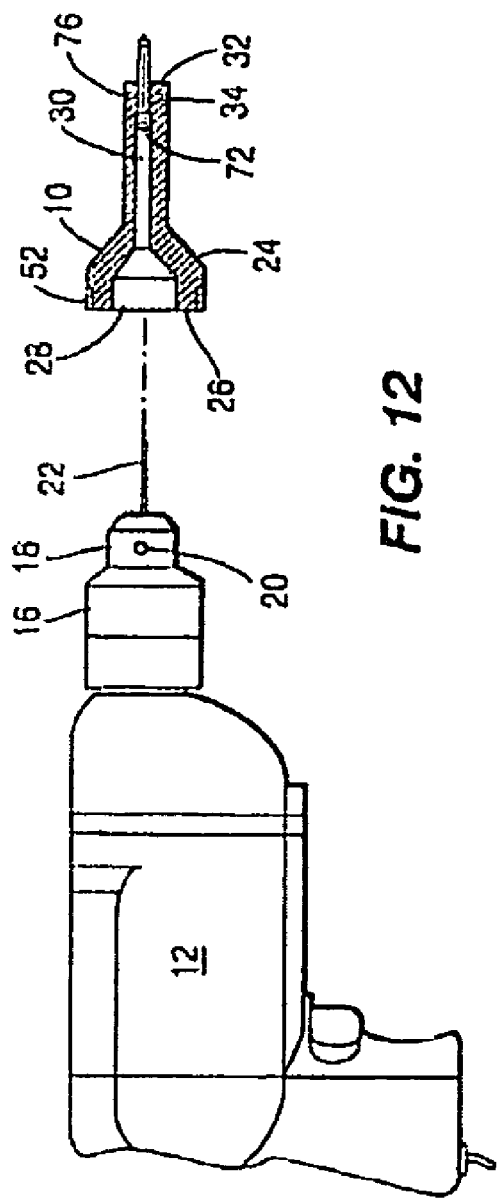
FIG. 12 is a side assembly view showing a power tool with an embodiment of a new rotatable keyless chuck and an embodiment of a new attachment device according to an embodiment of the present invention.
Figure 13:
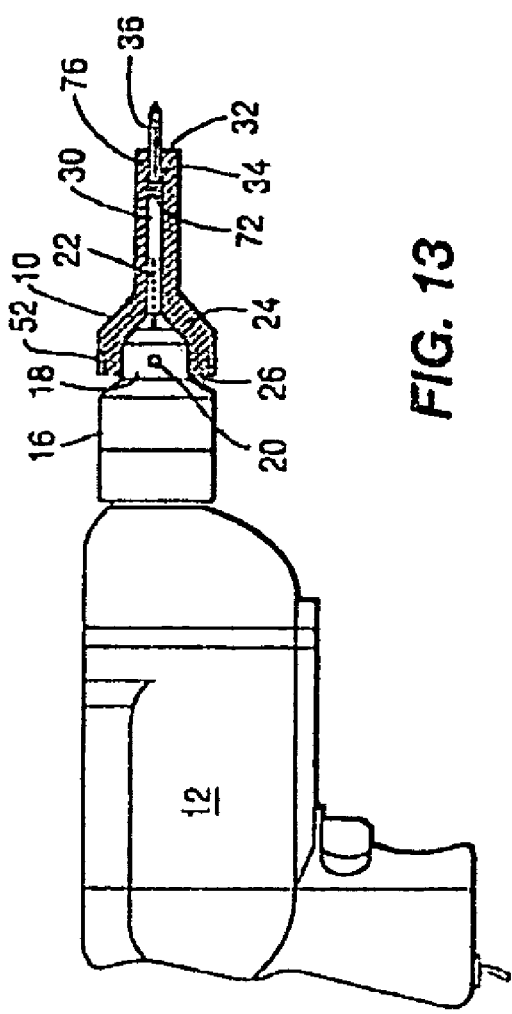
FIG. 13 is a cross-section of the embodiment shown in FIG. 12 with the attachment device installed.
Figure 14:
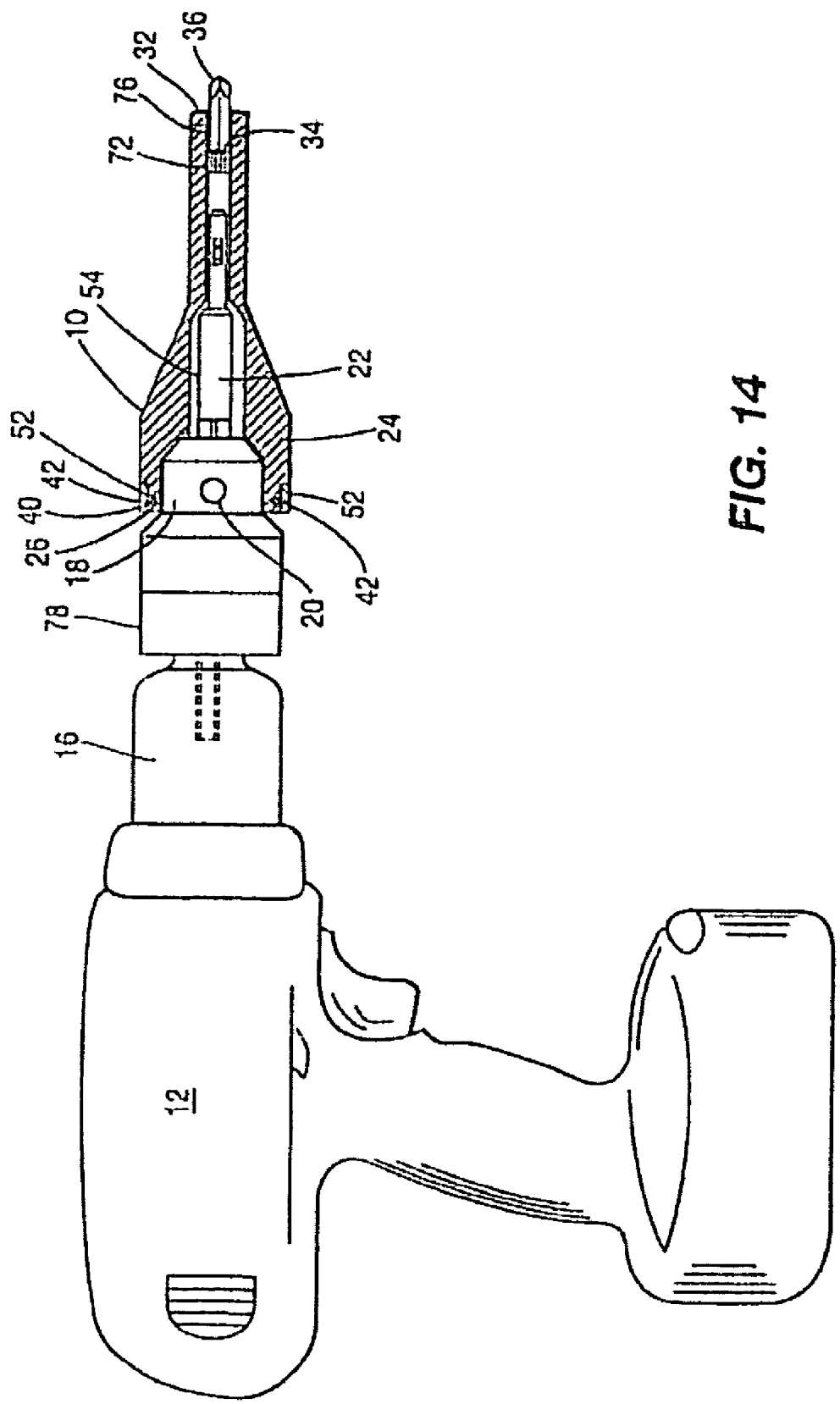
FIG. 14 is a side illustration of a power tool shown with an adapter mounted thereto including a cylindrical mounting surface for affixing with respect to the attachment device.
Figure 15:
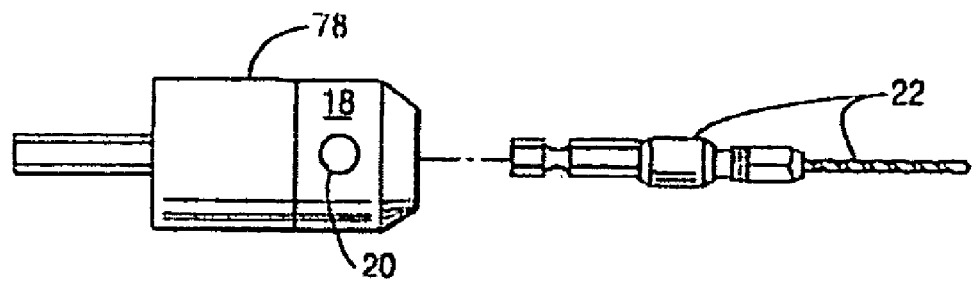
FIG. 15 shows a side view of an adapter or chuck used with an embodiment of the present invention shown securable with respect to a drill bit with a collet adapter.
Figure 16:
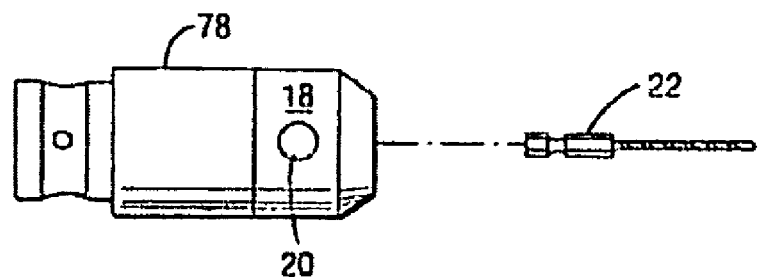
FIG. 16 is an alternative configuration for a chuck or adapter according to an embodiment of the present invention shown with a drill bit device having an integral mounting portion with a hex sided configuration which can include a socket end for impact drivers.
Figure 17:
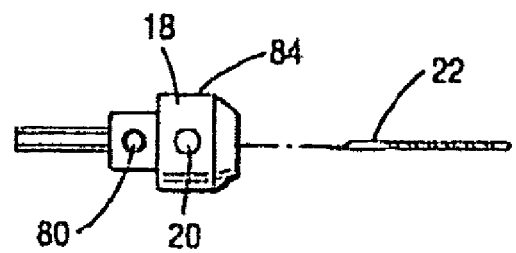
FIG. 17 is a side illustration of an embodiment of the present invention showing a set screw mandrel that takes a drill bit device with a slotted shank, which can also take a round twist drill or a hex shank drilling device or a hex shank driving bit or be otherwise driven.
Figure 18:
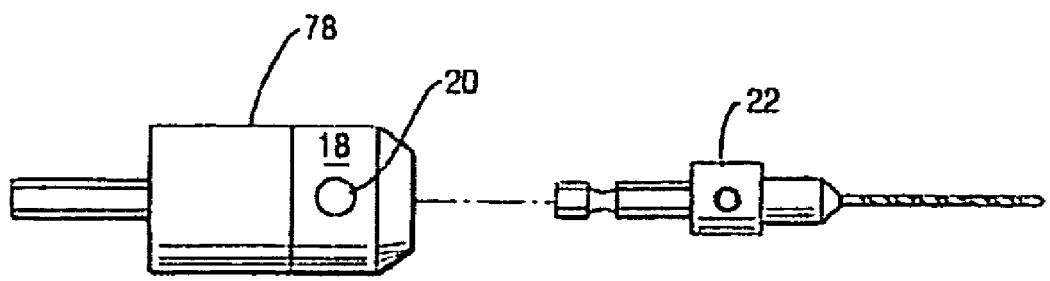
FIG. 18 is a side illustration of an embodiment of the present invention showing an adapter member or chuck shown securable with respect to a drill bit device which is hex driven or otherwise driven.
Figure 19:
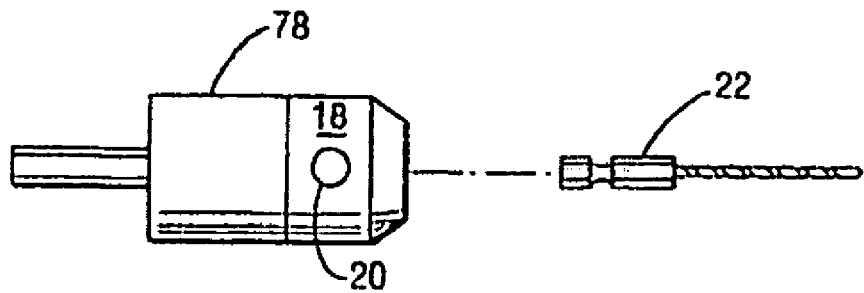
FIG. 19 is an alternative embodiment of an adapter or chuck usable with a bit device which is hex driven or otherwise driven.
Figure 20:
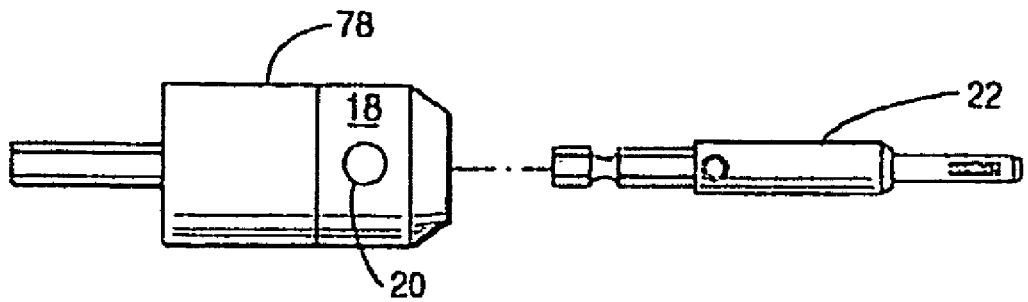
FIG. 20 is a side plan view showing an adapter or chuck securable with respect to a drill bit device with a self-centering guided sleeve.
Figure 21:
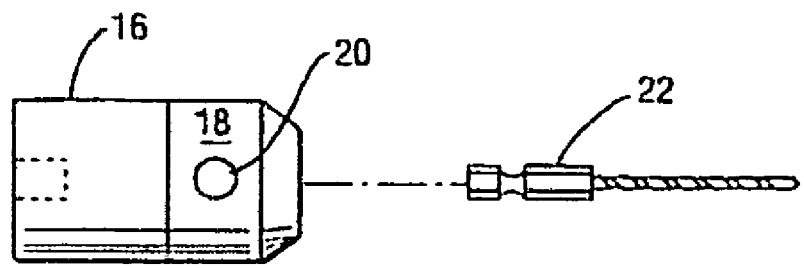
FIG. 21 is a side view of an embodiment of a keyless adapter or chuck shown securable with respect to a drill bit device with a hexagonal securement shaft attached thereto and a female drive engagement means.

In some embodiments the spring 50 is split along one portion thereof so as to define a first spring end section 56 and a second spring end section 58. This is best shown in FIG. 5. These ends 56 and 58 are defined to include the tips of the ends of the split spring 50 as well as the immediate areas of the spring 50 thereadjacent. These end section 56 and 58 may be adjacent to one another and may be spaced apart a small distance as shown in FIG. 5. These end sections 56 and 58 of the circular spring means 50 have greater flexibility than other portions thereof and it is preferable that the first spring end section 56 be positioned in engaging abutment with respect to a first locking pin member 46 for biasing it inwardly. Similarly it is desired that the second spring end section 58 be positioned in abutment with respect to the second locking pin member 48, if it is included, for further facilitating inwardly directed bias thereadjacent radially inwardly.

Although an embodiment is described above using a spring 50 as a retention means for the locking pins 46, 48, other embodiments use other means for retaining the locking pins. For example, the locking pins may be spring loaded pin assemblies (not shown), each having a housing with threads that allow the assembly to be screwed into female threaded holes in the wall of the mounting section 18, for retaining the spring loaded pin assemblies in the attachment device 10. Within the housings of the spring loaded pin assemblies, internal biasing springs may be provided for biasing the locking pins so as to project from the locking pin assemblies and engage the apertures 20 of the cylindrical mounting surface 18. Alternatively, spring loaded pins may be inserted into the openings in the wall of mounting section 18, and plugs may be securely pressed into place behind the spring loaded pins (e.g., by interference fit) to retain the spring loaded pins.

In other embodiments (not shown), the locking means on the generally cylindrical surface may include one or more spring loaded members or protuberances extending outwardly from the generally cylindrical surface, and the attachment 10 includes locking apertures to receive the spring loaded members or protuberances. In such embodiments, the spring loaded members or protuberances may have rounded edges, to reduce likelihood of damage or injury to any object or person inadvertently contacting the rotating cylindrical surface while the attachment 10 is not covering the cylindrical mounting surface (i.e., while the first bit means is being used).

Some embodiments include a means to maintain the circular spring 50 in the proper orientation by restricting rotational or clocking movement thereof with respect to the housing 24. This movement restriction can be achieved by the inclusion of an anti-clocking pin 64 positioned extending into the annular groove 40 and pressed, or otherwise affixed, therein at a location between the end sections 56 and 58 of circular spring means 50. In this manner the anti-clocking pin 64 will be capable of being brought into abutment with the first spring end section 56 and/or the second spring end section 58, thus preventing clocking movement thereof axially along the annular groove 40. In this manner, movement of the spring 50 will be restricted within the annular groove 40, which will therefore maintain engagement between the first spring end section 56 and the first locking pin member 46 as well as maintaining engagement between the second spring end section 58 and the second locking pin member 48. Clocking pin 64 can also be mounted with respect to housing 24 by most other common mounting means such as threaded engagement and other means.

In other embodiments, no anti-clocking pin is used. For example, in some embodiments, the spring 50 subtends an angle of 360 degrees or more, so that the spring exerts a retaining force on the pins regardless of any clocking movement of the spring.

In other embodiments, instead of a separate anti-clocking pin, an anti-clocking member is formed integrally as a part of the same piece of material from which the housing 24 is formed. For example, the spring may have an integrally formed, radially-oriented tooth or projection (not shown) that engages a mating receptacle in the attachment device 10, preventing clocking without using a separate pin. The anti-clocking member, radially oriented tooth or projection may have the shape of the anti-clocking pin 64, or other another shape that is adapted to prevent clocking motion.

Although some embodiments include two locking pins 46 and 48, other embodiments are operational with the inclusion of only one locking pin, either pin 46 or pin 48 although with constructions including only one pin would allow securement to the cylindrical mounting surface 18 only responsive to engaging rotation in one direction, namely either clockwise or counterclockwise, but not both.

The example shown in FIG. 4 includes locking pins 46, 48 that face inwardly, and are adapted for engaging the locking apertures of a conventional chuck. In other embodiments (not shown), a cylindrical or substantially cylindrical mounting surface includes outwardly facing pins, and the device 10 includes apertures to receive the outwardly facing pins.

The exemplary device 10 preferably also defines a forward cavity 30 which is designed to receive and retain a second bit device 36 secured thereto by a forward bit securement means 34. Often this second bit device will be a fastener driving means such as a hex, square or slotted screw driving bit. To facilitate the forward bit securement means 34 retention of a second bit device 36 therein, a hole means 74 will preferably be defined therein usually with a hexagonal cross-section. This hexagonal cross-section will facilitate securement of various second bit devices 36 such as fastener driving devices with hexagonal driving shafts integrally formed therewith or attached thereto. Also a magnet 72 for retaining the second bit device 36 with respect to the forward end 32 of housing 24 may also be included in various configurations. Many second bit devices 36 can easily be secured detachably to the forward end 32 of housing 24 when used with the hexagonal shaped mounting holes 74 adapted to receive them.

Figure 28:
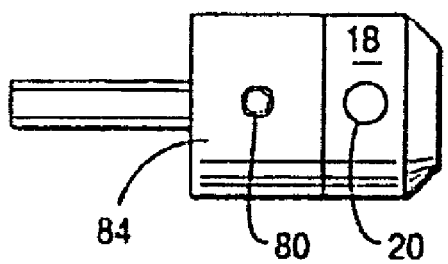
FIG. 28 is a side plan view of an embodiment of the present invention showing a chuck or adapter including a set screw.
Figure 29:
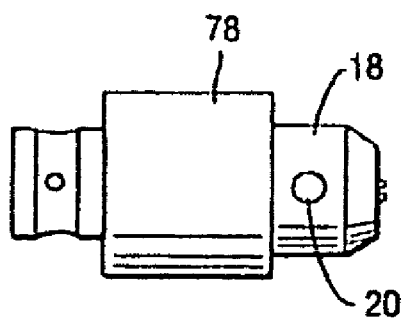
FIG. 29 is a side plan view of a keyless chuck or adapter with a socket end made in accordance with an embodiment of the present invention.
Figure 35:
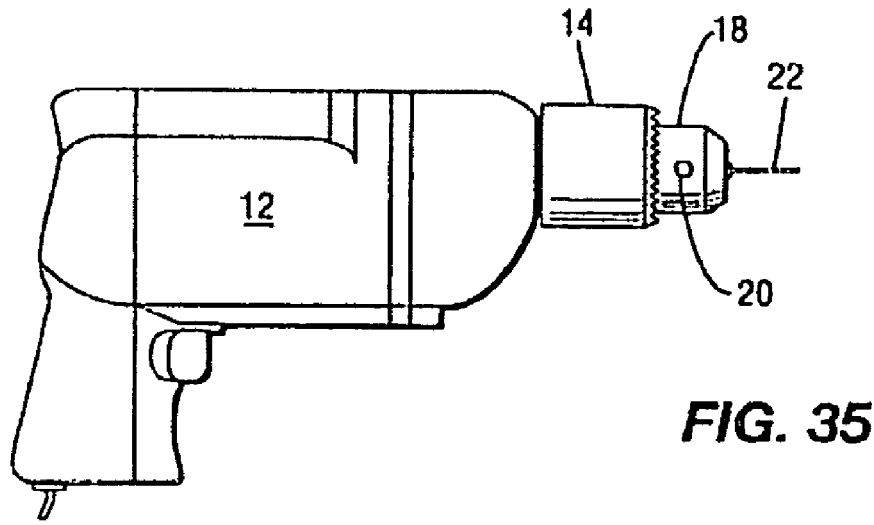
FIG. 35 is a side plan view of a conventional power tool with a conventional keyed chuck.

Other embodiments of attachment devices 10 can also include set screws 76 for further maintaining detachable securement therewith of the second bit devices 36. Also set screws 80 can be utilized particularly as shown in FIG. 28 to retain the bit devices 22 with respect to an embodiment of an adapter 78, a set screw mandrel 84, a rotatable keyless chuck 16 or a rotatable chuck 14 or 16. Such set screw bit retaining devices are usable with respect to various configurations of chucks 14, keyless chucks 16, mandrels 84 and adapters 78 as shown in various Figures included herein.

An intermediate cavity 54 may be included in some embodiments of the present invention as shown best in FIG. 1. This intermediate cavity 54 will preferably be located between the mounting cavity 28 and the forward cavity 30. The purpose of the intermediate cavity 54 is to allow the chuck 14, keyless rotatable chuck 16, set screw mandrel chuck 84 or adapter 78 to be capable of receiving those first bit devices 22 which can be larger than standard twist drill bits, particularly those devices which are larger in diameter. Such first bit devices 22 may include larger bits such as countersinking devices integral therewith, drill bits with self-centering guided enclosures or devices therearound, drill bits with collet adapters or drill bits with hex-shaped drive shanks or otherwise driven. All of these bits are generally slightly larger in diameter than conventional round twist drill bits. Furthermore the intermediate cavity will more readily receive nut, nut setter or nut head driver bits or other similar bits, which are usually larger in diameter than standard twist drill bits themselves.

Figure 1A:
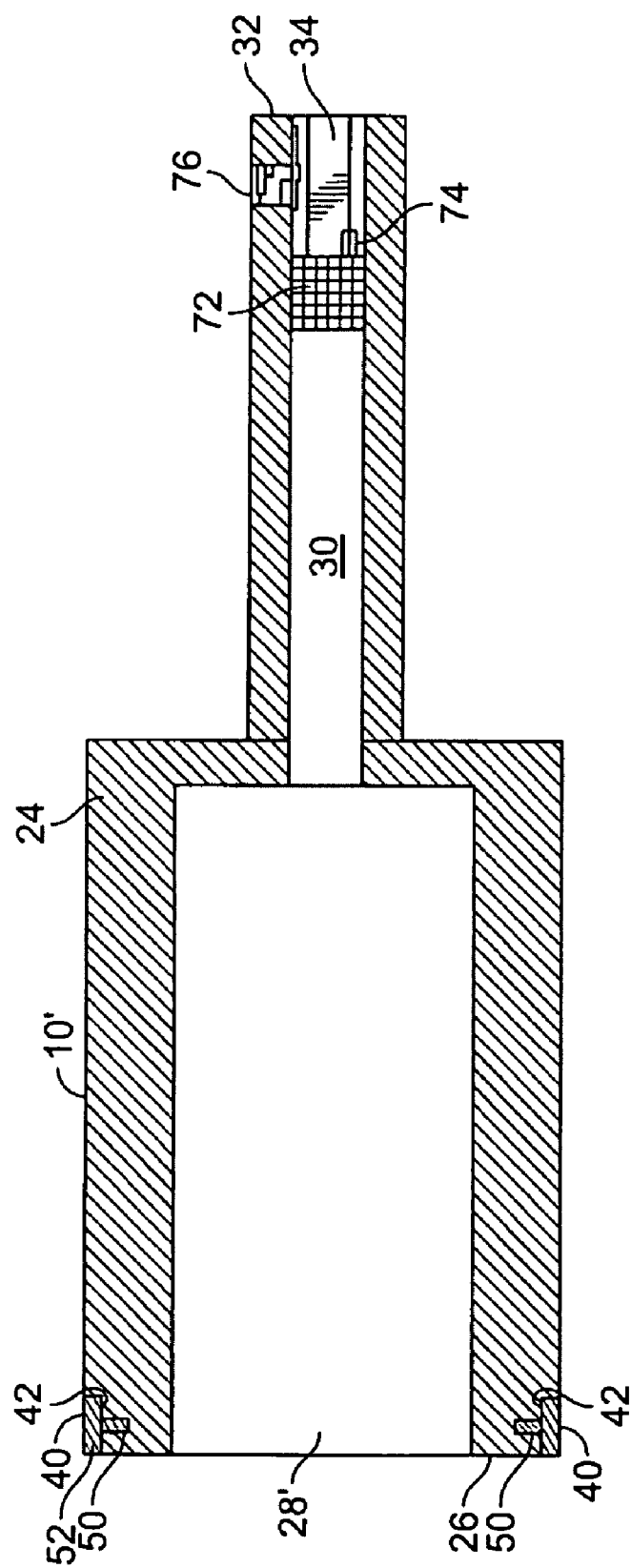
FIG. 1A is a sectional view of an embodiment of an attachment device without an intermediate cavity.

FIG. 1A shows an embodiment of bit attachment 10' without an intermediate cavity. In this embodiment, rather than providing an intermediate diameter cavity 54 between the forward cavity 30 and the proximal end of the attachment 10', an elongated mounting cavity 28' extends towards the distal end of attachment 10'. The elongated mounting cavity 28' may have a length that is approximately the sum of the length of the mounting cavity 28 and the intermediate cavity 54 shown in FIG. 1. The attachment 10' of FIG. 1A accommodates a wide variety of differently sized first bit devices 22.

Other embodiments comprise an optional sleeve means such as guide sleeve 66. One example of such a configuration is shown in FIGS. 9 and 10, including an add-on device 66 positionable around the forward end 32 of the attachment device 10. The guide sleeve 66 is initially oriented in the retracted storage position 68 as shown in FIG. 9 but is movable to the extended operative position 70 shown in FIG. 10, where it will be in surrounding engagement with respect to a second bit device 36 to facilitate use thereof. In this manner, for example, driving of fasteners into a substrate or other workpiece by a second bit device 36 which is a fastener driving bit device is greatly facilitated because the alignment of securement between the fastener driving bit and the fastener 38 is properly maintained. The guide sleeve 66 is preferably telescopingly movable with respect to the portion of the housing 24 which defines therewithin the forward cavity 30.

In some embodiments, the guide sleeve 66 has an extension limiting means, to prevent the guide sleeve from becoming separated from the attachment device 10 and lost. For example, the housing 24 may have a land, groove or detent for engaging a groove, ring or protrusion, respectively, on the inside of the guide sleeve 66.

Figure 36:
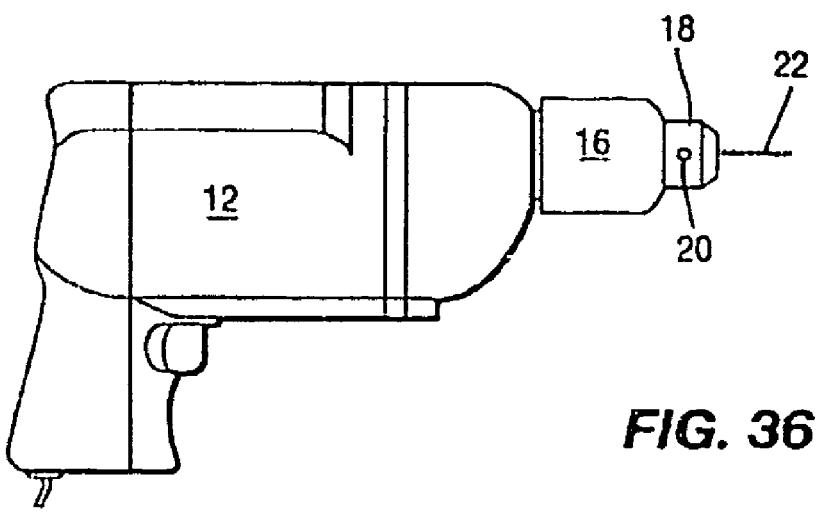
FIG. 36 is a side plan view of an embodiment of the present invention showing a power tool with a single sleeve keyless chuck mounted thereto, which includes a rotatable cylindrical section with at least one locking aperture defined thereon.
Figure 37:
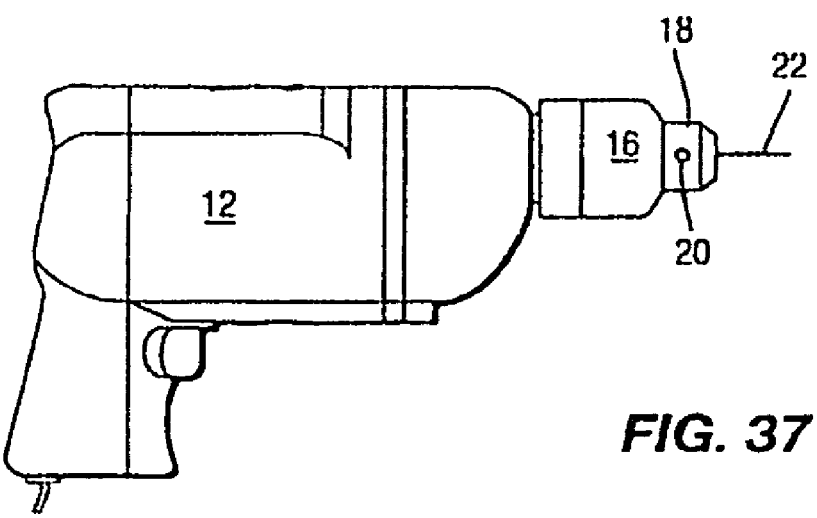
FIG. 37 is a side plan view of an embodiment of the present invention showing a power tool with a double sleeve keyless chuck mounted thereto, which includes a rotatable cylindrical section with at least one locking aperture defined thereon.
Figure 38:
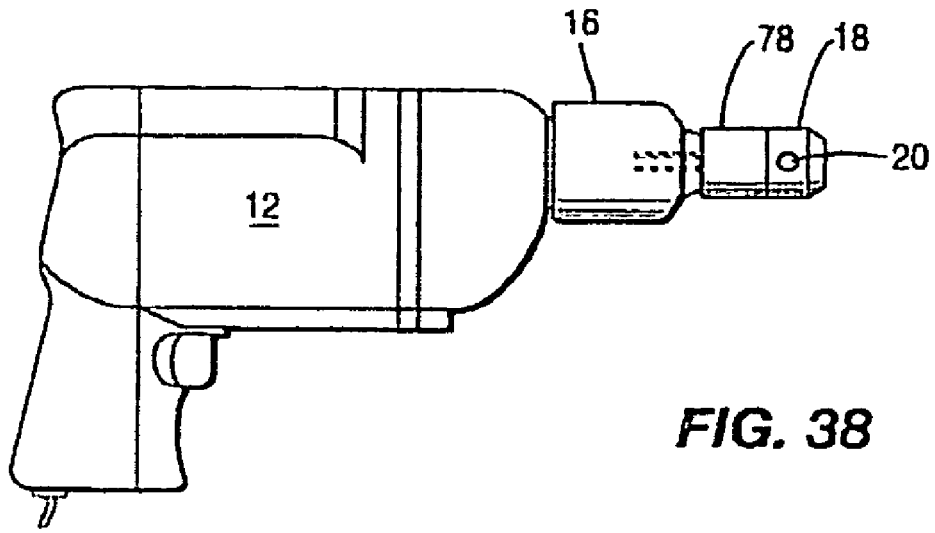
FIG. 38 is an illustration of a power tool showing a conventional keyless chuck, and also showing an adapter according to an embodiment of the present invention, mounted thereto for use in accordance with a method according to an embodiment of the present invention.
Figure 39:
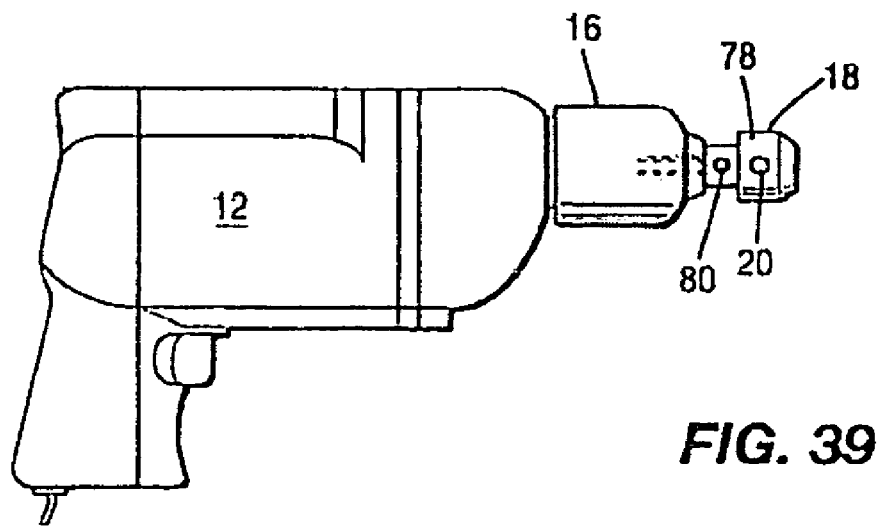
FIG. 39 is a side plan view of a power tool with a conventional keyless chuck with a further alternative embodiment of an adapter according to an embodiment of the present invention mounted thereto.
Figure 40:
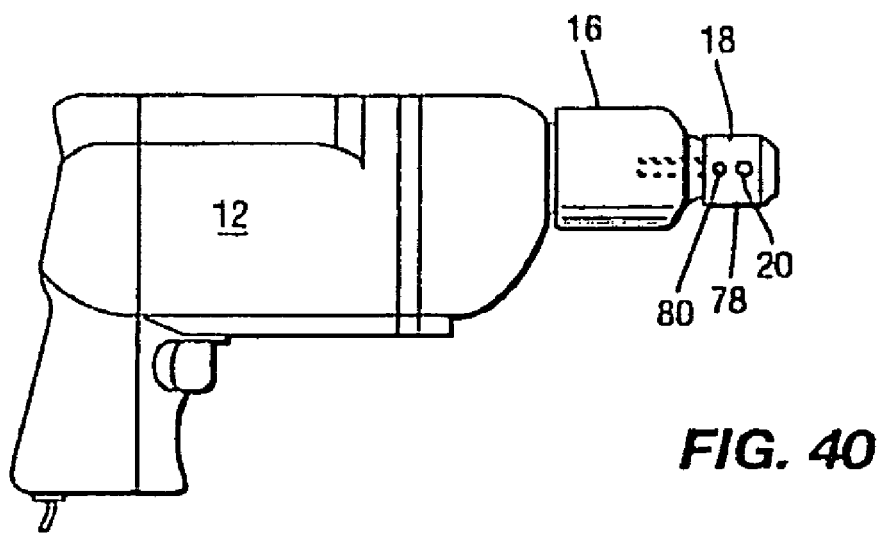
FIG. 40 is a side plan view of a power tool with a conventional keyless chuck with a further alternative embodiment of an adapter according to an embodiment of the present invention mounted thereto.

The exemplary attachment device 10 is designed to be usable with a conventional key operated chuck design. Such devices were once commonly used but in current times keyless chucks have become much more popular. As such, other embodiments include, as a component thereof, a keyless chuck 16 or adapter 78 with a cylindrical mounting surface 18 and at least one locking aperture 20 defined therein or thereon as shown best in FIGS. 36 through 40. FIG. 36 shows the single sleeve keyless chuck 16 and FIG. 37 shows the double sleeve keyless chuck 16, each of which includes the cylindrical mounting surface 18 with at least one locking aperture 20 defined therein or thereon. When this keyless chuck 16 or set screw mandrel 84 with a cylindrical mounting surface 18 is provided as a component or added item, the original equipment chuck from a power tool such as a drill or impact wrench could be removed and replaced thereby. Alternatively, the rotatable chuck 14, keyless chuck 16, or set screw mandrel 84 described herein can replace the original equipment chuck, or an adapter member 78 can be mounted in the original equipment chuck. An adapter 78 can be positioned within a single sleeve keyless chuck 16, wherein each of the adapters 78 has a different configuration, but each adapter 78 commonly defines a cylindrical or generally cylindrical mounting surface 18 with at least one locking aperture 20 defined therein or thereon. Thus, it should be appreciated that many of the chucks 14 with cylindrical mounting surfaces 18 and at least one locking aperture 20 defined therein or thereon can be also be used as adapters 78, and many adapters 78 can also be used as chucks 14 having cylindrical mounting surfaces 18, defining at least one locking aperture 20. For the purposes of this disclosure, the only difference between an adapter and a chuck is that a chuck is mounted directly into the power drill itself, whereas the adapter is mounted into some other chucking device which itself is mounted in the power tool. Thus, an adapter 78 can be mounted in any type of mated chuck in order to provide a rotating cylindrical mounting surface 18 with one or more locking apertures 20 defined therein or thereon that can mate with the mounting cavity 28 of an attachment 10 made in accordance with an embodiment of the present invention. That chuck, within which the adapter 78 is mounted, can be original equipment or a device provided in accordance with the teachings of this disclosure, or as a part optionally included with an apparatus according to an embodiment of the present invention.

Figure 22:
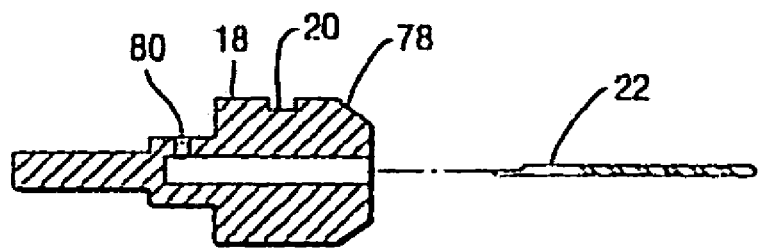
FIG. 22 is a side cross-sectional view of an embodiment of an adapter or chuck showing a set screw as the means for securement of the drill bit device therewithin.
Figure 23:
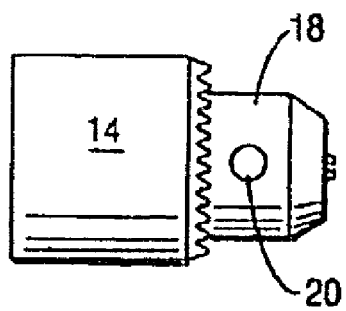
FIG. 23 is a side view of a conventional keyed chuck of the prior art.
Figure 24:
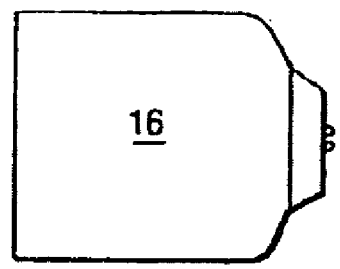
FIG. 24 is a side plan view of an embodiment of the present invention showing a single sleeve keyless chuck of the prior art.
Figure 25:
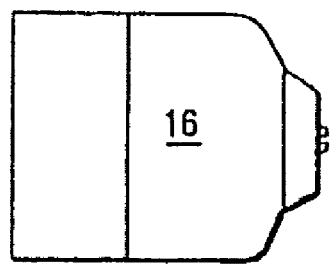
FIG. 25 is a side plan view of a double sleeve keyless chuck of the prior art.
Figure 26:
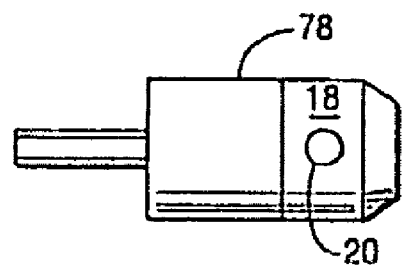
FIG. 26 is a side plan view of an embodiment of the present invention showing a keyless chuck or adapter defining a cylindrical mounting surface with at least one locking aperture thereon.
Figure 27:
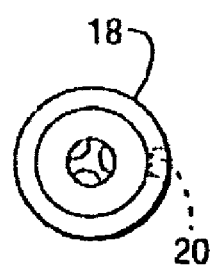
FIG. 27 is an embodiment of the present invention showing a three jaw configuration for a chuck.

Another manner of attaching the first bit devices 22 with respect to the rotatable chuck 14 or the adapter 78 is the use of a set screw 80 as shown in FIG. 22. In this design set screw 80 provides a set screw first bit retaining means.

FIGS. 45A and 46A show an exemplary embodiment of a collet adapter assembly 90. The collet adapter assembly 90 includes two pieces: a universal collet adapter portion 91 and a collet 94. The collet adapter portion 91 has a shaft 91p (preferably hexagonal in cross section) at its proximal end, adapted to be received by the chuck or keyless chuck of any drill or rotating tool. The distal portion of adapter portion 91 includes a generally cylindrical surface 18 and locking means, such as locking apertures 20. Adapter 91 includes a bore 92 in its distal end, for receiving a bit device 22. In the distal end of adapter 91, the bore 92 has a threaded portion 93.

Collet 94 has male threads near its distal end, for engaging the female threads 93 of bore 92. A head 97 (which may optionally be square or hexagonal or other shape) is provided for securely driving collet 94 into the adapter portion 91. Collet 94 has a bore 98 (shown in phantom) throughout its length for receiving the bit device 22. Collet 94 has a tapered proximal end 95 with longitudinal grooves 96 at least on two diametrically opposed sides, dividing the proximal end of collet 94 into two halves. (In some embodiments, four grooves divide the proximal end into four ¼ portions, or six grooves divide the proximal end into six ⅙ portions, etc.) The outer diameter of the tapered end 95 varies, being smaller than the diameter of bore 92 at the tip (facilitating entrance into the bore), and being larger than the diameter of the bore 92 in the distal end of the tapered portion 95. As shown in FIG. 46, when the collet 94 is threadably engaged in the bore 92 of adapter 91, the two halves (or four quarters, or six sixths, or the like) of the tapered end 95 are squeezed together, due to the larger-diameter portion of the tapered end 95 engaging the walls of bore 92, firmly gripping bit device 22. Thus, collet adapter assembly 90 provides a means for securely retaining a round bit device as an alternative to a set screw bit retaining adapter of FIG. 28.

In some embodiments, the collet adapter 91 may have an optional forward section (not shown) extending past the distal end of the generally cylindrical section 18, with the threaded portion of the bore 93 extending into the forward section. Then the bore need not extend into the cylindrical mounting section 18.

In a given tool set, a plurality of collets 94 may be provided for a plurality of respective bit device diameters, each collet 94 having a common male thread size and a respectively different bore 98 size corresponding to the diameter of each respective bit device 22. Thus, a single adapter 91 accommodates a variety of first bit device sizes.

Alternatively, a set may also include a plurality of adapters 91 having proximal shafts adapted for use with a quick-connect type driving system. Frequent changes between the first bit device and the second bit device are achieved using the bit attachment device 10, as described above; and less frequent changes from one first-bit device to another first-bit device (e.g., to drill a different sized pilot hole) is achieved by swapping one assembly 90 for another assembly 90 having a differently sized first bit device 22 and corresponding collet 94 mounted therein.

FIGS. 45B and 46B show a collet chuck assembly 90' that is similar to the collet adapter assembly 90 shown in FIGS. 45A and 46A, but includes the following features. Collet chuck assembly 90' has a collet chuck 91' with a power tool mounting section 91p'. The power tool mounting section 91p' may be used to mount the collet chuck 91' directly to a power tool, such as a drill or impact driver (in contrast to the collet adapter mounting section 91p (FIG. 45A) that is adapted to be received by an existing chuck of a power tool). The collet chuck mounting section 91p' may have a socket 91s to facilitate mounting on a tool, such as an impact driver.

Figure 48:
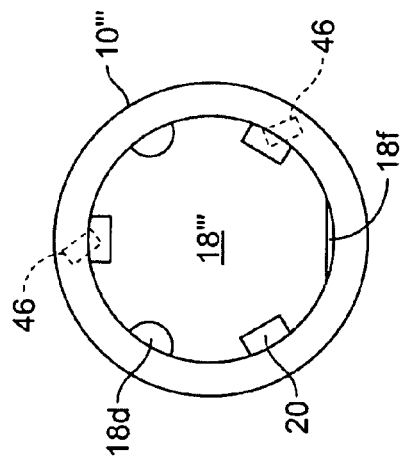
FIG. 48 is a cross sectional view of a generally cylindrical mounting section with a flat surface and dimples thereon.

FIGS. 47 to 49B show alternative shapes of generally cylindrical mounting sections, with details omitted that are not pertinent to the particular features discussed in this paragraph. FIG. 48 is a cross sectional view of a generally cylindrical mounting section 18''' and a corresponding attachment 10'''. The generally cylindrical mounting section 18''' has features such as flat surfaces 18f, and concave surfaces or dimples 18d on the generally cylindrical mounting surface 18''' that may facilitate gripping the generally cylindrical mounting surface, but do not affect the engagement between the generally cylindrical mounting surface and the attachment 10'''. The pins 46 of attachment 10''' engage the locking apertures 20 in the manner described above with reference to the embodiment of FIG. 4.

In other embodiments (e.g., FIG. 47), the generally cylindrical mounting section 18" has at least one flat surface 18f for engaging a corresponding flat surface 10f in the mounting cavity of the attachment 10". For example, the generally cylindrical mounting section and the corresponding mounting cavity may each have a "D" shaped cross section, as shown. In such embodiments, the flat surface 18f acts as a locking means or key to cause the attachment 10" to rotate with the generally cylindrical mounting section 18".

Although the embodiments shown above include generally cylindrical mounting sections, in other embodiments, mounting sections having other shapes (e.g., square, hexagonal, etc.) may be used. For example, a keyless chuck having a hexagonal mounting section with a groove or aperture therein may be used in conjunction with an attachment device having a hexagonal mounting cavity and a spring loaded ball bearing in place of locking pins. Alternatively, the ball bearing may be placed on the mounting section, and the groove in the mounting cavity of the bit attachment. This is just one example, and many other shapes may be used in the mounting section with a corresponding shape in the mounting cavity of the bit attachment device. Similarly, many other locking mechanisms may be used.

Figure 49B:
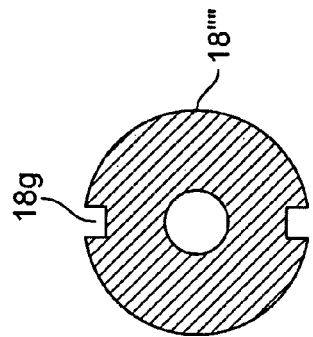
FIG. 49B is a cross sectional view taken along section line 49B-49B of FIG. 49A.
Figure 47:
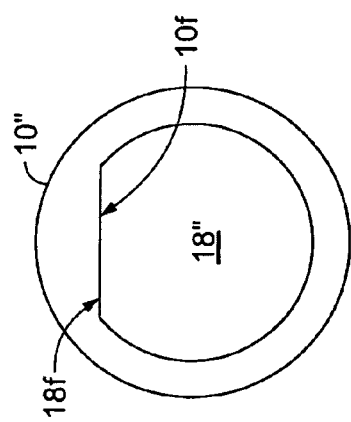
FIG. 47 is a cross sectional view of an example of a generally cylindrical mounting section with a flat surface thereon.
Figure 49A:
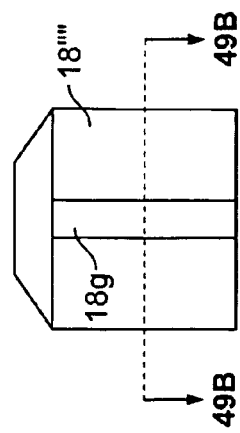
FIG. 49A is an elevation view of a generally cylindrical mounting section having a longitudinal groove.

In other variations (e.g., FIGS. 49A and 49B, the locking means or key is not limited to a flat surface, but may be at least one longitudinal groove 18g on the generally cylindrical mounting section 18'''', with at least one corresponding longitudinal ridge in the mounting cavity of the attachment 10 (not shown).

Although the examples in FIGS. 1-44 include cylindrical mounting section 18, any of the embodiments in FIGS. 1-44 may be practiced using any of the generally cylindrical mounting sections described herein, or any equivalent mounting section having a locking means for engaging any of the bit holding attachments described herein, or equivalents thereof.

The savings of time during the performing of these activities when utilizing the attachment described above is a significant advantage in reducing the labor cost in such jobs.

As shown in the figures, a power tool 5, either corded or cordless driven, includes a rotatable keyed chuck 112, a rotatable keyless chuck 16, a rotatable set screw mandrel chuck 84, or a rotatable adapter 78. The chuck or chuck adapter has a collar 113 made as a polygonal prism or a cylindrical collar 113 having at least a secant flat surface 114 formed thereon. A first bit device 22 is mounted in either the rotatable keyed chuck 112, rotatable keyless chuck 16, a rotatable set screw mandrel chuck 84, or a rotatable adapter 78. A sleeve member 131 has a hollow bore portion centrally formed in the sleeve member 131. A mounting cavity 132 is formed on a proximal end of the sleeve member 131. The mounting cavity 132 is adapted to be concentrically and detachably secured to the cylindrical collar 113 (having at least a secant flat surface 114) of either the rotatable keyed chuck 112, rotatable keyless chuck 16, rotatable set screw mandrel chuck 84, or rotatable adapter 78. A second bit device 36 is detachably mounted on a distal end of the sleeve member 131. Upon coupling of the sleeve member 131 secured with the second bit device 36 on the cylindrical collar 113 having at least a secant flat surface 114 formed thereon of either the chuck or chuck adapter 112, 16, 84, or 78, the hollow sleeve member 131 of the attachment 10 will encase the first bit device 22 previously mounted in the chuck or chuck adapter without first dismantling the first bit device 22 for convenient replaceable uses of the first bit device 22.

The chuck or chuck adapter 112, 16, 84, or 78 has at least a secant flat surface 114 longitudinally formed on a peripheral surface of the collar 113 (which may be generally cylindrical shaped or polygonal shaped), and at least a ball recess 135 for engagement with the resilient ball 115 of the attachment 10 open and on the collar for frictionally retaining the attachment. The ball recess 135 is recessed in the collar 113, for example, in the secant flat surface 114 of the collar 113, and is at least partially and outwardly open.

The attachment 10 includes: a sleeve member 131 having a hollow bore portion longitudinally formed in the sleeve member 131 for encasing the first bit device 22 in the hollow bore portion; a mounting cavity 132 formed on a proximal end of the sleeve member 131 and having a mounting socket 133 recessed in the mounting cavity 132 for coupling the collar 113 of chuck or chuck adapter 112, 16, 84, or 78. Also a resilient ball 115 is recessed in the mounting socket 133 of the mounting cavity 132 of the attachment 10 for resiliently engaging the ball recess 135 on the collar 113 of chuck or chuck adapter 112, 16, 84, or 78. The resilient ball 115 is retained in a spring socket 152 which is included in the mounting socket 133 of the mounting cavity 132 of the attachment 10, and a tension spring 151 normally urges the ball 115 inwardly. Also a second bit securement mechanism 136 is formed on a distal end of the sleeve member 131 opposite to the mounting adapter 132. The second bit securement mechanism 163 can have a generally polygonal driving socket 137 (e.g., hexagonal shaped). The driving socket 137 is recessed in and part of the securement mechanism 136 that can hold a second bit device for rotatably driving a fastener 38.

Figure 53:
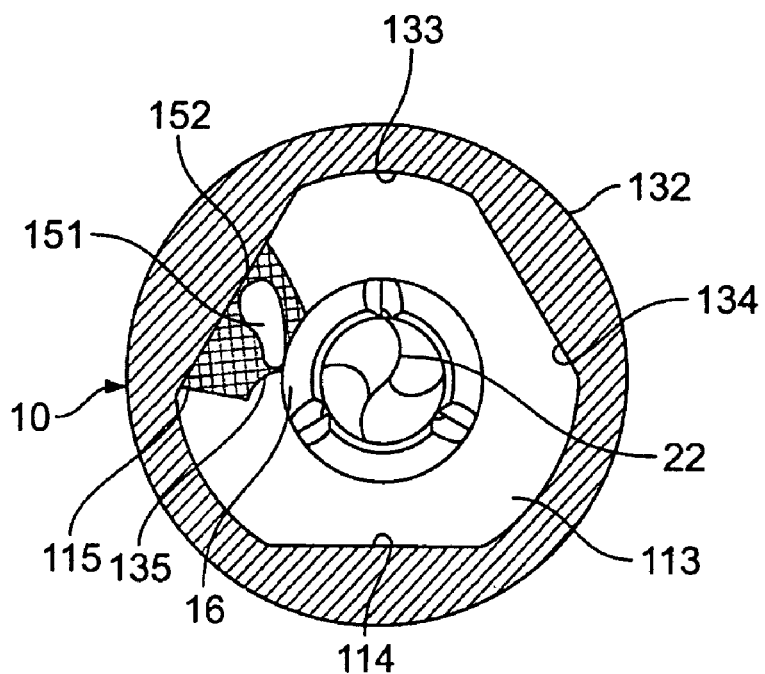
FIG. 53 is a partial cross sectional drawing of an embodiment of the present invention when viewed from the proximal end of the sleeve member of the attachment.

The mounting socket 133 that retains the resilient ball 115 in the mounting cavity 132 of the attachment 10 may be formed in a flat surface 134 on an inside wall of the mounting socket 133 to be engageable with the collar 113. The collar 113 has a secant flat surface 114, longitudinally formed on the collar 113, which is generally cylindrical shaped, for example, as shown in FIG. 53.

Figure 54:
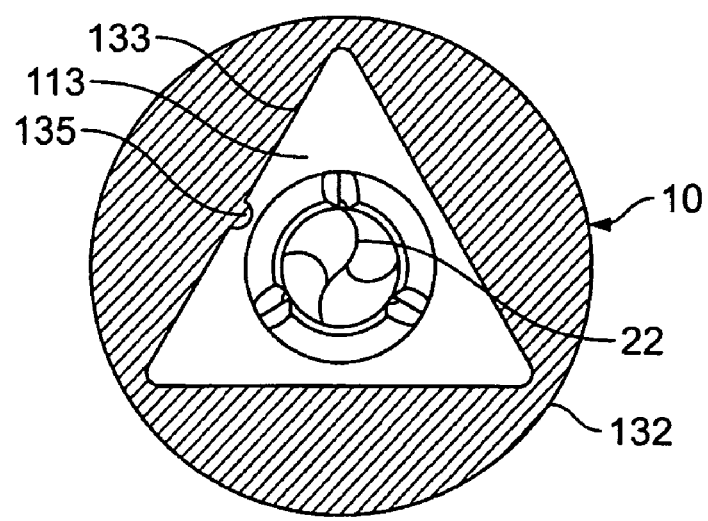

The mounting socket 133 in the mounting adapter 132 of the attachment 10 may also be formed with polygonal inside walls for engaging a polygonal prism (such as a triangular prism as shown in FIG. 54 of the collar 113 of either a chuck or chuck adapter 112, 16, 84, or 78), for coupling the mounting cavity 132 of the attachment mechanism 10 onto the collar 113 of the chuck or chuck adapter.

Figure 51:
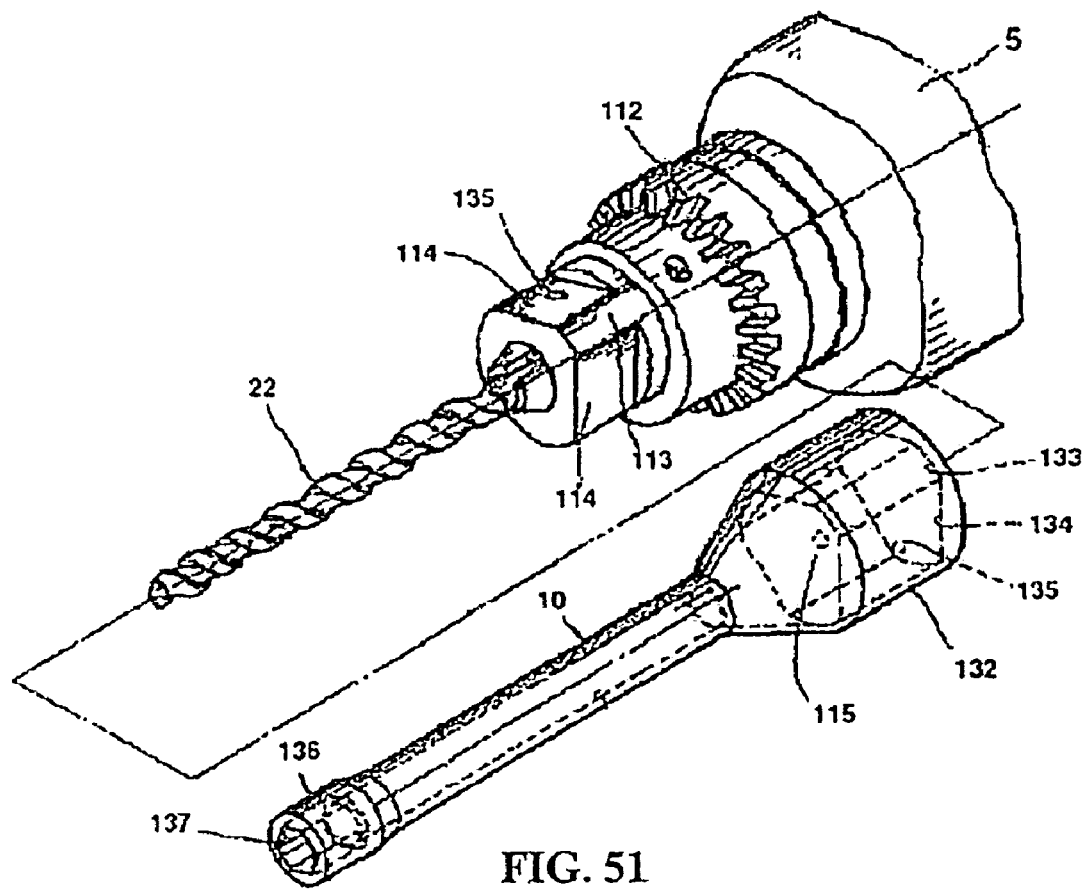
FIG. 51 is an exploded view of an embodiment of the keyed chuck and bit holding attachment.
Figure 52:
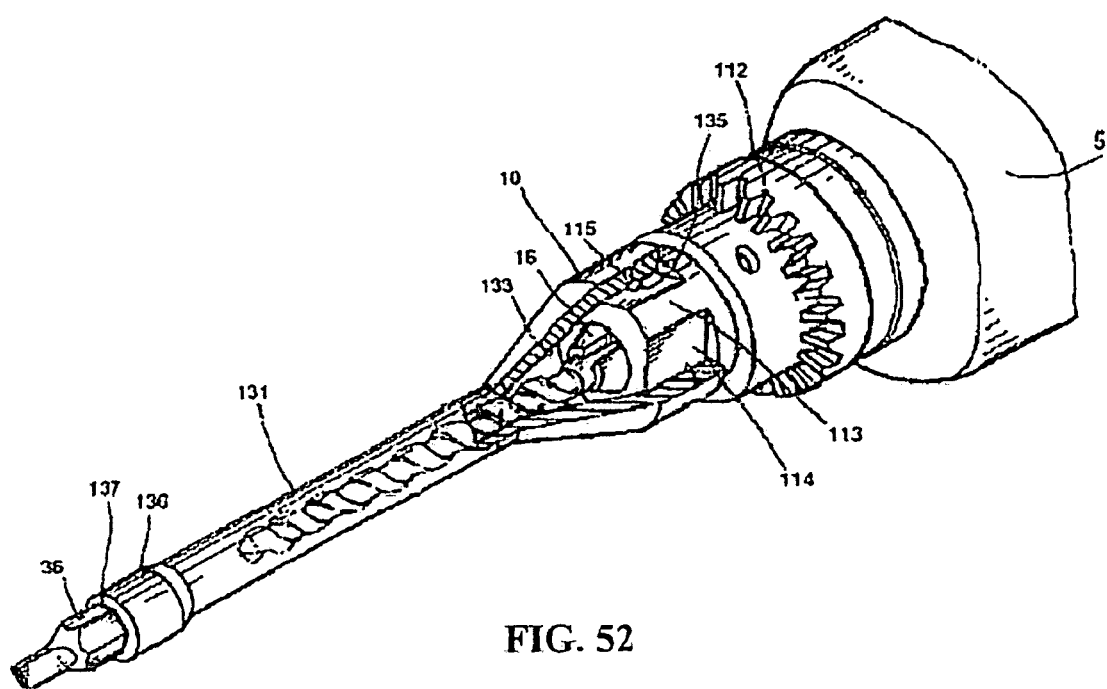
FIG. 52 is a perspective view of an embodiment of the keyed chuck and bit holding attachment.

When using the power tool 5 with either chuck or chuck adapter 112, 16, 84, or 78 for rotatably operating the attachment 10 as a screw driver, the attachment 10 may be inserted with a second bit device 36 such as a Phillip's tip. As shown in FIG. 51, the attachment 10 can have a driving socket 137 on a distal or outer end of the sleeve member 131. The attachment 10 is coupled to either a chuck or chuck adapter 112, 16, 84, or 78, by engaging the mounting adapter 132, which is formed on the proximal or inner end of the sleeve member 131, with the collar 113 of chuck or chuck adapter 112, 16, 84, or 78. The mounting cavity 132 is easily coupled to the collar 113 of chuck or chuck adapter 112, 16, 84, or 78, without requiring any removal of the first bit device 22 from the chuck or chuck adapter. The ball recess 135 will be resiliently engaged with the resilient ball 115 in the mounting socket 133 on the flat surface 134 in the mounting adapter 132 to stably retain the attachment 10 on the chuck or chuck adapter 112, 16, 84, or 78 mounted in the power tool 5, or on the rotatable chuck mounted in a power tool 5.

The exemplary bit holding apparatus is particularly usable for alternately drilling pilot holes and driving fasteners 38 therein. It can also be used for many other different combinations of bit devices such as drilling and drilling, driving and drilling or driving and driving. Alternating usage of the two held bit devices 22 and 36 is achieved by alternately mounting the attachment 10 for allowing operation of the second bit device 36 and alternately removing the attachment 10 for allowing use of the first bit device 22.

The bit holding apparatus provides many very significant designs, it has universal usage with respect to updated power tool attachments such as keyless rotatable chucks 16 and set screw mandrel chucks 84. As such, the bit holding apparatus further defines the use of an adapter 78 detachably securable with respect to the rotatable chuck of a power tool 5 directly or with respect to the rotatable keyless chuck 16 to provide a means for mounting of various different bit devices 22 therewithin while at the same time also providing the rotatably driven mounting collar 113, with at least one secant flat surface 114 and at least one ball recess 135 therein. The inclusion of the rotatably driven mounting collar 113, at least one secant flat surface 114 and at least one ball recess 135 will facilitate the rapid mounting and dismounting of the attachment 10 with respect to adapter 78 for allowing the driving of individual fasteners 38 into pilot holes immediately after each hole is individually drilled. This is just one of many possible manners of usage of the apparatus.

Figure 62:
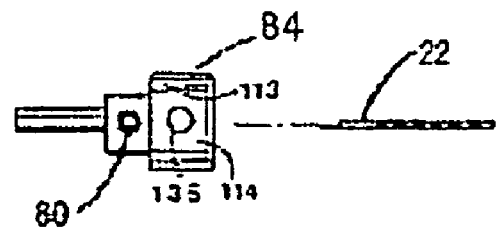
FIG. 62 is a side illustration of a set screw mandrel adapter.
Figure 63:
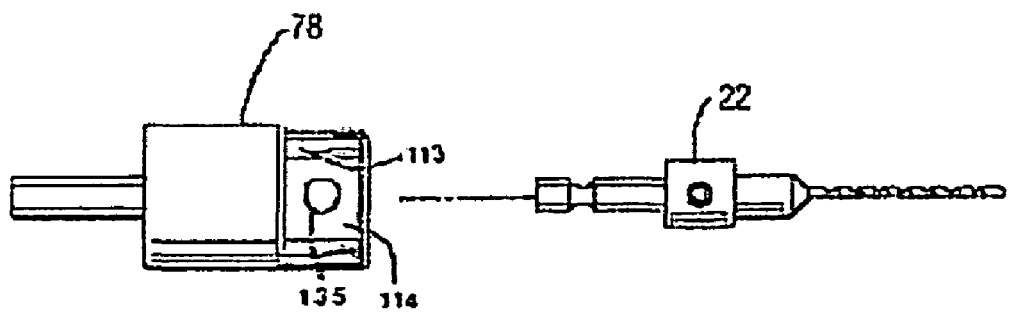
FIG. 63 is a side illustration of the keyless chuck adapter member shown securable with respect to a hex drive drill bit.
Figure 64:
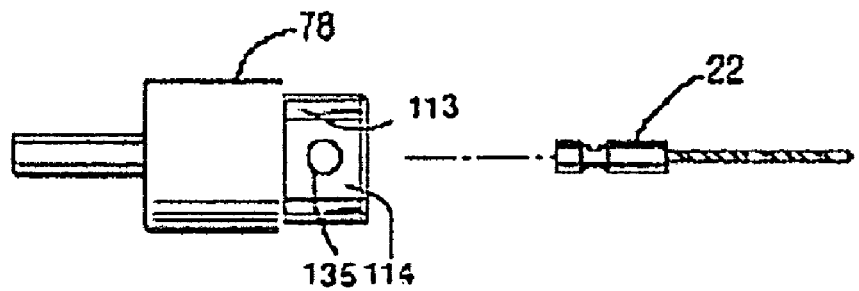
FIG. 64 is an alternative embodiment of an adapter or chuck usable with a hex driven drill bit.
Figure 65:
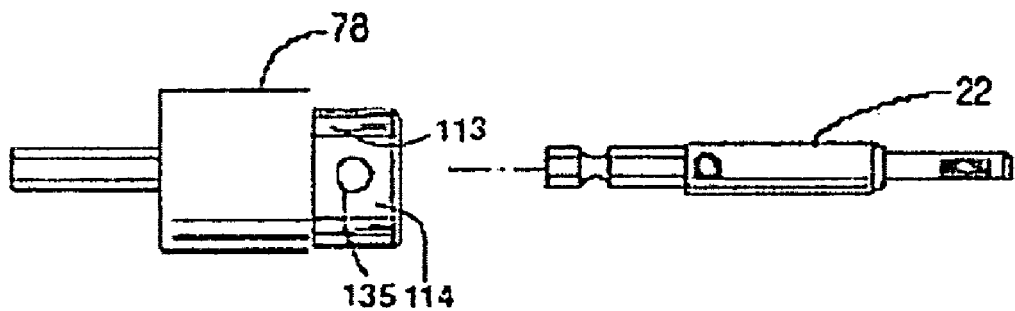
FIG. 65 is a side plan view showing an adapter or chuck securable with respect to a drill bit with a self-centering guided sleeve.
Figure 66:
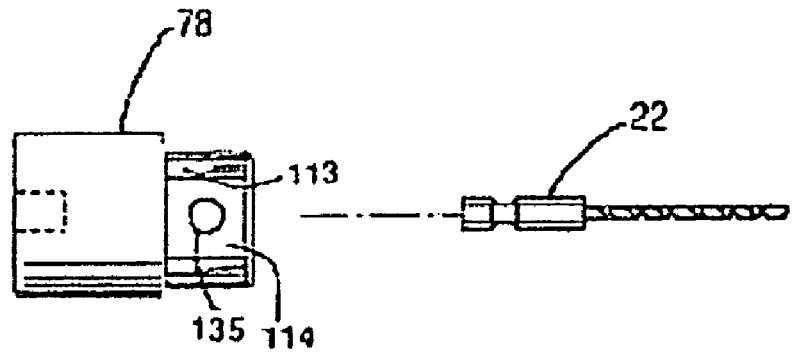
FIG. 66 is a side view of an embodiment of a keyless adapter or chuck shown securable to a drill bit with a hexagonal securement shaft attached thereto.

The attachment device 10 preferably also defines a forward sleeve member 131 which is designed to receive and retain a second bit device 36 secured thereto by a forward bit securement means. In some embodiments, this second bit device will be a fastener driving means such as a hex, square or slotted screw driving bit. To facilitate the forward bit securement means retaining of a second bit device 36 therein, a hole means may be defined therein, for example, with a hexagonal cross-section. This hexagonal cross-section will facilitate securement of various second bit devices 36 such as fastener driving devices with hexagonal driving shafts integrally formed therewith or attached thereto. Also a magnet for retaining the second bit device 36 with respect to the forward end of the forward sleeve member 131 may also be included in various configurations. Many second bit devices 36 can easily be secured detachably to the forward end of the forward sleeve member 131 when used with the hexagonal shaped mounting holes adapted to receive them. The attachment devices 10 may optionally also include set screws for further maintaining detachable securement therewith of the second bit devices 36. Also set screws 80 can be utilized as shown in FIG. 62 to retain the first bit devices 22 with respect to an embodiment of the adapter 78 or a rotatable set screw mandrel chuck 84 provided as a part of the apparatus. Such set screw bit retaining devices are usable with respect to various configurations of set screw mandrel chucks 84 and adapters as shown in the various Figures included herein.

An intermediate cavity may be included in the shank. The intermediate cavity can be part of the housing and can be integrally made as one piece or from more than one piece of material. This intermediate cavity will preferably be positioned in between the mounting cavity 132 and the forward sleeve member 131. The purpose of the intermediate cavity of the shank 96 is to allow the chuck or chuck adapter 112, 16, 84, or 78 to be capable of receiving those first bit devices 22 which are larger than standard twist drill bits, particularly those devices which are larger in diameter. Such first bit devices 22 may include larger bits such as countersinking devices integral therewith, drill bits with self-centering guided enclosures or devices therearound, drill bits with collet adapters or drill bits with hex-shaped drive shanks. All of these bits are generally slightly larger in diameter than conventional round twist drill bits. Furthermore the intermediate cavity will more readily receive nut, nut setter or nut head driver bits or other similar bits which are usually significantly larger in diameter than standard twist drill bits themselves.

Figure 55:
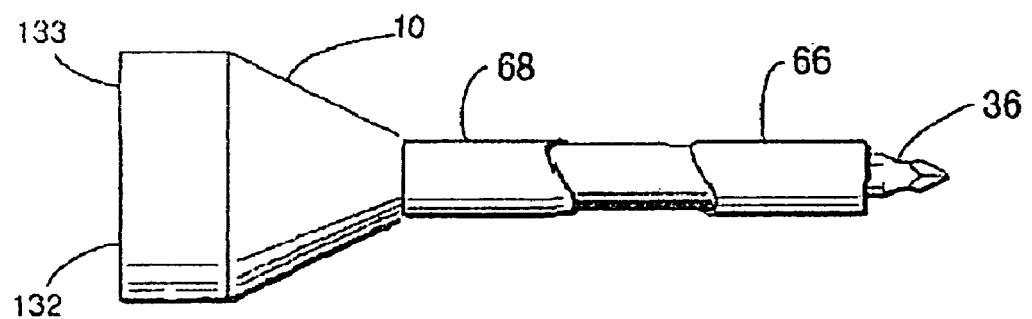
FIG. 55 is a side view of an of an embodiment of the attachment device shown including an embodiment of the guide sleeve shown in the retracted storage position.
Figure 56:
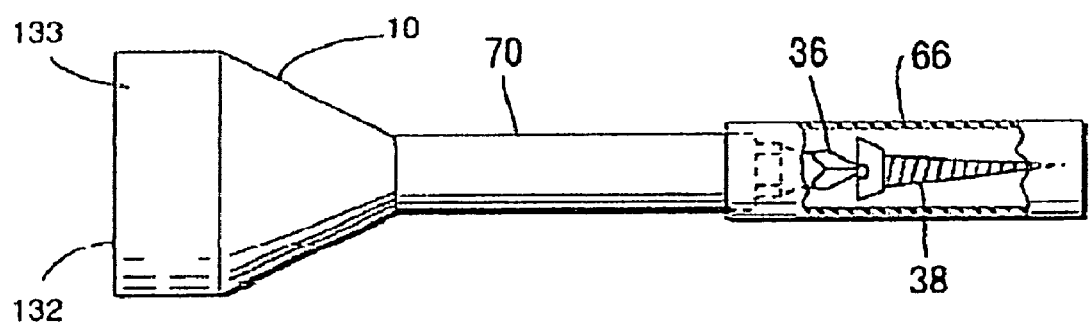
FIG. 56 shows a side view of the configuration of FIG. 55 in the extended operating position particularly useful for maintaining a fastener in proper alignment and engaged with respect to a fastener driving bit located therewithin attached to the forward end of the housing.
Figure 57:
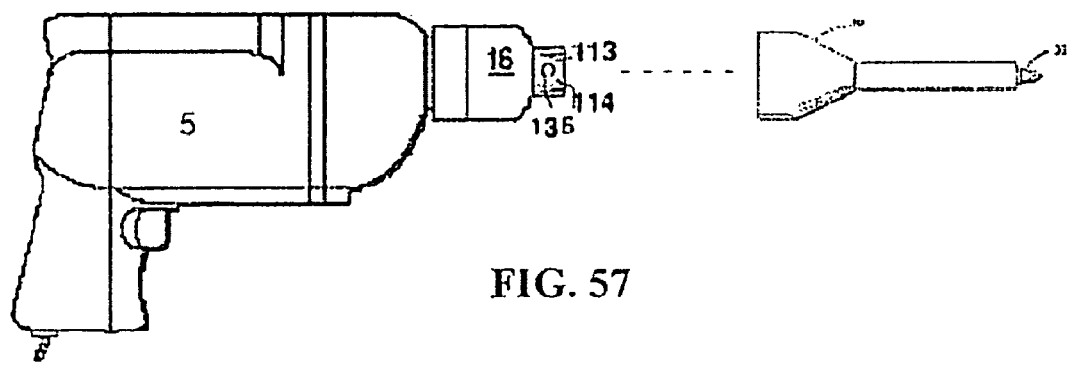
FIG. 57 is a side assembly view showing a power tool with an embodiment of a new rotatable keyless chuck and an embodiment of the new attachment device.
Figure 58:
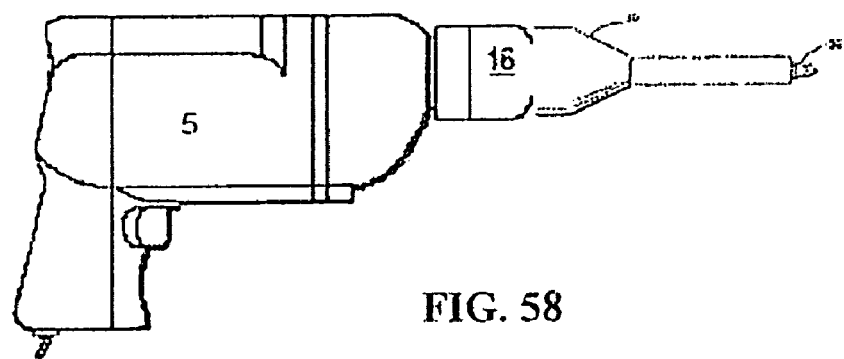
FIG. 58 is a cross-section of the embodiment shown in FIG. 57 with the attachment device installed.
Figure 59:
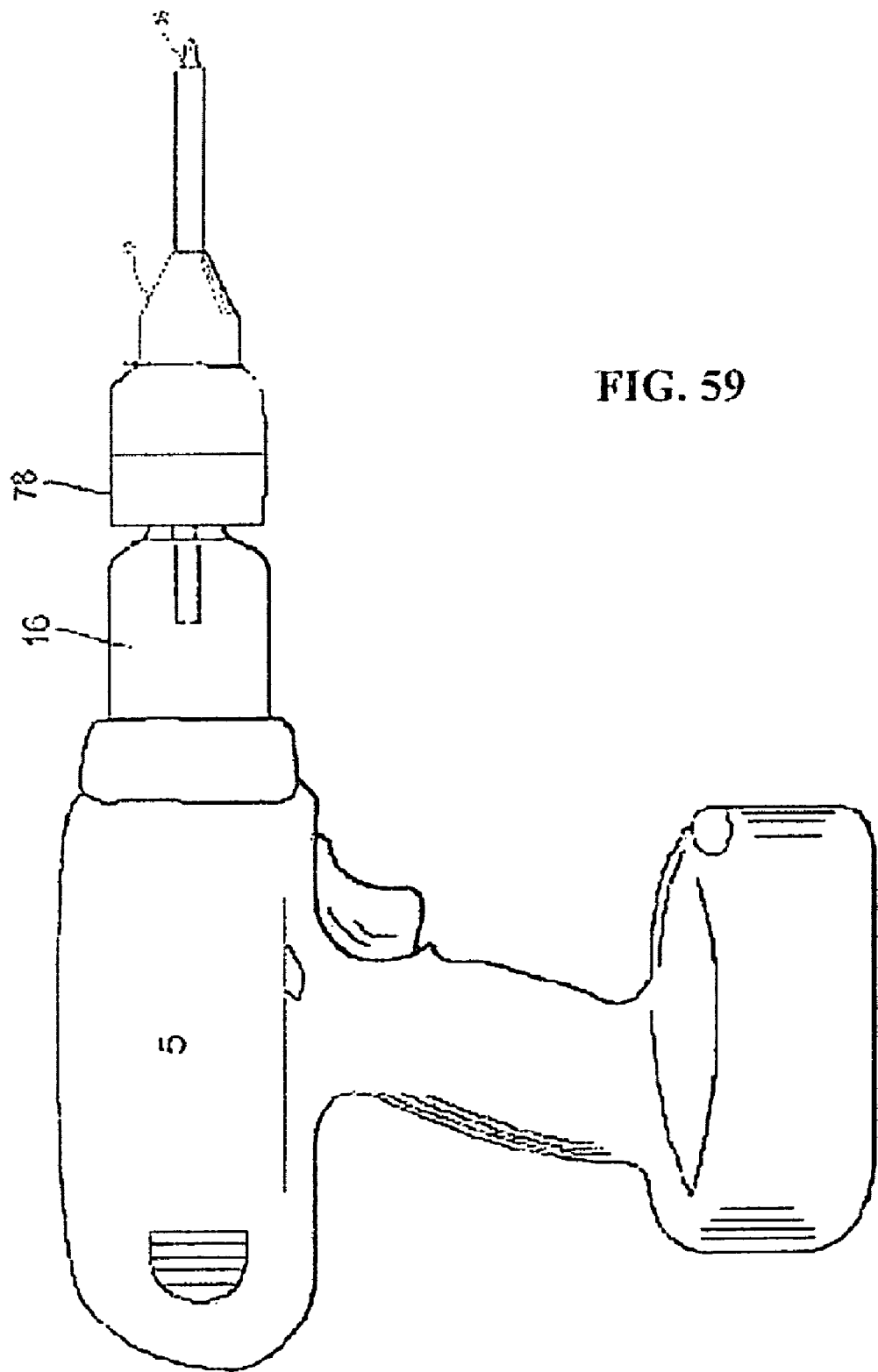
FIG. 59 is a side illustration of a power tool shown with an adapter mounted thereto including a cylindrical mounting surface for affixing with respect to the attachment device.
Figure 60:
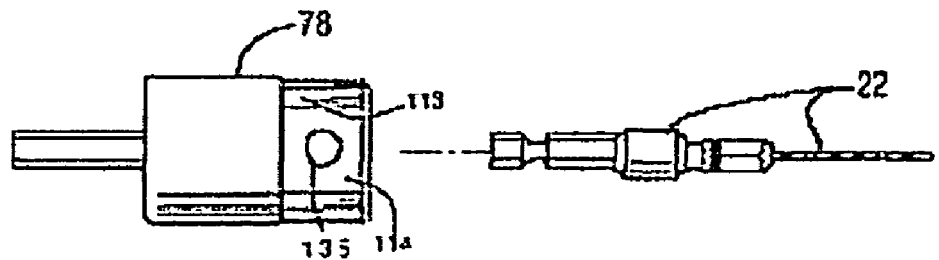
FIG. 60 shows a side view of an embodiment of an adapter or chuck shown securable with respect to a drill bit with a collet adapter.
Figure 61:
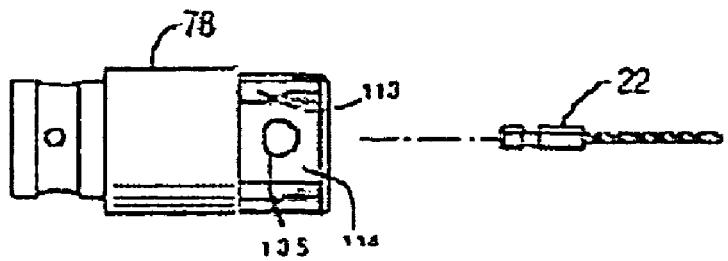
FIG. 61 is an alternative configuration for a chuck with a socket end shown with a drill device having an integral mounting portion with a hex sided configuration.

Another aspect of the apparatus is the optional inclusion of a system including a guide sleeve 66. This configuration is shown in FIGS. 55 and 56 as an add-on device positionable around the forward sleeve member 131 of the attachment device 10. The guide sleeve 66 is initially in the retracted storage position 68 as shown in FIG. 55 but is movable to the extended operative position 70 shown in FIG. 56 where it will be in surrounding engagement with respect to a second bit device 36 to facilitate use thereof. In this manner, for example, driving of fasteners into a substrate or other workpiece by a second bit device 36 which can be a fastener driving bit device is greatly facilitated because the alignment of securement between the fastener driving bit 36 and the fastener 38 is properly maintained. The guide sleeve 66 may be telescopingly movable with respect to the portion of the housing which defines the forward sleeve member 131 therewithin.

Figure 74:
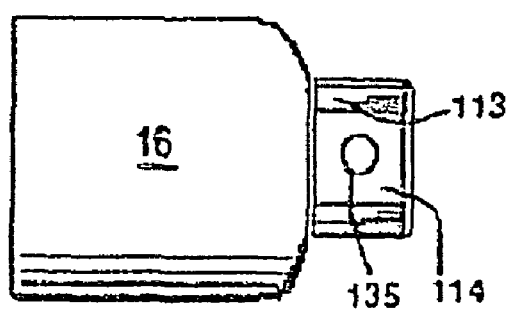
FIG. 74 is a side plan view of a single sleeve keyless chuck or adapter defining a collar made as a polygonal prism or a cylindrical collar having at least a secant flat surface formed thereon and at least a ball recess for engagement with a resilient ball of the attachment open and on the collar for frictionally retaining the attachment.
Figure 75:
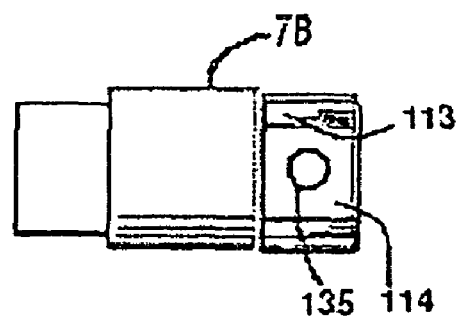
FIG. 75 is a side plan view of an alternative embodiment of a keyless chuck or adapter.
Figure 76:
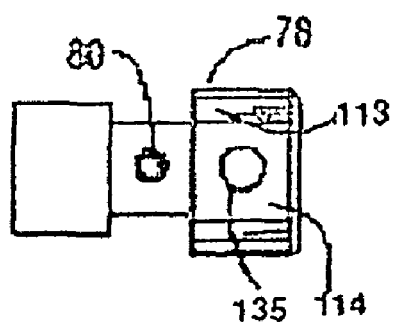
FIG. 76 is a further alternative embodiment of a keyless chuck or adapter.
Figure 77:
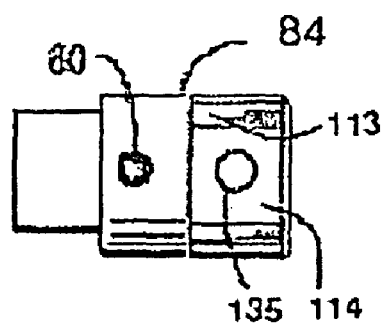
FIG. 77 is a further alternative embodiment of a keyless chuck or adapter.
Figure 78:
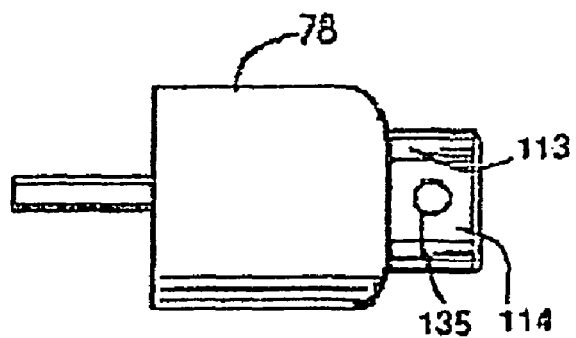
FIG. 78 is a side plan view of a single sleeve keyless chuck or adapter defining a collar made as a polygonal prism or a cylindrical collar having at least a secant flat surface formed thereon and at least a ball recess for engagement with the resilient ball of the attachment open and on the collar for frictionally retaining the attachment.
Figure 79:
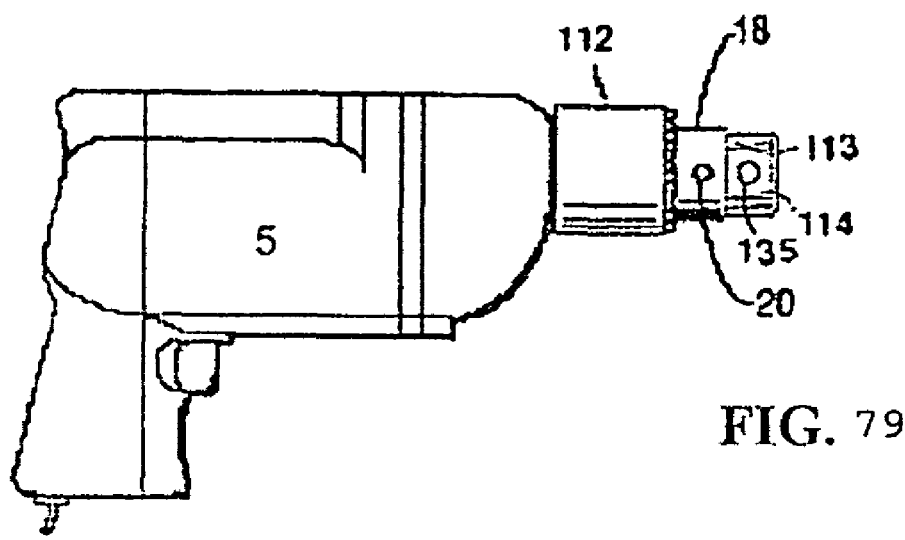
FIG. 79 is a side plan view that illustrates a power tool with a keyed chuck mounted therein.
Figure 80:
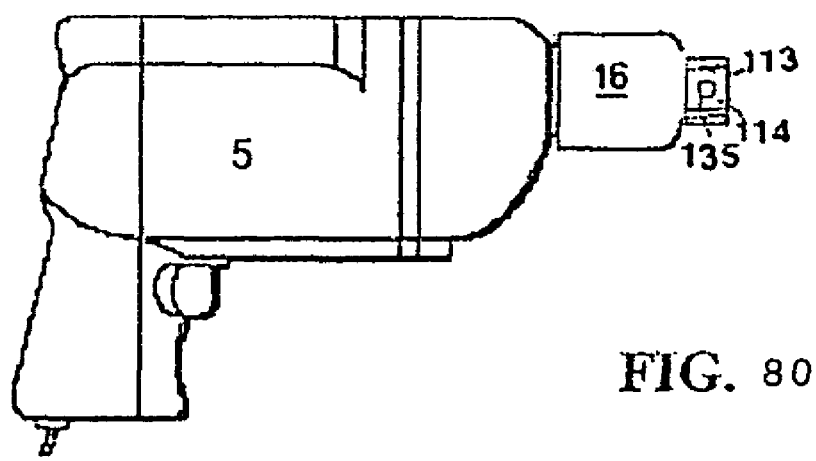
FIG. 80 is a side plan view of an embodiment of a power tool shown with a new single sleeve keyless chuck mounted therein.
Figure 81:
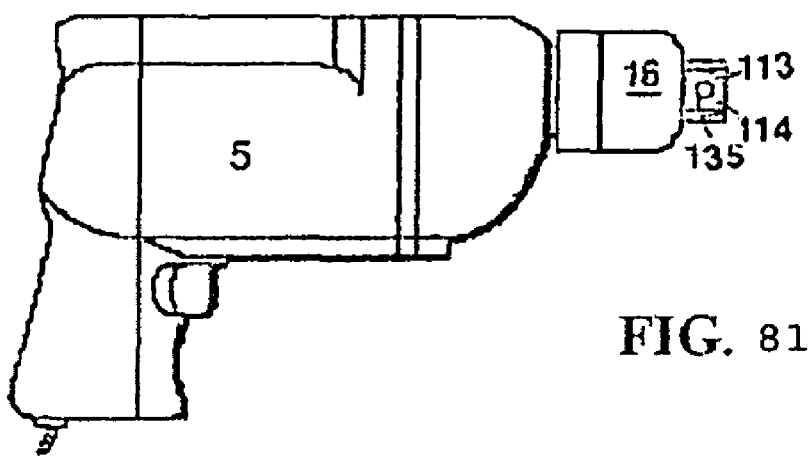
FIG. 81 is a side plan view of an embodiment of a power tool shown with a new double sleeve keyless chuck mounted therein.
Figure 82:
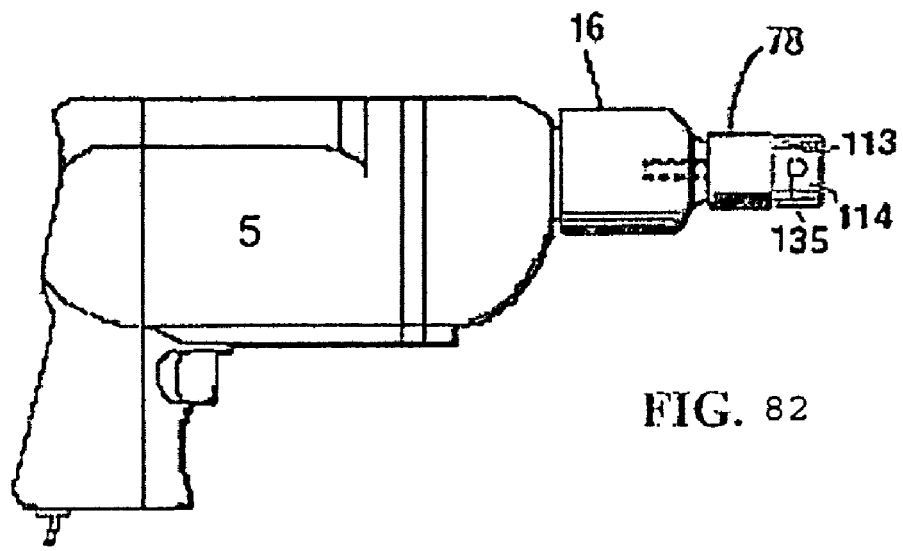
FIG. 82 is an illustration of a power tool showing a conventional single sleeve keyless chuck with an embodiment of an adapter mounted therein.
Figure 83:
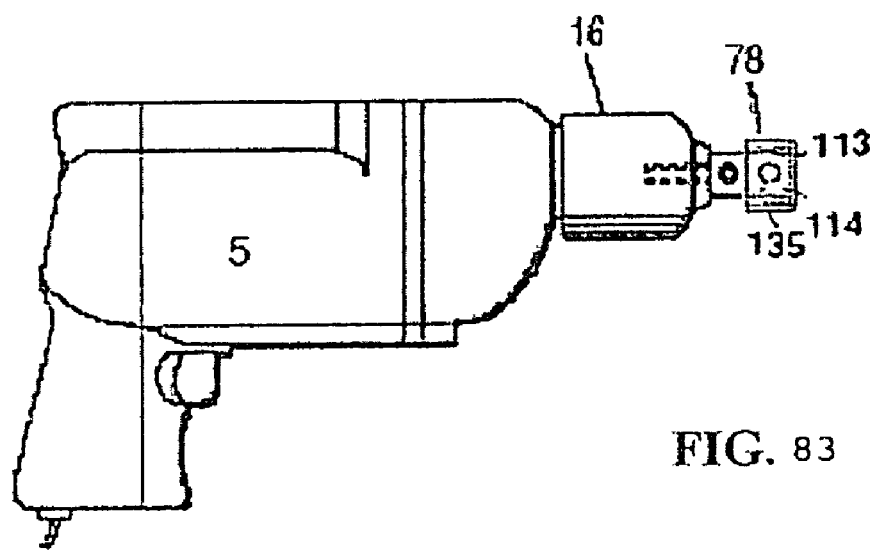
FIG. 83 is an illustration of a power tool showing a conventional single sleeve keyless chuck with another embodiment of an adapter mounted therein.
Figure 84:
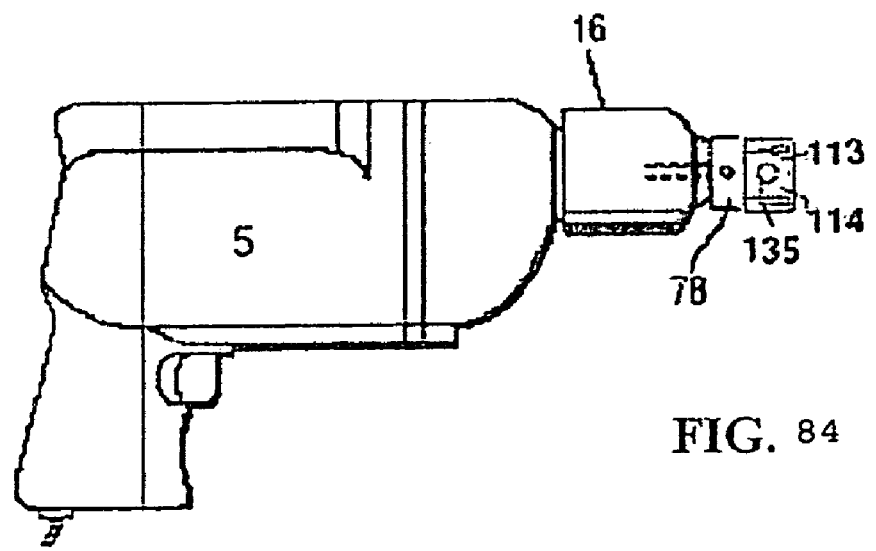
FIG. 84 is an illustration of a power tool showing a conventional single sleeve keyless chuck with a further alternative embodiment of an adapter mounted therein.
Figure 85:
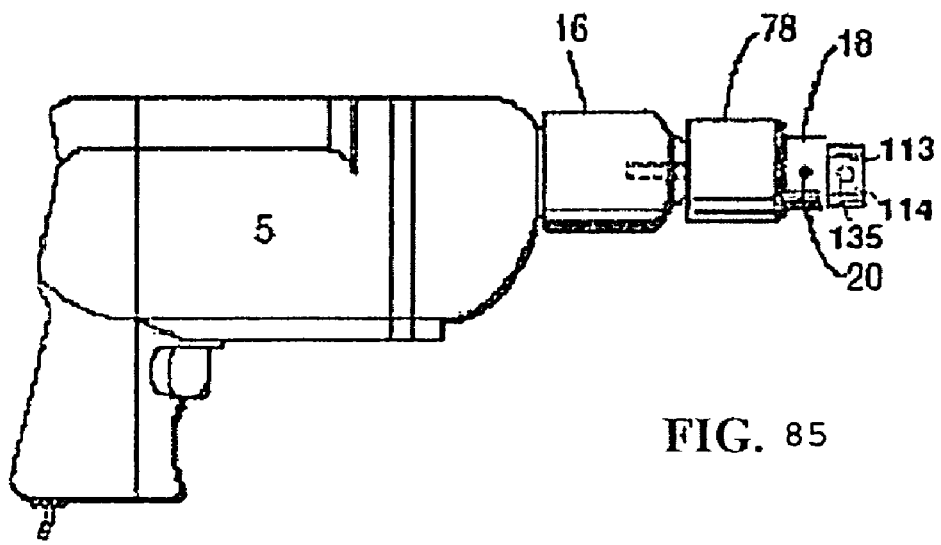
FIG. 85 is a side plan view of a power tool with a conventional keyless chuck with a further alternative embodiment of an adapter mounted therein wherein the adapter itself comprises a keyed mounting chuck with a driveshaft extending rearwardly therefrom.
Figure 86:
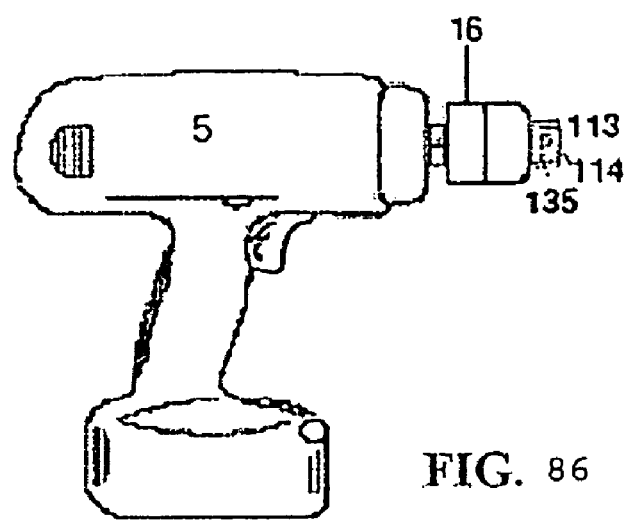
FIG. 86 is a side plan view of a new double sleeve keyless chuck with a socket end mounted on an electric impact wrench.
Figure 87:
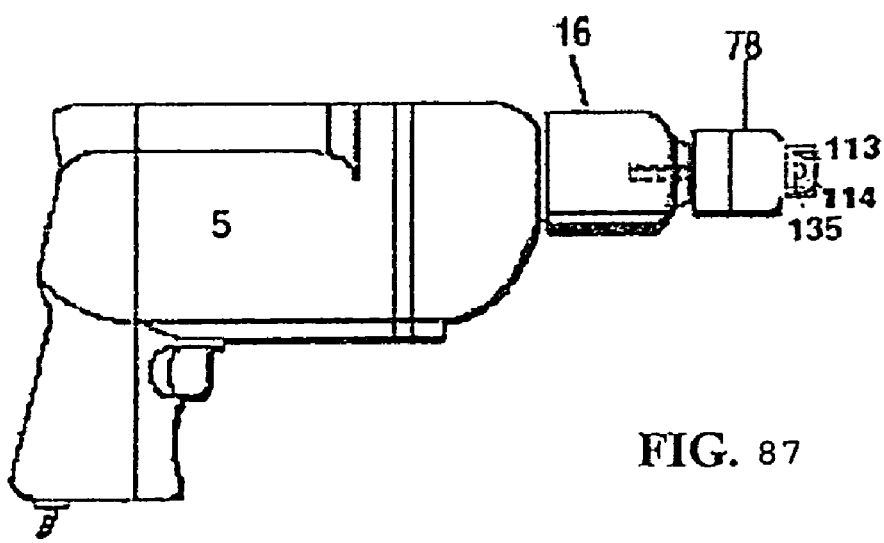
FIG. 87 is a side plan view of an embodiment of a power tool with a conventional keyless chuck and a new double sleeve keyless adapter mounted therein which defines a collar made as a polygonal prism or a cylindrical collar having at least a secant flat surface formed thereon and at least a ball recess for engagement with the resilient ball of the attachment open and on the collar for frictionally retaining the attachment.

The apparatus can also include, as a component thereof, a keyless chuck 16, a set screw mandrel chuck 84, or an adapter 78 with a rotatably driven mounting collar 113, at least one secant flat surface 114 and at least one ball recess 135 defined therein as shown best in FIGS. 80 and 84. FIG. 74 shows the single sleeve keyless chuck and FIG. 75 shows the double sleeve keyless chuck, each of which includes the rotatably driven mounting collar 113, at least one secant flat surface 114 and at least one ball recess 135 defined therein. When this keyless chuck 16 or set screw mandrel chuck 84 with a rotatably driven mounting collar 113, at least one secant flat surface 114 and at least one ball recess 135 is provided as a component or added item, the original equipment chuck from a power tool such as a drill or impact wrench could be removed and replaced thereby. Alternatively, the provided rotatable keyless chuck 16 or rotatable set screw mandrel chuck 84 with a rotatably driven mounting collar 113, at least one secant flat surface 114 and at least one ball recess 135 can replace the original equipment chuck or an adapter member 78 can be mounted in the original equipment chuck as shown best in FIGS. 82, 83, and 84. These three figures show an adapter 78 positioned within a single sleeve keyless chuck wherein each of the adapters has a different configuration, however each of which commonly defines a rotatably driven mounting collar 113, at least one secant flat surface 114 and at least one ball recess 135 defined therein. Thus, it should be appreciated that many of the chucks with rotatably driven mounting collar 113, at least one secant flat surface 114 and at least one ball recess 135 can be also used as adapters 78 and many adapters 78 can also be used as chucks having rotatably driven mounting collar 113, at least one secant flat surface 114 and at least one ball recess 135.

As discussed herein, the difference between an adapter 78 and a chuck is that a chuck is mounted directly into the power tool 5 itself where as the adapter is mounted into some other chucking device which itself is mounted in the power tool 5. For this purpose, an adapter may have a mounting shaft adapted to be grasped by the chuck of a power tool. Any type of mounting shaft that can be grasped by a keyed or keyless chuck of a power tool may be used, including for example, hexagonal, square or round shafts.

Thus, an adapter 78 can be mounted in any type of mated chuck in order to provide a rotatably driven mounting collar 113, at least one secant flat surface 114 and at least one ball recess 135 defined therein that can mate with the mounting cavity 132 of an attachment 10. That chuck, within which the adapter 78 is mounted, can be original equipment or a device provided in the accordance and along with the parts of the present subject matter or as a part optionally included in the apparatus.

Figure 67:
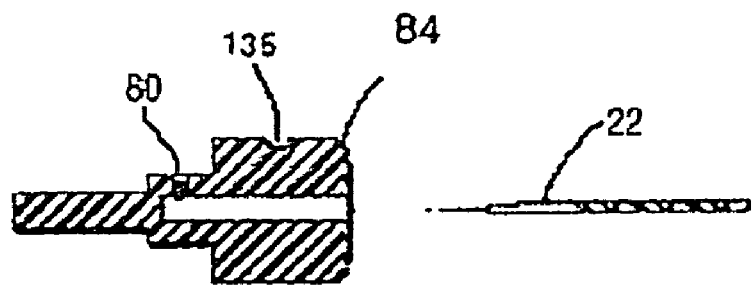
FIG. 67 is a side cross-sectional view of an embodiment of an adapter or chuck showing a set screw as a means for securement of the drill bit thereto.
Figure 68:
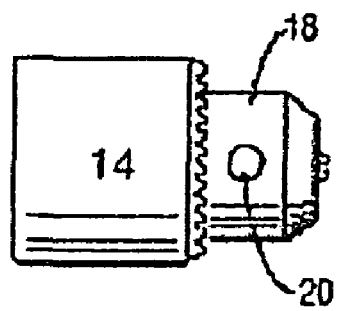
FIG. 68 is a side cross-sectional view of a conventional keyed chuck.
Figure 69:
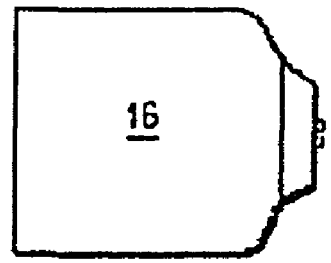
FIG. 69 is a side plan view of a conventional single sleeve keyless chuck.
Figure 70:
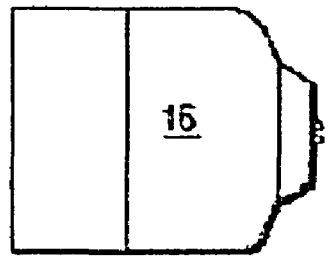
FIG. 70 is a side plan view of a conventional double sleeve keyless chuck.
Figure 71:
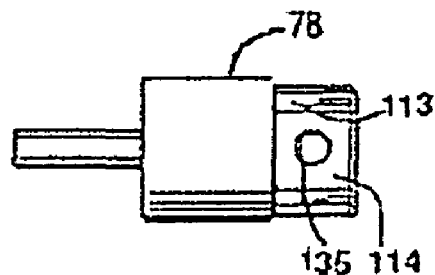
FIG. 71 is a side plan view of an embodiment of a keyless chuck or adapter defining a collar made as a polygonal prism or a cylindrical collar having at least a secant flat surface formed thereon and at least a ball recess for engagement with a resilient ball of the attachment open and on the collar for frictionally retaining the attachment.
Figure 72:
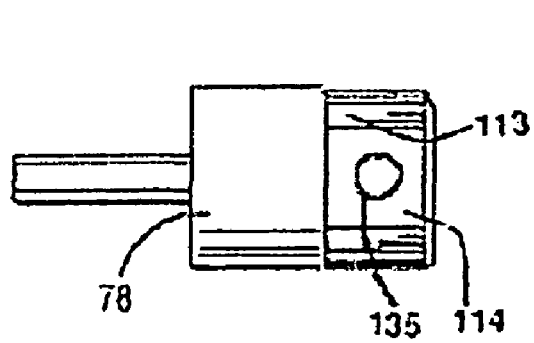
FIG. 72 is another side plan view of an embodiment of a keyless chuck or adapter defining a collar made as a polygonal prism or a cylindrical collar having at least a secant flat surface formed thereon and at least a ball recess for engagement with a resilient ball of the attachment open and on the collar for frictionally retaining the attachment.
Figure 73:
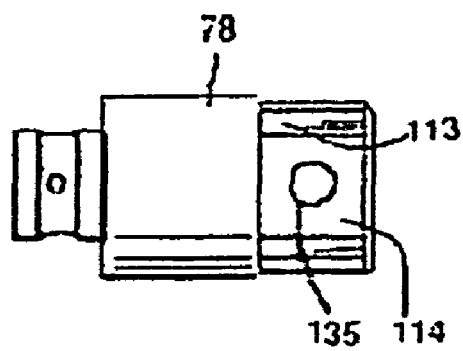
FIG. 73 is a side plan view of a new keyless chuck with a socket end defined therein.

Another manner of attaching the first bit devices 22 with respect to the rotatable chuck or the adapter 78 is the use of a set screw 80 as shown in FIG. 67. In this design set screw 80 provides a set screw first bit retaining means.

Figure 88:
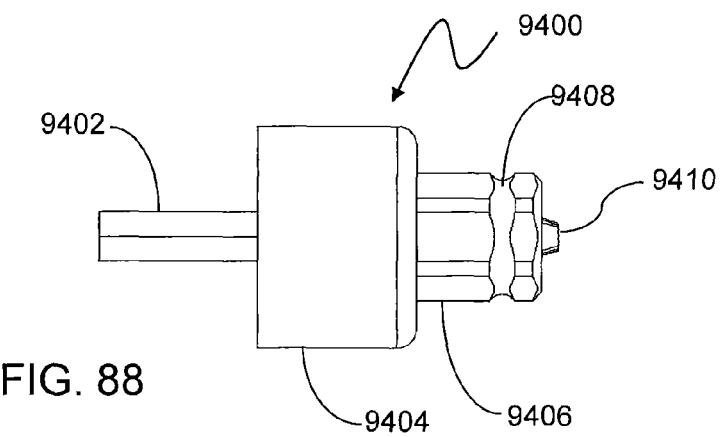
FIG. 88 is a side elevation view of a chuck adapter having a 6-sided mounting section.
Figure 89:
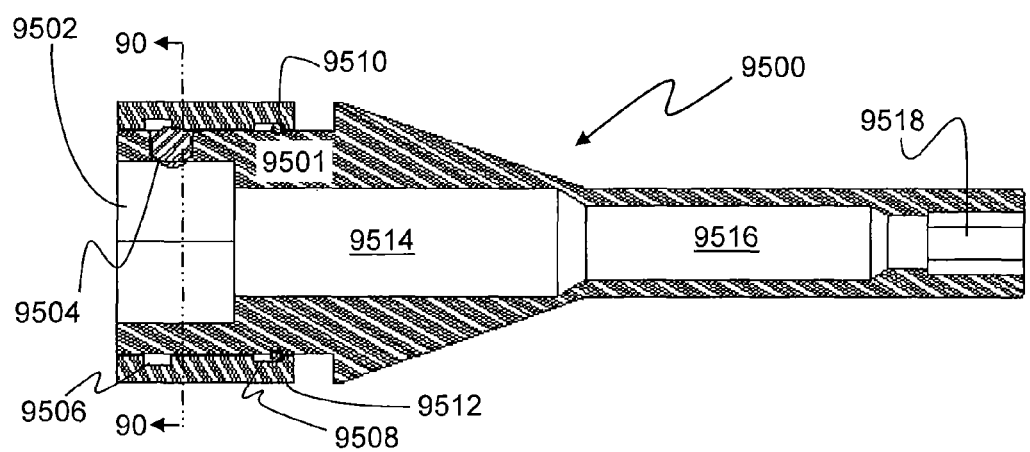
FIG. 89 is a side elevation view of a bit holding attachment adapted to fit over the mounting section shown in FIG. 88.
Figure 99:
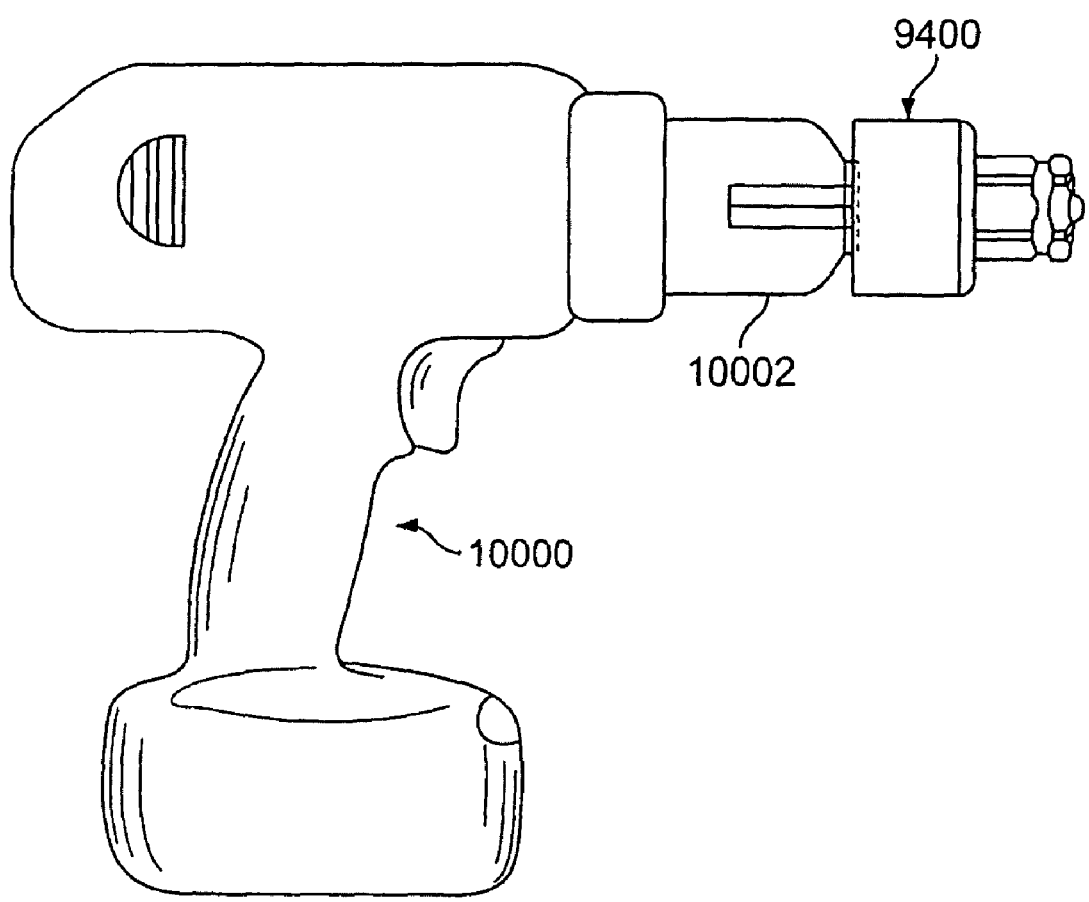
FIG. 99 shows a power tool having the adapter of FIG. 88 mounted thereon.

FIG. 88 is a detailed side view of a keyless chuck adapter 9400 having six flat secant sides on the mounting section 9406 thereof. Adapter 9400 includes a shaft 9402 adapted to be retained by the chuck of a power tool 10000 (FIG. 99). The shaft may be round, or have three, four, or six flat sides, for example. The mounting section 9406 includes a retaining means, such as a peripheral groove 9408 adapted for insertion into and engagement with a bit holding attachment 9500 (FIG. 89). The mounting section also has a plurality of gripping jaws 9410 which can be opened or closed by manual rotation of the peripheral sleeve 9404 of the adapter 9400, to securely grasp a first bit device without using a chuck key or other tool.

Figure 90:
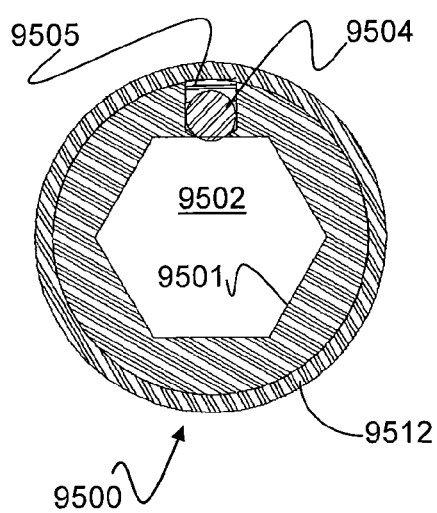
FIG. 90 is a cross-sectional view taken along section line 90-90 of FIG. 89.

FIG. 89 shows the bit holding attachment adapted for receiving the mounting section 9406 of the adapter 9400. The attachment has a housing 9501, a mounting cavity 9502, 9514 at its proximal end, and a forward cavity 9516 near the distal end. The mounting cavity includes a portion 9502 having at least on flat secant side to slidingly receive the mounting section of the adapter 9400. The mounting cavity further includes a means for engaging the locking means 9408 of the mounting section 9406. For example if locking means 9408 is a peripheral groove, the means for engaging the locking means may be a ball 9504 biased by a spring 9505 (FIG. 90). A capping ring 9512 retains the ball 9504 and spring 9505 in the attachment 9400. A split spring 9510 is retained in a circumferential groove on housing 9501. Spring 9510 is receiving in a groove inside capping ring 9512 and acts as a stop to hold the capping ring. The intermediate cavity 9514, forward cavity 9516 and forward bit securement means 9518 may be similar to those described above with reference to the bit holding attachment of FIG. 1.

FIG. 90 is a sectional view of the bit holding attachment 9500 taken along section line 90-90 of FIG. 89. The attachment 9500 has the six sided receiving cavity 9502 with its flat secant sides 9501. The ball 9504 and compression spring 9505 and capping ring 9512 are also shown.

Figure 91:
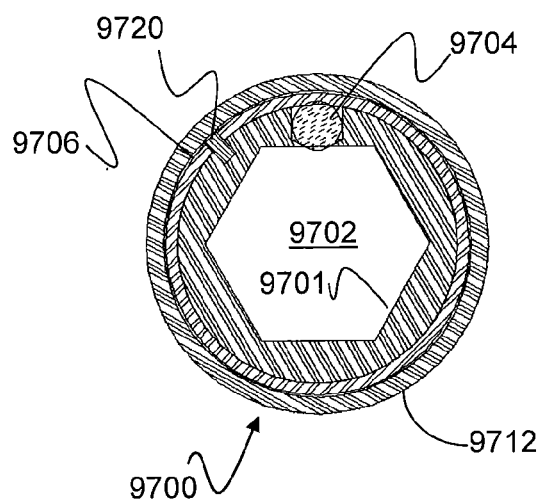

FIG. 91 shows a variation of the attachment. Attachment 9700 has a six-sided receiving cavity 9702 with flat secant sides 9701, capping ring 9712 and ball 9704 similar to those discussed with reference to FIG. 89. Instead of a compression spring 9505, a circular split spring 9706 and anti-clocking pin 9720 are provided.

Figure 92:
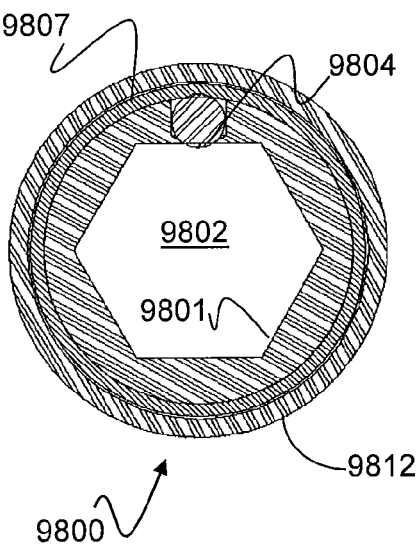

FIG. 92 shows a variation of the attachment. Attachment 9800 has a six-sided receiving cavity 9802 with flat secant sides 9801, capping ring 9812 and ball 9804 similar to those discussed with reference to FIG. 89. Instead of a compression spring 9505, an o-ring 9807 is provided, with a groove provided either on the housing or within the capping ring.

Figure 93:
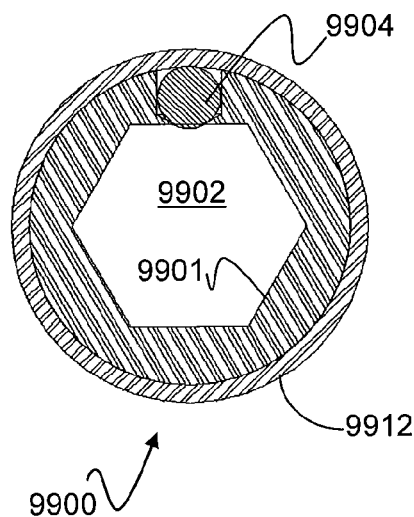

FIG. 93 shows a variation of the attachment. Attachment 9900 has a six-sided receiving cavity 9902 with flat secant sides 9901, and ball 9904 similar to those discussed with reference to FIG. 89. Instead of a capping ring 9512 and compression spring 9505, a circular elastomeric sleeve 9812 (e.g., a rubber sleeve) is provided over the outer diameter of the housing.

FIGS. 94-97 show cross sections of several variations of the attachment 9500 of FIG. 90. The cross section of each of FIGS. 94-97 is taken at about the same longitudinal position as section line 90-90 in FIG. 89. Separate side views of these variations are not shown, but are readily understood from the cross sections.

FIG. 94 shows a cross section of an attachment 10600 without the capping ring 9512 or means 9504 for engaging a retaining means. The attachment 10600 has a six-sided interior cavity 10602 for receiving the mounting section 9406 of chuck adapter 9400. The cavity 10602 is sized to provide a snug fit, without a ball or pin for retention.

FIG. 95 shows a cross section of an attachment 10700, which is another variation of the attachment of FIG. 89. The attachment 10700 has a split circular spring 10703 as a holding device that engages groove 9408 on the mounting section 9406. Alternatively, the split spring 10703 may be placed on the periphery of mounting section 9406, for engaging the attachment.

FIG. 96 shows a cross section of an attachment 10800, which is another variation of the attachment of FIG. 89. The attachment 10800 has a radius pin 10809 and a biasing spring 10807 for engaging the groove 9408 of mounting section 9406, in a similar fashion to the operation of ball 9504 in FIG. 89. A capping ring 10805 retains the radius pin 10809 and biasing spring 10807.

FIG. 97 shows a cross section of an attachment 10900 having a hexagonal mounting cavity 10902 with a sidewall 10901 and radius groove 10903 in the cavity. The radius groove 10903 can receive a biased ball (not shown) on the mounting section of the chuck or chuck adapter, or a split circular spring.

FIG. 98. shows a cross section of an attachment 11000 which is another variation of the attachment 9500 of FIG. 89. The cross section of FIG. 98 is taken at about the same longitudinal position as section line 90-90 in FIG. 89, but facing in the opposite direction, towards the distal end of the attachment. The attachment 11000 has a retaining ball 11004 and a clamping ring 11004 with sufficient compliance to allow the ball 11004 to retract sufficiently to pass over the mounting section when the attachment 11000 is mounted on the chuck or chuck adapter.

FIG. 99 shows a power tool 10000 having a keyed or keyless chuck 10002, with the chuck adapter 9500 inserted therein.

Figure 100:
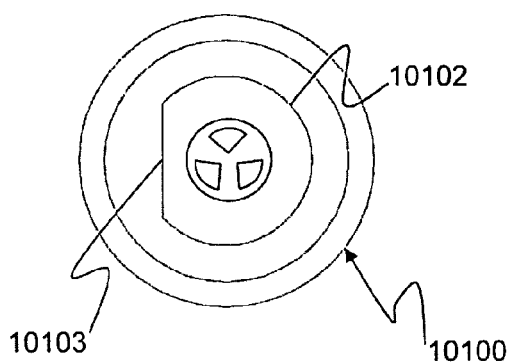
FIGS. 100-104 are front views of chuck adapter mounting sections having different shapes, suitable for use in a chuck adapter for holding a first bit device and a bit holding attachment thereon.

FIGS. 100-104 are front views showing four different shapes of the mounting section 9505. FIG. 100 shows an adapter 10100 with a mounting section 10102 that is generally circular, with a single flat secant side 10103.

Figure 101:
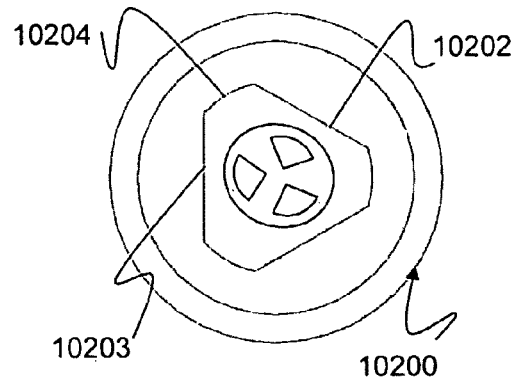

FIG. 101 shows an adapter 10200 with a mounting section 10202 that has three curved portions 10204, and three flat secant sides 10103.

Figure 102:
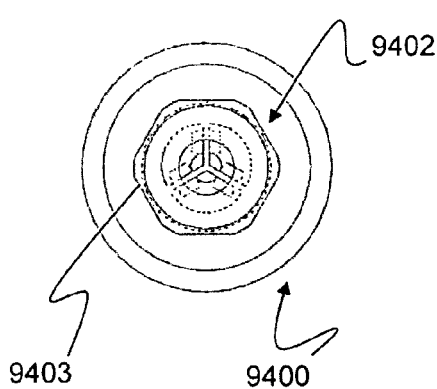

FIG. 102 is a front view of the adapter 9400 of FIG. 88, having a mounting section 9402 that has six flat secant sides 9403.

Figure 103:
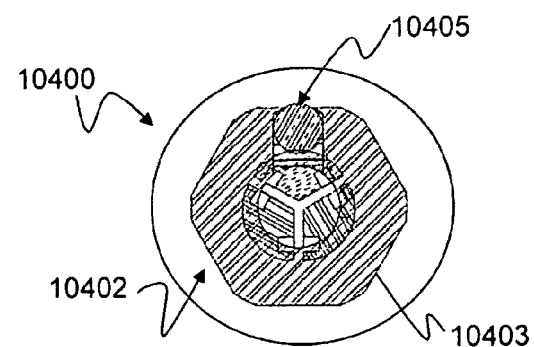

FIG. 103 is a front view of a variation of the adapter of FIG. 88. In FIG. 103, the adapter 10400 has a mounting section 10402 that has six flat secant sides 10403. However, the locking means of adapter 10400 is a spring loaded ball 10405, instead of the groove 9408 in adapter 9400. An adapter 10400 is used in conjunction with a corresponding bit holding attachment (not shown) similar to the attachment of FIG. 89, but having an interior groove as a means for engaging the locking means, to receive the ball 10405.

A variety of shapes may be used for the mounting section, such that the bit holding attachment can be slidably mounted over the mounting section of the adapter. Some of these shapes include at least one flat side. For example, the mounting section can having the shape of an N-sided right prism, where N is any integer greater than two. Other suitable shapes do not include any flat side. For example, the mounting section may be an elliptic cylinder or other solid. The mounting section is configured so that the intersection of the mounting section perimeter with any plane perpendicular to the longitudinal axis of the mounting section results in the same planar shape. The mounting cavity of the bit holding attachment is shaped to slidably receive the mounting section of the keyless chuck adapter while preventing relative rotation between the mounting section and the bit holding attachment.

Figure 104:
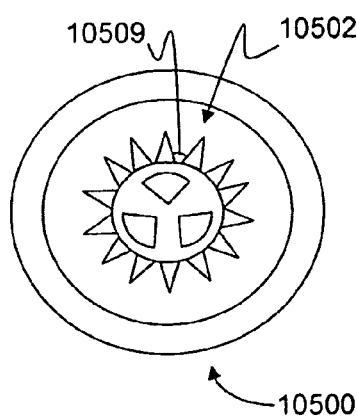

FIG. 104 is an example of another mounting section 10500, such that the bit holding attachment (not shown) can be slidably mounted over the mounting section 10502 of the adapter. The mounting section 10502 is spline shaped. The mounting section also has a spring loaded ball 10509 as a locking means. A corresponding bit holding attachment (not shown) includes a spline shaped opening at the distal end of its mounting cavity. A groove inside the mounting cavity is provided as the means for engaging the locking means (ball) 10509 of the mounting section.

Figure 105:
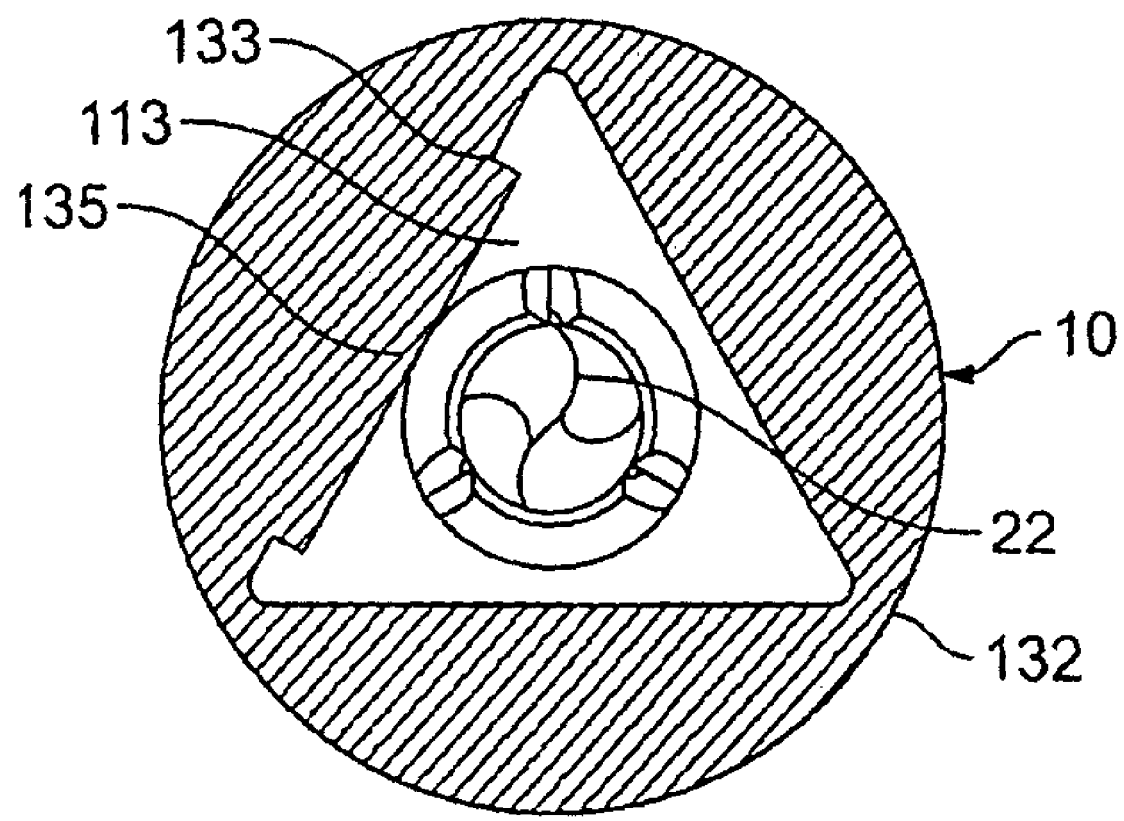
FIG. 105 is a cross-sectional view of a variation of the attachment shown in FIG. 54.

FIG. 105 is a front view of an attachment having a variation of the mounting cavity shown in FIG. 54. In FIG. 105, the mounting socket 133 in the mounting adapter 132 of the attachment 10 is formed with polygonal inside walls for engaging a polygonal prism (such as a triangular prism of the collar 113 of either a chuck or chuck adapter, not shown), for coupling the mounting cavity 132 of the attachment mechanism 10 onto the collar 113 of the chuck or chuck adapter. In FIG. 105, a groove 135 extends along a substantial portion of the length of one of the sides of the triangular prism. The attachment of FIG. 105 may be used with an adapter having a triangular prism with a raised ridge along one side thereof, for engaging the groove 135.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the present invention. The appended claims should be construed broadly to encompass other variants and embodiments that may be constructed by those of ordinary skill in the art within the scope and range of equivalents of the invention.

I claim:

1. Apparatus comprising:
    a keyless chuck adapter,
        the keyless chuck adapter having a longitudinal shaft sized and shaped to be grasped by a mounting chuck of a power tool for rotational driving thereof, the keyless chuck adapter being separate from the mounting chuck;
        the keyless chuck adapter having a plurality of jaws configured to receive a first bit device detachably mounted therebetween for powering rotational movement thereof, the keyless chuck adapter having a sleeve at an outer circumference of the keyless chuck adapter for opening and closing of the jaws for securely gripping bit devices of different sizes and shapes without using a key or tool;
        the keyless chuck adapter including a mounting section defined thereon, having at least one flat secant side, the mounting section capable of being rotatably driven by the power tool, said mounting section including at least one retaining means thereon or therein, said mounting section being adapted for insertion into and engagement with a bit holding attachment; and
    a bit holding attachment having:
        a mounting cavity sized and shaped to receive a portion of the keyless chuck adapter having the mounting section, the mounting cavity having at least one flat secant side sized and shaped to receive the flat secant side of the mounting section, the bit holding attachment having means for engaging the retaining means of the mounting section; and
        a forward bit securement means at an end of the bit holding attachment opposite a mounting end thereof, for detachably receiving and retaining a second bit device therein.

2. The apparatus of claim 1, wherein the mounting section has at least three flat secant sides.

3. The apparatus of claim 1, wherein the mounting section has six flat secant sides.

4. The apparatus of claim 1, wherein the bit holding attachment includes a housing comprising a mounting end having the mounting cavity defined therein, the mounting cavity open and facing outwardly therefrom, said mounting cavity being adapted to receive and detachably engage the mounting section of the keyless chuck adapter to be movable therewith, said mounting cavity sized to receive at least a portion of the first bit device therewithin.

5. The apparatus of claim 1, wherein the attachment further comprises:
    a forward cavity between the mounting cavity and the forward bit securement means, the forward cavity adapted to receive a distal portion of the first bit device.

6. The apparatus of claim 5, wherein the attachment further comprises a cylindrical intermediate cavity between the mounting cavity and the forward cavity, the intermediate cavity having a diameter larger than a diameter of the forward cavity and smaller than a corresponding dimension of the mounting cavity, the intermediate cavity adapted to receive another portion of the first bit device.

7. The apparatus of claim 1, wherein the retaining means comprises at least one aperture or peripheral groove, and the means for engaging the retaining means comprises:
at least one retractable ball, and
means for biasing the retractable ball towards a position in which the ball engages the aperture or peripheral slot.

8. The apparatus of claim 7, further comprising a retaining ring around a circumference of the attachment, the retaining ring preventing release of the ball and preventing release of the biasing means during rotation of the attachment.

9. The apparatus of claim 7, wherein the biasing means is shaped as a split circular spring.

10. The apparatus of claim 9, wherein the attachment further comprises a securely mounted anti-clocking pin or integrally formed anti-clocking member that prevents rotation of the split circular spring about an axis of the attachment.

11. The apparatus of claim 1, wherein the forward bit securement means includes a magnetic element.

12. The apparatus of claim 1, wherein:
the mounting section has six flat secant sides, and the retaining means is a peripheral groove,
said bit holding attachment comprises a housing comprising the mounting cavity at a mounting end of said housing, the mounting cavity having six flat sides for engaging the six flat secant sides of the mounting section; and
the means for engaging the retaining means comprises;
at least one retractable ball,
a resilient biasing means positioned at or near said mounting end of the housing, said resilient biasing means applying a force to said retractable ball for resiliently urging thereof inwardly toward the peripheral groove; and
means over said resilient biasing means for retaining of said resilient biasing means.

13. The apparatus of claim 12, wherein the means for retaining the resilient biasing means comprises a capping ring slidably mounted on the mounting end of the housing.

14. The apparatus of claim 12, further comprising a guide sleeve on said housing adjacent a forward end thereof, said guide sleeve being telescopingly movable longitudinally with respect to said housing between a retracted position encircling said housing and an extended position extending away from the power tool so as to extend around the second bit device for detachably retaining of a screw in the second bit device.

15. The apparatus of claim 1, wherein said bit holding attachment comprises:
a housing comprising the mounting cavity at a mounting end of said housing, and at least one retractable ball movably mounted within said housing and being extendable at least partially into said mounting cavity for extending thereof into an aperture or groove of the retaining means to engage the mounting section;
said forward bit securement means comprising a magnetic element for retaining the second bit device therein.

16. The apparatus of claim 1, wherein said bit holding attachment comprises:
a housing comprising the mounting cavity at a mounting end of said housing, the housing having a cylindrical intermediate cavity connected to and having a diameter smaller than a corresponding dimension of the mounting cavity, and a forward cavity connected to and smaller in diameter than the intermediate cavity, said housing adapted to receive at least a portion of a first bit device by way of the intermediate cavity; and the engaging means includes at least one retractable ball movably mounted within said housing and being extendable at least partially into said mounting cavity for extending into a groove or aperture of the retaining means to engage the mounting section.

17. The attachment of claim 16, wherein the intermediate cavity is sized and shaped to receive a relatively larger diameter portion of the first bit device, and the forward cavity is sized and shaped to receive a relatively smaller diameter distal portion of the first bit device.

18. The apparatus of claim 1, wherein the sleeve of the keyless chuck adapter is configured without teeth for engaging a chuck key.

19. The apparatus of claim 1, wherein the shaft of the keyless chuck adapter is a hexagonal shaft.

20. Apparatus comprising:
a keyless chuck adapter,
the keyless chuck adapter having a longitudinal shaft sized and shaped to be grasped by a mounting chuck of a power tool for rotational driving thereof, the keyless chuck adapter being separate from the mounting chuck;
the keyless chuck adapter having a plurality of jaws configured to receive a first bit device detachably mounted therebetween for powering rotational movement thereof, the keyless chuck adapter having a sleeve at an outer perimeter of the keyless chuck adapter for opening and closing of the jaws for securely gripping bit devices of different sizes and shapes without using a key or tool;
the keyless chuck adapter including a mounting section defined thereon, the mounting section capable of being rotatably driven by the power tool, said mounting section being adapted for slidable insertion into and engagement with a bit holding attachment; and
a bit holding attachment having:
a mounting cavity sized and shaped to slidably receive the mounting section of the keyless chuck adapter while preventing relative rotation between the mounting section and the bit holding attachment; and
a forward bit securement means at an end of the bit holding attachment opposite a mounting end thereof, for detachably receiving and retaining a second bit device therein.

21. The apparatus of claim 20, wherein
said mounting section includes at least one retaining means thereon or therein, and
the bit holding attachment having means for engaging the retaining means of the mounting section to secure the bit holding attachment to the mounting section during rotation thereof.

22. The apparatus of claim 21, wherein the mounting section has six flat sides, and the mounting cavity has six sides to receive the mounting section.

23. The apparatus of claim 21, wherein the mounting section is spline shaped.

* * * * *